United States Patent
Ritter

(10) Patent No.: US 11,693,628 B2
(45) Date of Patent: Jul. 4, 2023

(54) TRUSTWORTHY APPLICATION INTEGRATION

(71) Applicant: SAP SE, Walldorf (DE)

(72) Inventor: Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 95 days.

(21) Appl. No.: 16/869,058

(22) Filed: May 7, 2020

(65) Prior Publication Data
US 2021/0349739 A1   Nov. 11, 2021

(51) Int. Cl.
*G06F 8/10* (2018.01)
*G06F 8/20* (2018.01)

(52) U.S. Cl.
CPC . *G06F 8/10* (2013.01); *G06F 8/20* (2013.01)

(58) Field of Classification Search
CPC ..... G06F 8/10; G06F 8/20; G06F 8/35; G06F 11/36–3608
See application file for complete search history.

(56) References Cited

U.S. PATENT DOCUMENTS

| | | | | |
|---|---|---|---|---|
| 5,230,050 A * | 7/1993 | Iitsuka | ...... | G06F 8/48 717/145 |
| 8,316,344 B2 * | 11/2012 | Kaetker | ...... | G06F 8/10 717/106 |
| 10,419,586 B2 * | 9/2019 | Ritter | ...... | H04L 67/42 |
| 11,593,250 B2 * | 2/2023 | Ritter | ...... | G06F 11/3684 |
| 2007/0156430 A1 * | 7/2007 | Kaetker | ...... | G06F 8/10 717/104 |
| 2016/0285698 A1 * | 9/2016 | Ritter | ...... | G06Q 10/00 |

OTHER PUBLICATIONS

Ritter, D., et al., Catalog of Optimization Strategies and Realizations for Composed Integration Patterns, Jan. 2019 [retrieved Nov. 21, 2021], Retrieved from: <URL: https://www.researchgate.net/publication/330194466_Catalog_of_Optimization_Strategies_and_Realizations_for_Composed_Integration_Patterns>, pp. 1-26.*

(Continued)

*Primary Examiner* — Todd Aguilera
(74) *Attorney, Agent, or Firm* — Buckley, Maschoff & Talwalkar LLC

(57) ABSTRACT

According to some embodiments, methods and systems may be associated with trustworthy application integration. A formalization platform may facilitate definition of pattern requirements by an integration developer. The formalization platform may also formalize singe pattern compositions and compose single patterns to template-based formalized compositions. A correctness platform may then check for structural correctness of the formalized compositions and execute a semantic transformation or binding to pattern characteristics and associated interactions. The correctness platform may also check composition semantics and generate a formal model. An implementation platform may translate the formal model generated by the correctness platform and configure implementation parameters of the translated formal model. The implementation platform may then execute the translated formal model in accordance with the configured implementation parameters.

14 Claims, 37 Drawing Sheets

(56) References Cited

OTHER PUBLICATIONS

Ritter, D., et al., Formalizing Application Integration Patterns, 2018 IEEE 22nd International Enterprise Distributed Object Computing Conference [online], 2018 [retrieved Nov. 4, 2021], Retrieved from Internet: <URL: https://ieeexplore.ieee.org/stamp/stamp.jsp?arnumber=8536143>, whole document.*

Communication: "Extended European Search Report", Jul. 16, 2021 (Jul. 16, 2021), European Patent Office, for European Application No. 20204984.7-1224, 11 pp.

Ritter, Daniel et al., "Optimization Strategies For Integration Pattern Compositions", Proceedings of the 12th ACM International Conference on Distributed and Event-Based Systems, New York, NY, Jun. 25, 2018, 12 pp.

* cited by examiner

TRUSTWORTHY APPLICATION INTEGRATION

BACKGROUND

Recent trends have led to a modularization and distribution of business applications and devices, which increases the importance of applications and business processes. Due to modularization, the resulting integration scenarios or programs—essentially a composition of integration patterns (i.e., best practices in the form of integration operators)—becomes increasingly complex. While existing integration platform vendors may allow for the development of integration programs, typically they do not offer a formally verifiable foundation. As a result, the following types of problems may be common:
- there is no design-time functional verification or validation (e.g., correctness checks);
- exhaustive manual runtime validation is required;
- design flaws and functional errors are found late in the development phase (or even in production);
- unintentional issues in business processes may arise (e.g., integration scenarios behave differently from what was intended); an
- frequently changing integration solutions (e.g., for improvements and/or optimizations) requires major effort and bears the uncertainty that a resulting "improved" solution is functionally incorrect.

Together these problems not only lead to high costs for the development and maintenance of such solutions (and, in case of errors, in productive business processes), but also cause frustration and a lack of trust in those solutions. Since an application is central to most current IT solutions, a trustworthy application integration may be desired. An application integration would be trustworthy, for example, if the integration solutions were intentional and formally verifiable.

It would therefore be desirable to provide trustworthy application integration in a secure, automatic, and efficient manner.

SUMMARY

According to some embodiments, methods and systems may be associated with trustworthy application integration. A formalization platform may facilitate definition of pattern requirements by an integration developer. The formalization platform may also formalize single pattern compositions and compose single patterns to template-based formalized compositions. A correctness platform may then check for structural correctness of the formalized compositions composed by the formalization platform and execute a semantic transformation or binding to pattern characteristics and associated interactions. The correctness platform may also check composition semantics and generate a formal model. An implementation platform may translate the formal model generated by the correctness platform and configure implementation parameters of the translated formal model. The implementation platform may then execute the translated formal model in accordance with the configured implementation parameters.

Some embodiments comprise: means for facilitating, by a computer processor of a formalization platform, definition of pattern requirements by an integration developer; means for formalizing, by the formalization platform, single pattern compositions; means for composing, by the formalization platform, single patterns to template-based formalized compositions; means for checking, by a correctness platform, for structural correctness of the formalized compositions composed by the formalization platform; means for executing, by the correctness platform, a semantic transformation or binding to pattern characteristics and associated interactions; means for checking, by the correctness platform, composition semantics and generate a formal model; means for translating, by an implementation platform, the formal model generated by the correctness platform; means for configuring, by the implementation platform, parameters of the translated formal model; and means for executing, by the implementation platform, the translated formal model in accordance with the configured implementation parameters.

Some technical advantages of some embodiments disclosed herein are improved systems and methods to provide trustworthy application integration in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments described herein may provide a formal foundation for trustworthy application integration. Note that the integration patterns may be assumed to have been responsibly developed (i.e., their execution semantics are formally well-defined and can be verified). Embodiments described herein may include the following contributions:

a responsible pattern composition process spanning from a composition formalization, over composition correctness to a composition implementation;

a composition formalization that is based on (a) characteristics of well-defined patterns for the pattern internal data processing, and (b) a formal definition of data exchange between patterns in the form of pattern contracts;

a correctness-preserving construction of an integration pattern contract graph that ensues the structural correctness of integration scenarios;

an extension of well-defined patterns by the concept of pattern contracts and a translation of contract graphs onto patterns with contracts (called "boundaries") in multiple steps: for single patterns and for connections between patterns/edges in the graph using configurable contracts;

a mechanism of synchronization of the pattern boundaries for the assessment of the composition semantic correctness;

formalization of improvements and/or optimizations as graph rewritings based on the contract graph (along with the correctness-preserving properties for improvements and/or optimizations)

These contributions may allow for a trustworthy application integration and, consequently, for a formal treatment of integration solutions addressing application integration problems.

Figure 1:
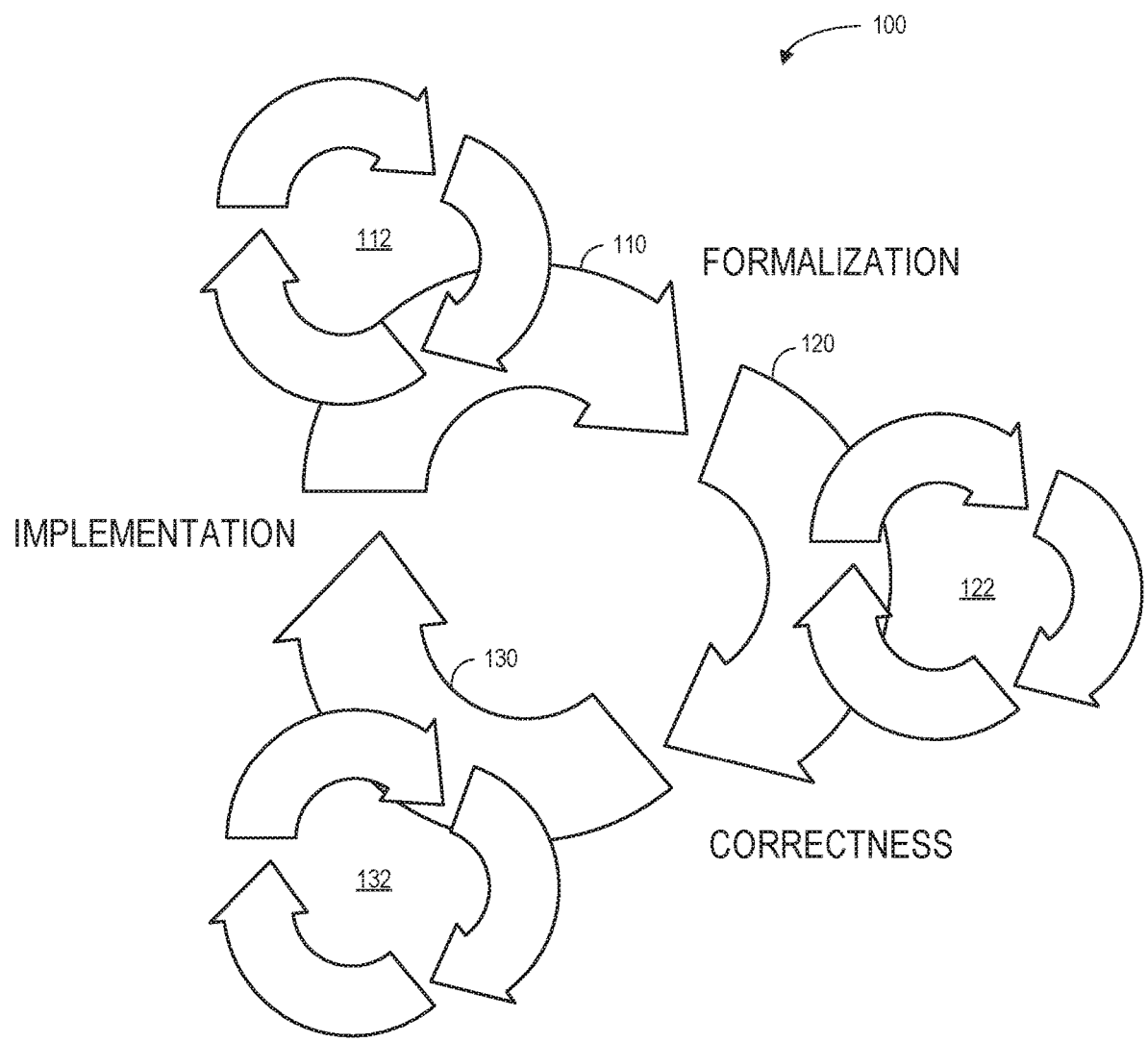
FIG. 1 is an information flow diagram associated with a responsible pattern composition process according to some embodiments.

FIG. 1 is an information flow diagram 100 associated with a responsible pattern composition process according to some embodiments. Initially, a "formalization" process 110 may include several sub-processes 112, including: defining pattern requirements for the formalization; formalizing single pattern compositions; and composing single patterns to template-based formalized compositions. Next, a "correctness" process 120 may include several sub-processes 122, including: checking structural correctness of the formalized compositions; transforming or binding to pattern characteristics and their interaction (semantic transformation); and checking composition semantics. Finally, an "implementation" process 130 may include several sub-processes 132, including: translating from the formal model; configuring implementation parameters; and executing the translated formal model in accordance with the configured implementation parameters.

Figure 2:
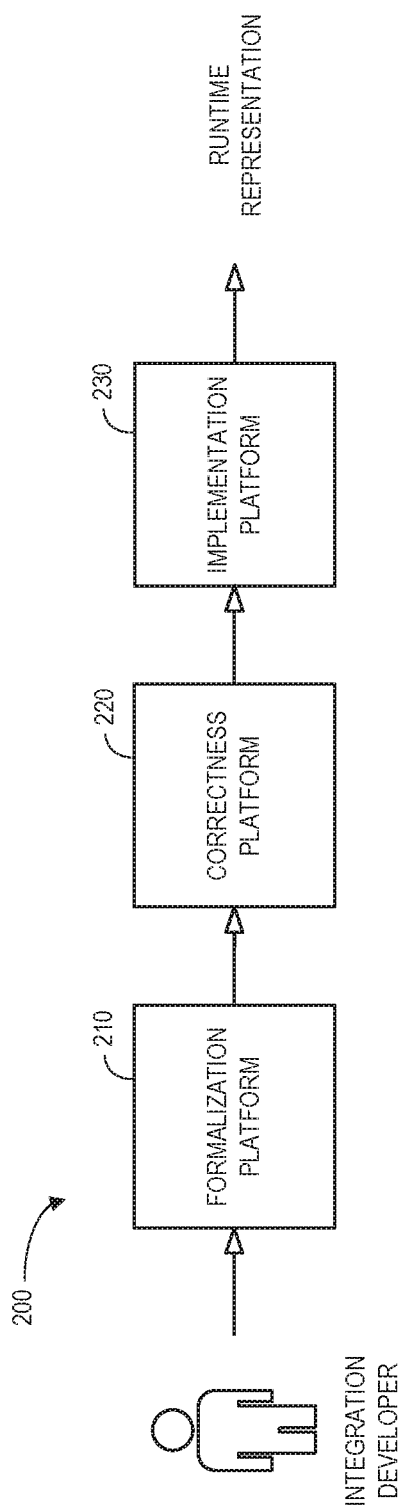
FIG. 2 is a high-level block diagram of a system in accordance with some embodiments.

FIG. 2 is a high-level block diagram of a system 200 in accordance with some embodiments. The system 200 includes a formalization platform 210 that might interact with an integration developer. The formalization platform 210 may provide an output to a correctness platform 220 which, in turn, provides an output to an implementation platform 230 to create a runtime representation. The process might be performed automatically or be initiated via a command from a remote operator interface device. As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The platforms 210, 220, 230, including those associated with the system 200 and any other device described herein, may store information into and/or retrieve information from various data stores (e.g., a data storage device), which may be locally stored or reside remote from the platforms 210, 220, 230. Although a single formalization platform 210, correctness platform 220, and implementation platform 230 are shown in FIG. 2, any number of such devices may be included in the system 200. Moreover, various devices described herein might be combined according to embodiments of the present invention. For example, in some embodiments, the formalization platform 210, correctness platform 220, and/or implementation platform 230 might comprise a single apparatus. The system 200 functions may be performed by a constellation of networked apparatuses, such as in a distributed processing or cloud-based architecture.

An operator or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how optimization rules are applied) and/or provide or receive automatically generated recommendations or results from the system 200.

Figure 3:
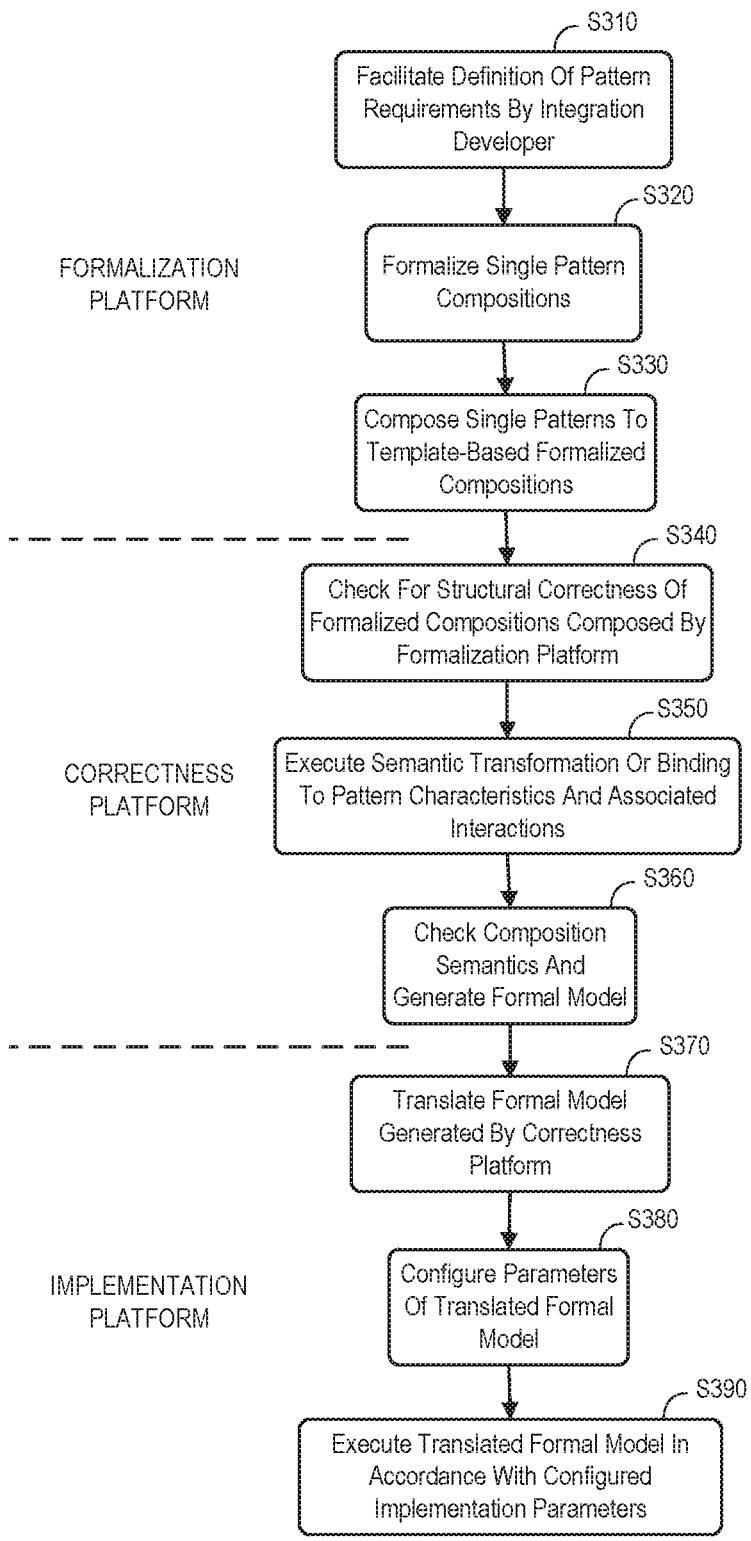
FIG. 3 is a method according to some embodiments.

FIG. 3 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a computer processor of a formalization platform may facilitate definition of pattern requirements by an integration developer. At S320, the formalization platform may formalize single pattern compositions. At S330, the formalization platform may compose single patterns to template-based formalized compositions.

At S340, a correctness platform may check for structural correctness of the formalized compositions composed by the formalization platform. At S350, the correctness platform may execute a semantic transformation or binding to pattern characteristics and associated interactions. At S360, the correctness platform may check composition semantics and generate a formal model.

At S370, an implementation platform may translate the formal model generated by the correctness platform. At S380, the implementation platform may configure parameters of the translated formal model. The implementation platform may then execute the translated formal model in accordance with the configured implementation parameters at S390.

Figure 4:
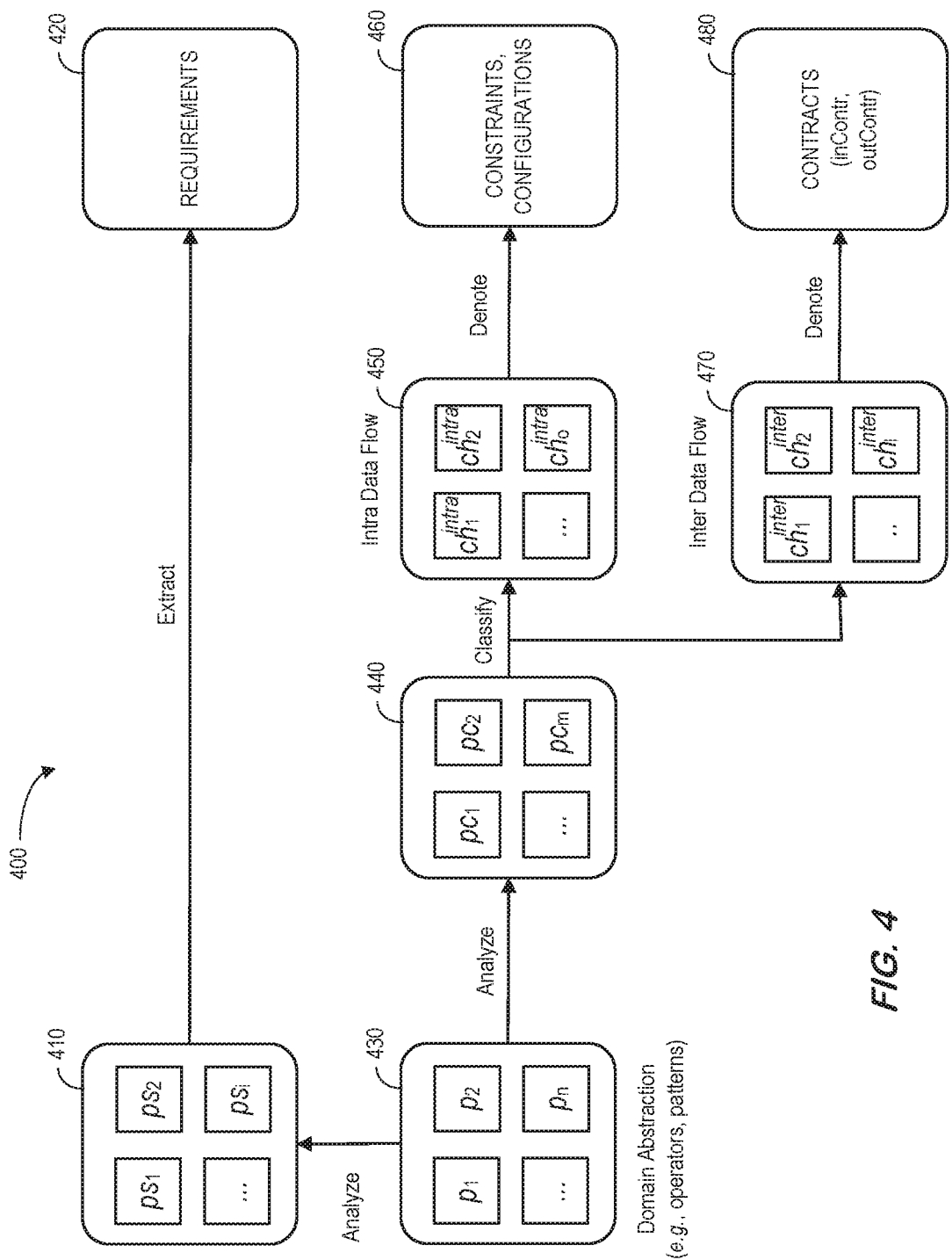
FIG. 4 illustrates domain abstraction in accordance with some embodiments.

FIG. 4 illustrates domain abstraction 400 in accordance with some embodiments. The domain abstraction 400 includes a set of operators or patterns 430 $p_1, \ldots, p_n$ (i.e., representing the best practices in this domain). For example, in application integration, a set of integration patterns may provide common solutions to reoccurring problems of that domain. Characteristics analysis may lead to a set of characteristics 440 for each of the patterns $pc_1, \ldots, pc_m$ as shown in FIG. 4 that can be subsumed to classes of characteristics (e.g., channel cardinality as structural and message cardinality as data characteristic). These classes can be separated according to intra pattern data flow characteristics 450 $ch_1^{intra}, \ldots, ch_o^{intra}$, and inter pattern data flow characteristics 470 $ch_1^{inter}, \ldots, ch_l^{inter}$. They denote constraints (configurations) 460 and contracts (i.e., inContr, outContr) 480, respectively.

The analysis further results to a description of the execution semantics 410 of each pattern $ps_1, \ldots, ps_i$. The different conceptual aspects of these semantics 410 are grouped and formulated as requirements 420, each denoting a distinct concept relevant to more than one pattern 430, and thus summarizing all aspects of the domain. For example, in application integration, patterns 430 require control and data flow, transacted resources, time, etc.

Figure 5:
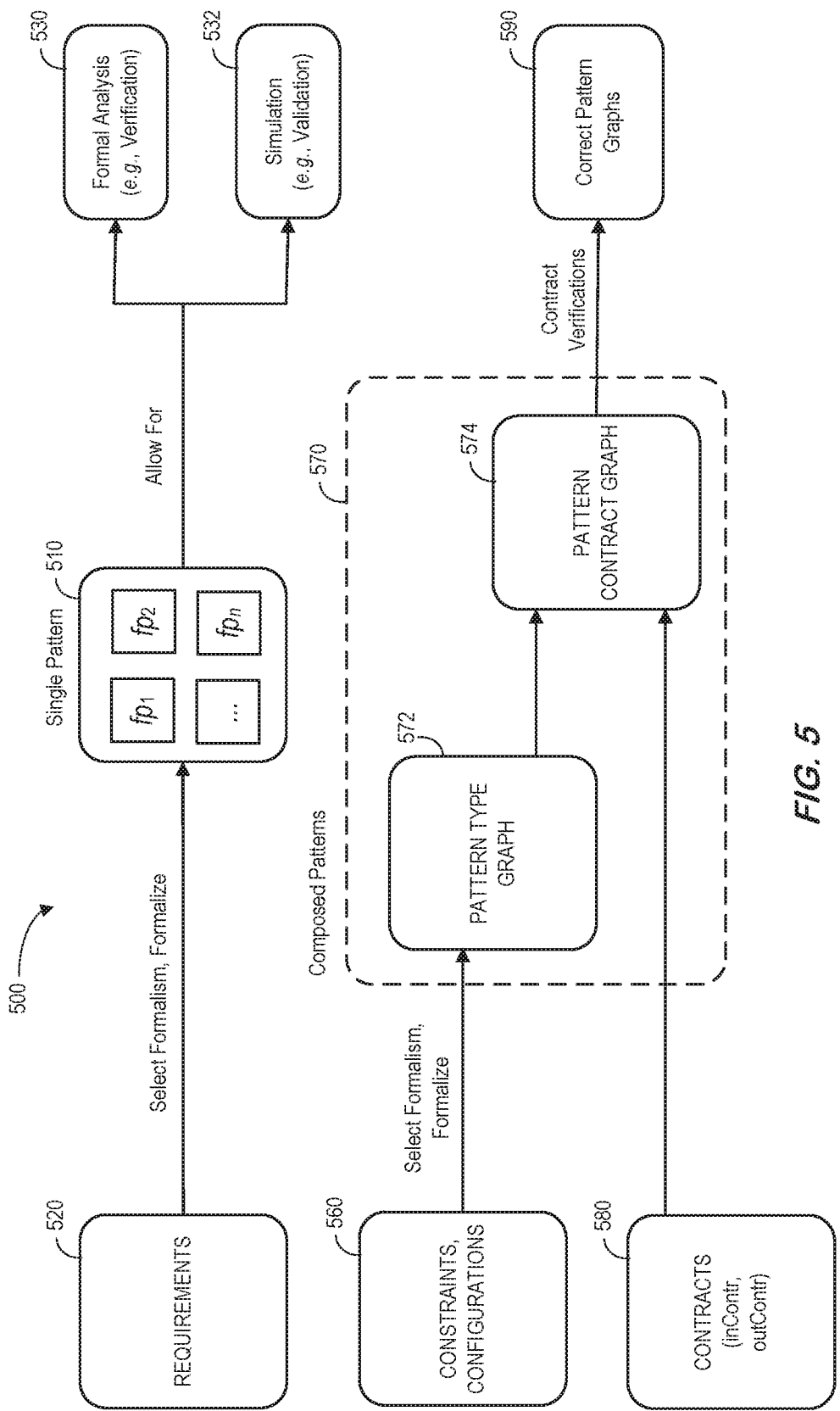
FIG. 5 illustrates domain formalization according to some embodiments.

FIG. 5 illustrates domain formalization 500 according to some embodiments. As shown, requirements 520 are not only used to select a suitable formalization (e.g., considering temporal semantics), but also allow for the systematic formalization of patterns $p_1, \ldots, p_n$ as a single pattern 510 $fp_1, \ldots, fp_n$ (which may allow for semantic correctness including formal analysis/verification 530 and simulation/validation 532). The formalization of constraints and configurations 560 of the patterns leads to composed patterns 570, including a pattern type graph 572 (based on control flow graphs), which is extended by the contracts 580 towards a pattern contract graph 574 and, after contract verifications, correct pattern graphs 590.

Figure 6:
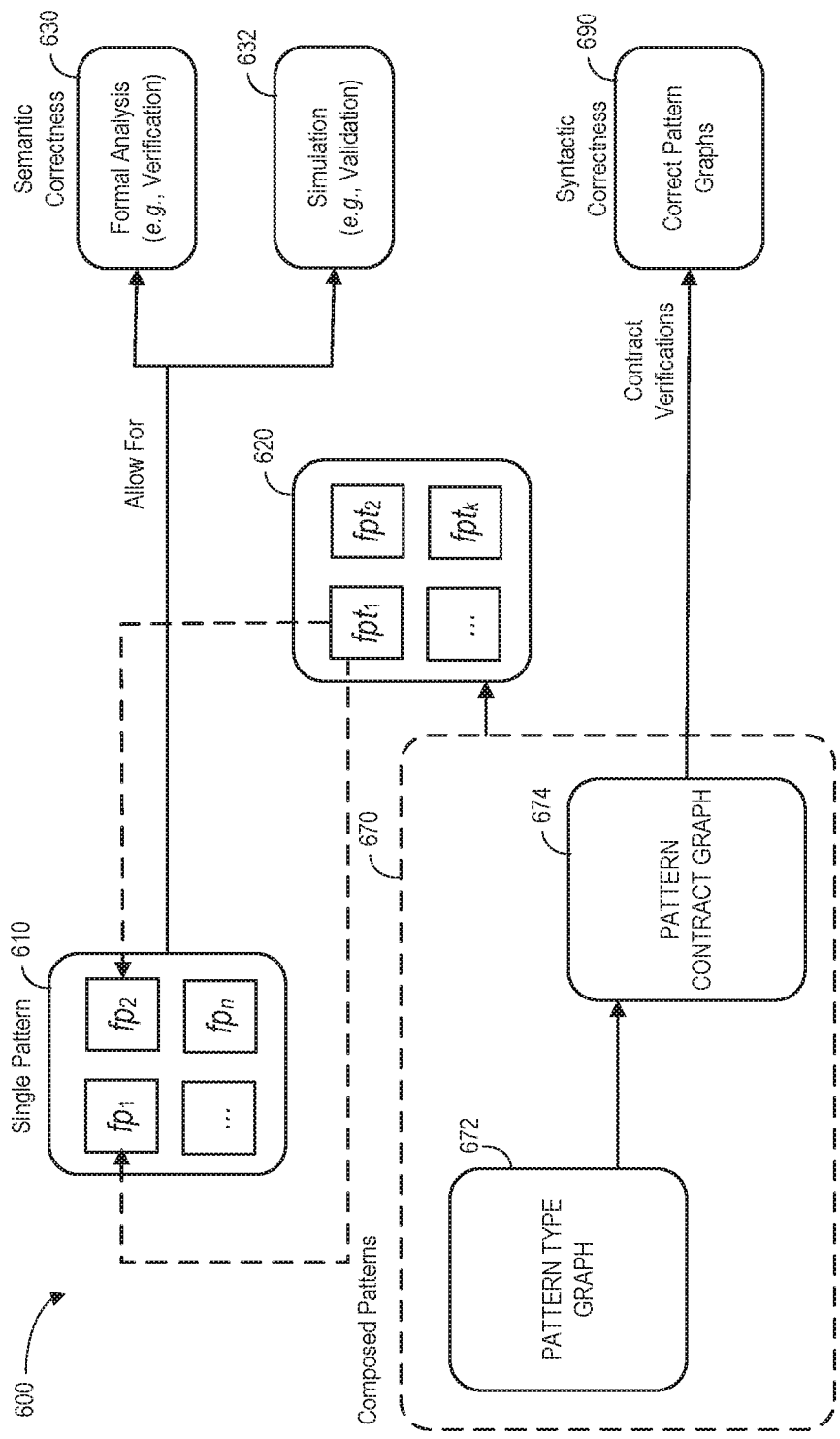
FIG. 6 illustrates domain verification in accordance with some embodiments.

FIG. 6 illustrates domain verification 600 in accordance with some embodiments. As before, a systematic formalization of patterns $p_1, \ldots, p_n$ as a single pattern 610 $fp_1, \ldots, fp_n$ may allow for semantic correctness including formal analysis/verification 630 and simulation/validation 632). Composed patterns 670 may include a pattern type graph 672 (based on control flow graphs), which is extended by the contracts towards a pattern contract graph 674 and, after contract verifications, correct pattern graphs 690. Note that with domain verification 600, the composed patterns 670 may provide an input to the single pattern 610 via $fpt_1, \ldots, fpt_n$ 620.

Enterprise Application Integration ("EAI") is the centerpiece of current on-premise, cloud, and device integration scenarios. Some embodiments described herein provide optimization strategies that may help reduce model complexity and improve process execution using design time techniques. In order to achieve this, embodiments may formalize compositions of Enterprise Integration Patterns ("EIPs") based on their characteristics and provide optimization strategies using graph rewriting.

Figure 7:
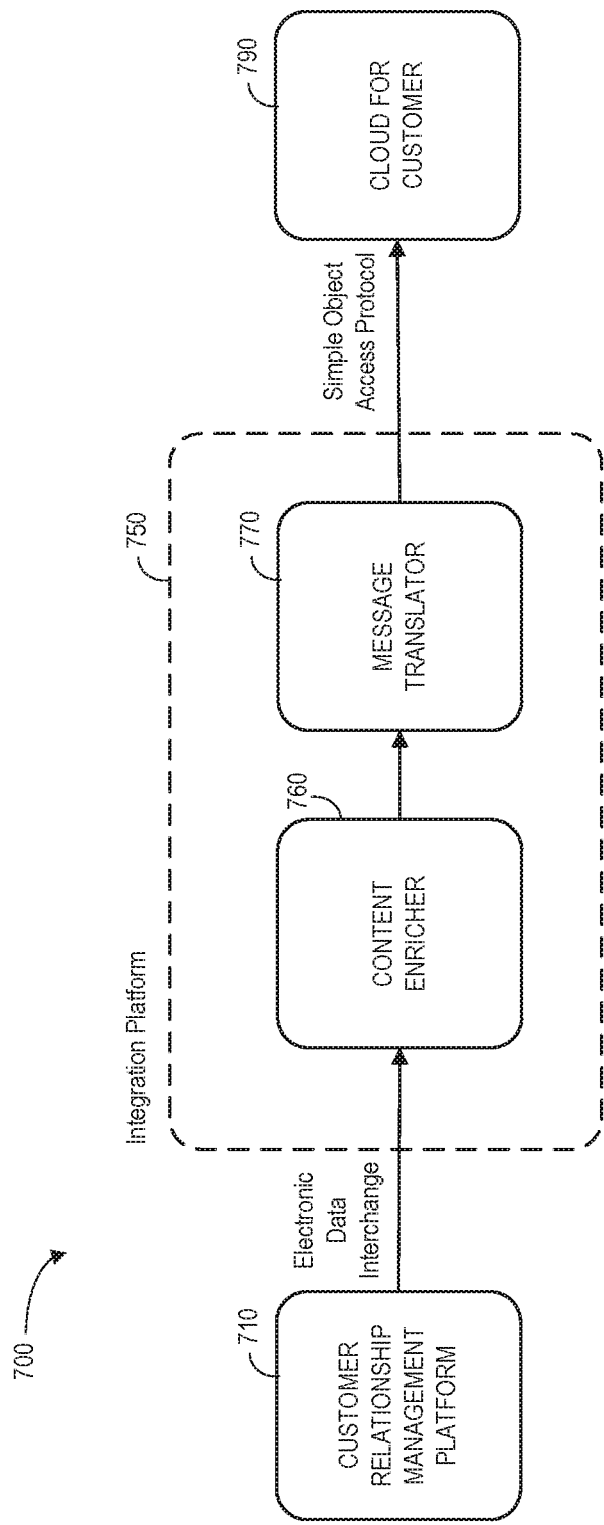
FIG. 7 is a hybrid integration scenario according to some embodiments.

Note that EAI may compose EIPs from a catalog comprising the original patterns and recent additions. This can result in complex models that are often vendor-specific, informal and ad-hoc; optimizing such integration processes is desirable, but hard. In most cases, this is further complicated by data aspects being absent in the model. As a concrete motivation for a formal framework for data-aware integration process optimization, consider the following example: many organizations have started to connect their on-premise applications, such as Customer Relationship Management ("CRM") systems, with cloud applications (such as cloud for customer available from SAP®) using integration processes. For example, FIG. 7 is a hybrid integration scenario 700 according to some embodiments. As can be seen, an integration platform 750 connects a CRM platform 710 (via an Electronic Data Interchange ("EDI"))

with a cloud for customer platform 790 (via Simple Object Access Protocol ("SOAP")). Consider, for example, a CRM material that is sent from the CRM platform 710 via EDI to an integration process 750 running on a cloud platform integration 790. The integration process 750 may have a content enricher 760 that enriches the message header ("MSG.HDR") with additional information based on a document number for reliable messaging (i.e., "AppID"), which allows redelivery of the message in an exactly-once service quality. The EDI structure is then mapped, by a message translator 770, to an appropriate cloud for customer service description and sent to a cloud for customer receiver. Already in this simple scenario, an obvious improvement can be applied: the data-independent content enricher 760 and message translator 770 patterns might be executed in parallel. This insight would perhaps not be obvious without the data flow in the model, and leads to questions such as the following: "are there other optimizations that could also be applied, and how can the modeling be supported by this?" Currently these questions cannot be answered, since approaches for verification and static analysis of "realistic data-aware" business and integration processes are missing. Consider the following Research Questions ("RQ"):

RQ1 What are relevant optimization techniques for EAI pattern compositions?

RQ2 How can pattern compositions be suitably formalized for optimizations?

RQ3 How can optimization strategies be formally defined?

Embodiments described herein may develop a verification and static analysis framework for applying and reasoning about optimizations of data-aware integration patterns. Moreover, a graph-based representation of integration patterns may let optimizations be realized as graph rewriting rules. As used herein, the term "optimization" may be associated with a process that iteratively improves compositions but gives no guarantee of optimality. Due to brevity, embodiments may focus on common EAI optimization objectives: message throughput (runtime benchmarks), pattern processing latency (abstract cost model), and also runtime independent model complexity from the process modeling domain. Furthermore, embodiments may concentrate on pattern compositions within one integration process (not to or within message endpoints).

Note that some optimization techniques may have a main goal of reducing model complexity (i.e., number of patterns) or "process simplification." The cost reduction of these techniques can be measured by pattern processing time (latency, i.e., time required per operation) and model complexity metrics. Process simplification can be achieved by removing redundant patterns like Redundant Subprocess Removal (e.g., remove one of two identical sub-flows), Combine Sibling Patterns (e.g., remove one of two identical patterns), or Unnecessary Conditional Fork (e.g., remove redundant branching). The simplifications may require a formalization of patterns as a control graph structure (pre-Requisite R1), which helps to identify and deal with the structural change representation.

In addition, a reduction of data can be facilitated by pattern push-down optimizations of message-element-cardinality-reducing patterns, such as Early-Filter (for data; e.g., remove elements from the message content), Early-Mapping (e.g., apply message transformations), as well as message-reducing optimization patterns like Early-Filter (for messages; e.g., remove messages), Early-Aggregation (e.g., combine multiple messages to fewer ones), Early-Claim Check (e.g., store content and claim later without passing it through the pipeline), and Early-Split (e.g., cut one large message into several smaller ones). Measuring data reduction requires a cost model based on the characteristics of the patterns, as well as the data and element cardinalities. For example, the practical realizations for multimedia and hardware streaming show improvements especially for early-filter, split and aggregation, as well as moderate improvements for early mapping. This requires a formalization that is able to represent data or element flow (R2). Data reduction optimizations target message throughput improvements (i.e., processed messages per time unit), however, some may have a negative impact on the model complexity.

Still further, a parallelization of processes can be facilitated through transformations such as Sequence to Parallel (e.g., duplicate pattern or sequence of pattern processing), or, if not beneficial, reverted, e.g., by Merge Parallel. For example, good practical results have been shown for vectorization and hardware parallelization. Therefore, again, a control graph structure (R1) may be required. Although a main focus of parallelization is message throughput, heterogeneous variants may also improve latency. In both cases, parallelization may require additional patterns, which negatively impacts the model complexity. The opposite optimization of merging parallel processes mainly improves the model complexity and latency.

Besides control flow (as used in most of the related domains), a suitable formalization may be able to represent the control graph structure (R1) (including reachability and connectedness properties) and the data element flow (R2) between patterns (not within a pattern). Furthermore, the formalization must allow verification of correctness (R3) on a pattern-compositional level (i.e., each optimization produces a correct pattern composition), taking the inter-pattern data exchange semantics into account. In contrast to other approaches, embodiments described herein define a novel data-aspect representation of the extended EIPs and guarantee correctness.

Summarizing the requirements R1 through R3, a suitable formalization of integration patterns is graph based, can represent the data element flow, and allows correctness checking. Hence, embodiments may utilize an Integration Pattern Typed Graph ("IPTG") as an extended control flow graph. First fix some notation: a directed graph is given by a set of nodes P and a set of edges E⊆P×P. For a node p∈P, write ·p={p'∈P|(p', p)∈E} for the set of direct predecessors of p, and p·={p"∈P|(p,p")∈E} for the set of direct successors of p.

An IPTG is a directed graph with set of nodes P and set of edges E⊆P×P, together with a function type: P→T, where T={start, end, message processor, fork, structural join, condition, merge, external all}. An IPTG (P, E, type) is correct if:

∃$p_1$, $p_2$∈P with type($p_1$)=start and type($p_2$)=end;

if type(p)∈{fork, condition} then |·p|=1 and |p·|=n, and if type(p)=join then |·p|=n and |p·|=1;

if type(p)∈{message processor, merge} then |·p|=1 and |p·|=1;

if type(p)∈{external call} then |·p|=1 and |p·|=2; and

The graph (P, E) is connected and acyclic.

In the definition, think of P as a set of extended EIPs that are connected by message channels in E, as in a pipes and filter architecture. The function type records what type of pattern each node represents. The first correctness condition says that an integration pattern has at least one source and one target, while the next three states the cardinality of the involved patterns coincide with the in-and-out-degrees of the nodes in the graph representing them. The last condition states that the graph represents one integration pattern, not multiple unrelated ones, and that messages do not loop back to previous patterns.

To represent the data flow, i.e., the basis for the optimizations, the control flow has to be enhanced with (a) the data that is processed by each pattern, and (b) the data exchanged between the patterns in the composition. The data processed by each pattern (a) is described as a set of "pattern characteristics," formally defined as follows. A pattern characteristic assignment for an IPTG (P, E, type) is a function char: $P \rightarrow 2^{PC}$, assigning to each pattern a subset of the set $$PC = (\{MC\} \times \mathbb{N} \times \mathbb{N}) \cup (\{ACC\} \times \{ro, rw\}) \cup (\{MG\} \times \mathbb{B}) \cup (\{CND\} \times 2^{BExp}) \cup (\{PRG\} \times Exp \times (\mathbb{Q}^{\geq 0} \times (\mathbb{Q}^{\geq 0} \cup \{\infty\}))),$$

Where $\mathbb{B}$ is the set of Booleans, BExp the set of Boolean expressions, Exp the set of program expressions, and MC, CHG, MG, CND, PRG some distinct symbols. The property and value domains in the pattern characteristic definition are based on the pattern descriptions, and could be extended if required. Consider a characteristic (MC, n, k) that represents a message cardinality of n:k, (ACC, x) the message access, depending on if x is read-only ("ro") or read-write ("rw"), and a characteristic (MG, y) that represents whether the pattern is message generating depending on the Boolean y. Finally, (CND, $\{c1, \ldots, cn\}$) represents the conditions $c_1, \ldots, c_n$ used by the pattern to route messages, (PRG, (p, (v, v'))) the program used by the pattern for message translations, together with its timing window.

For example, the characteristics of a content-based router CBR may be char(CBR)={(MC, 1:1), (ACC, ro), (MG, false), (CND, $\{cnd_1, \ldots, cnd_{n-1}\}$)}, because of the workflow of the router: it receives exactly one message, then evaluates up to n−1 routing conditions $cnd_1$ up to $cnd_{n-1}$ (one for each outgoing channel), until a condition matches. The original message is then rerouted read-only (in other words, the router is not message generating) on the selected output channel, or forwarded to the default channel, if no condition matches. The data exchange between the patterns (b) is based on input and output contracts (similar to data parallelization contracts). These contracts specify how the data is exchanged in terms of required message properties of a pattern during the data exchange, formally defined as a "pattern contract." A pattern contract assignment for an IPTG (P, E, type) is a function contr:$P \rightarrow CPT \times 2^{EL}$, assigning to each pattern a function of type $$CPT = \{signed, encrypted, encoded\} \rightarrow \{yes, no, any\}$$

and a subset of the set $$EL = MS \times 2^D$$

where MS={HDR, PL, ATTCH}, and D is a set of data elements (the concrete elements of D are not important, and will vary with the application domain). The function of type CPT may be represented by its graph, leaving out the attributes that are sent to any, when convenient.

Each pattern will have an inbound and an outbound pattern contract, describing the format of the data it is able to receive and send respectively—the role of pattern contracts is to make sure that adjacent inbound and outbound contracts match. The set CPT in a contract represents integration concepts, while the set EL represents data elements and the structure of the message: its headers (HDR, H), its payload (PL, Y) and its attachments (ATTCH, A)

For example, a content-based router is not able to process encrypted messages. Recall that its pattern characteristics included a collection of routing conditions: these might require read-only access to message elements such as certain headers $h_1$ or payload elements $e_1$, $e_2$. Hence, the input contract for a router mentioning these message elements is:

inContr(CBR)=({(encrypted,no)},{(HDR,$\{h_1\}$),(PL, $\{e_1,e_2\}$)}).

Since the router forwards the original message, the output contract is the same as the input contract.

Let (C, E)$\in 2^{CPT} \times 2^{EL}$ be a pattern contract, and X$\subseteq$CPT$\times 2^{EL}$ a set of pattern contracts. Write $X_{CPT}$={C'|($\exists$E')(C', E')$\in$X} and $X_{EL}$={E'|($\exists$C')(C', E')$\in$X}. Consider that (C, E) matches X, in symbols match ((C, E), X), if the following condition holds:

$$(\forall (p, x) \in C)(x = \text{any} \lor (\forall C' \in X_{CPT})(\exists (p', y) \in C')$$

$$(p = p' \land (y = \text{any} \lor y = x) \land (\forall (m, Z) \in E)\left(Z = \bigcup_{(m,z') \in X_{EL}} Z'\right)$$

Consider if an inbound contract $K_{in}$ matches the outbound contracts $K_1, \ldots, K_n$ of its predecessors. This is the case if (i) for all integration concepts that are important to $K_{in}$, all contracts $K_i$ either agree, or at least one of $K_{in}$ or $K_i$ accepts any value (concept correctness); and (ii) together, $K_1, \ldots, K_n$ supply all the message elements that $K_{in}$ needs (data element correctness).

Since pattern contracts can refer to arbitrary message elements, a formalization of an integration pattern can be quite precise. On the other hand, unless care is taken, the formalization can easily become specific to a particular pattern composition. In practice, it is often possible to restrict attention to a small number of important message elements, which makes the formalization manageable. Putting everything together, pattern compositions may be formalized as IPCG with pattern characteristics and inbound and outbound pattern contracts for each pattern. In particular, an IPCG is a tuple (P, E, type, char, inContr, {outContr}) where (P, E, type) is an IPCG, char: $P \rightarrow 2^{PC}$ is a pattern characteristics assignment, and inContr:$\Pi_{p \in P}(2^{CPT} \times 2^{EL})^{|\cdot p|}$ and inContr: $\Pi_{p \in P}(2^{CPT} \times 2^{EL})^{|\cdot P \cdot|}$ are pattern contract assignments—one for each incoming and outgoing edge of the pattern, respectively—called the inbound and outbound contract assignment respectively. It is correct, if the underlying IPTG (P, E, type) is correct, and inbound contracts matches the outbound contracts of the patterns' predecessors, i.e. ($\forall$p)(p=start$\lor$/match(inContr(p),{outContr(p') |p'$\in \cdot$p}). Note that two IPCGs are isomorphic if there is a bijective function between their patterns that preserves edges, types, characteristics, and contracts.

Figure 8:
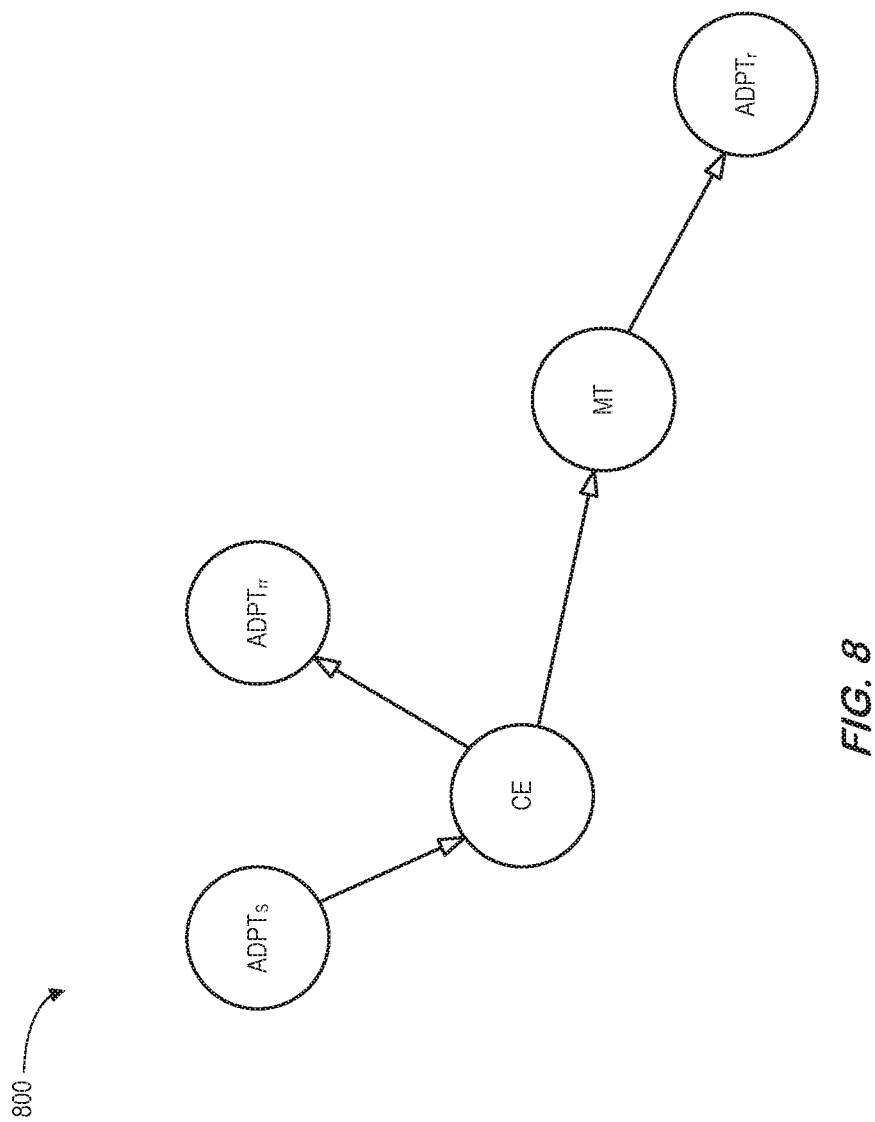
FIG. 8 is an example of an integration pattern contract graph in accordance with some embodiments.
Figure 9:
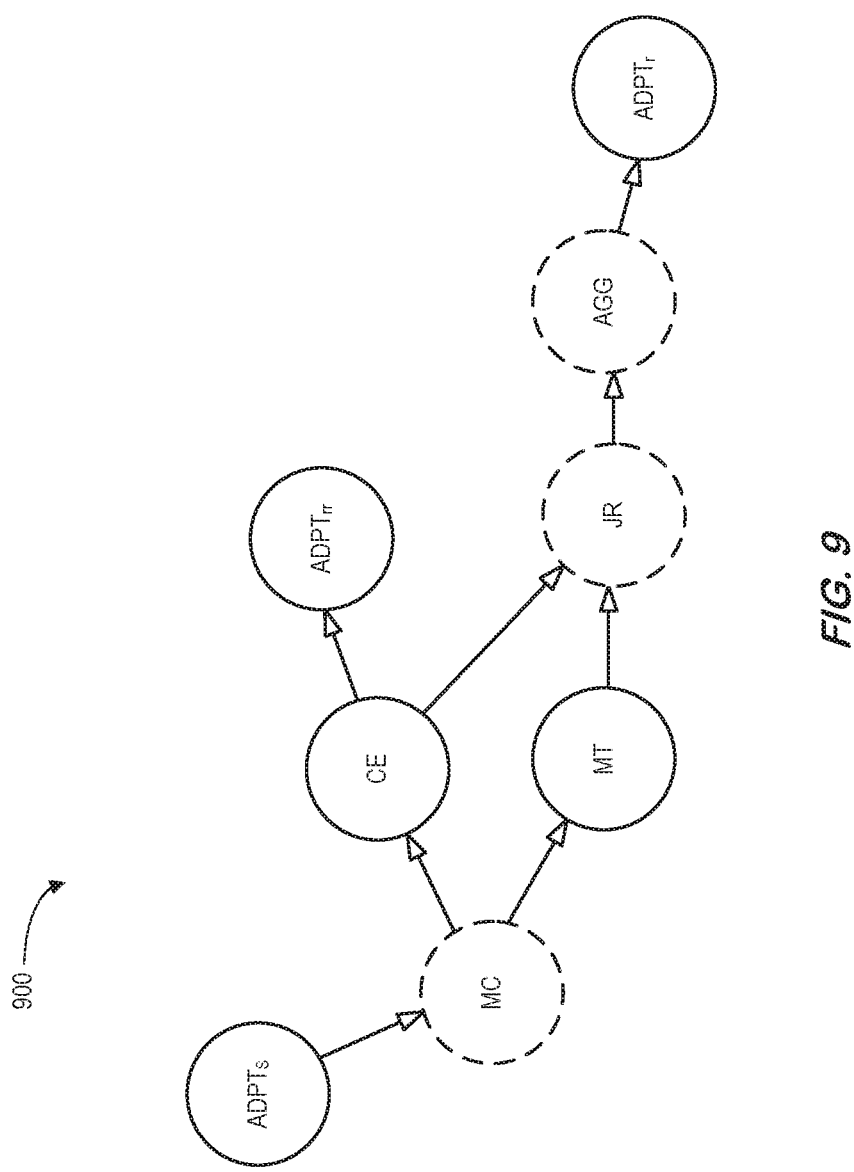
FIG. 9 is an integration pattern contract graph after a "sequence to parallel" optimization according to some embodiments.

FIG. 8 is an example of an IPCG 800 in accordance with some embodiments representing the original scenario with a focus on the contracts. FIG. 9 is an IPCG 900 after a "sequence to parallel" optimization according to some embodiments denoting an already improved composition showing the characteristics and giving an indication on the pattern latency. In FIG. 8, the input contract in Contr(CE) of the content enricher pattern CE requires a non-encrypted message and a payload element DOCNUM. The content enricher makes a query to get an application ID AppID from an external system, and appends it to the message header. Hence, the output contract outContr(CE) contains (HDR, {AppID}). The content enricher then emits a message that is not encrypted or signed. A subsequent message translator MT requires the same message payload, but does not care about the appended header. It adds another payload RcvID to the message. Comparing inbound and outbound pattern contracts for adjacent patterns, it can be seen that this is a correct IPCG 800.

One improvement of this composition is depicted in FIG. 9, where the independent patterns CE and MT have been parallelized. To achieve this, a read-only structural fork with channel cardinality 1:n in the form of a multicast MC has been added. The inbound and outbound contracts of MC are adapted to fit into the composition. After the concurrent execution of CE and MT, a join router JR brings the messages back together again and feeds the result into an aggregator AGG that restores the format that $ADPT_r$ expects. Note that the resulting IPCG 900 is still correct, so this would be a sound optimization.

Some embodiments may be associated with semantics using timed db-nets, timed db-nets with boundaries, etc. Consider a progression from pattern contract graphs to timed db-nets with b boundaries. Initially, a pattern composition may undergo graph definition to create a pattern contract graph. The pattern contract graph may then undergo a translation to create a time db-net with boundaries (in accordance with a timed db-net processed for boundary definitions).

As used herein, a "timed db-net" is a db-net $\mathcal{N}$, which is a $\mathcal{D}$-typed control layer $\mathcal{L}$, i.e., a tuple (P, T, $F_{in}$, $F_{out}$, color, query, guard, action), where: (i) $P=P_c \uplus P_v$ is a finite set of places partitioned into control places $P_c$ and view places $P_v$, (ii) T is a finite set of transitions, (iii) $F_m$ is an input flow from P to T, a normal output flow $F_{out}$ and a roll-back flow (iv) $F_{out}$ and $F_{rb}$ are respectively an output and roll-back flow from T to $P_c$ (v) color is a color assignment over P (mapping to a Cartesian product of data types), (vi) query is a query assignment from $P_v$ to Q (mapping the results of Q as tokens of $P_v$), (vii) guard is a transition guard assignment over T (mapping each transition to a formula over its input inscriptions), and (viii) action is an action assignment from T to A (mapping some transitions to actions triggering updates over the persistence layer).

The LTS of a timed $\Gamma^{\mathcal{B}}_{S_0} = \langle S, s_0, \rightarrow \rangle$, with the (possibly infinite) set of $\mathcal{B}$-snapshots S, the transition relation $\rightarrow \subseteq S \times T \times S$ over states, labeled by transitions T, and both S and $\rightarrow$ are defined by simultaneous induction as the smallest sets s.t.: (i) $s_0 \in S$; (ii) given a $\mathcal{B}$-snapshot $s \in S$, for every transition $t \in T$, binding $\sigma$, and $\mathcal{B}$-snapshot s', if $s[t, \sigma\rangle s'$ then $s' \in S$ and $$\underset{s \rightarrow s'}{t}.$$

Moreover, a $\mathcal{B}$-snapshot $\langle I, m \rangle$ is a database instance I and corresponding marking m in the net. A timed db-net has a special marking ($\cdot$, 0.0), with an age of value 0.0 appended.

A "timed db-net" may be defined as a tuple ($\mathcal{D}, \mathcal{P}, \mathcal{L}, \mathcal{N}$, $\tau$) with ($\mathcal{D}, \mathcal{P}, \mathcal{L}, \mathcal{N}$) a db-net, and $\tau: T \rightarrow \mathbb{Q}^{\geq 0} \times (\mathbb{Q}^{\geq 0} \cup \{\infty\})$, where T is the set of transitions from the control layer $\mathcal{N}$, and $\mathbb{Q}^{\geq 0}$ the set of non-negative rational numbers. For a transition t, let $\tau(t)=(v_1, v_2)$; $v_1 \leq v_2$ (with $v_1 \leq \infty$ always) may then be required.

The function $\tau$ in the definition is called a time assignment function. The default choice for $\tau$ is to map transitions to the pair $(0, \infty)$, which correspond to a standard db-net transition.

Given a transition t, adopt the following graphical conventions: (i) if $\tau(t)=(0, \infty)$, then no temporal label is shown for t; (ii) if $\tau(t)$ is of the form (v, v), attach label "[v]" to t; (iii) if $\tau(t)$ is of the form $(v_1, v_2)$ with $v_1 \neq v_2$, attach label "$[v_1, v_2]$" to t.

A "db-net" may be defined as a tuple ($\mathcal{D}, \mathcal{P}, \mathcal{L}, \mathcal{N}$), where:
$\mathcal{D}$ is a type domain—a finite set of data types $D=(\Delta_D, \Gamma_D)$, with the value domain $\Delta_D$ and a finite set of predicate symbols $\Gamma_D$.
$\mathcal{P}$ is a $\mathcal{D}$-typed persistence layer, i.e., a pair ($\mathcal{R}$, E), where $\mathcal{R}$ is a $\mathcal{D}$-typed database schema, and E is a finite set of first-order FO($\mathcal{D}$) constraints over $\mathcal{R}$.
$\mathcal{L}$ is a $\mathcal{D}$-typed data logic layer over $\mathcal{P}$, i.e., a pair (Q, A), where Q is a finite set of FO($\mathcal{D}$) queries over $\mathcal{P}$, and A is a finite set of actions over $\mathcal{P}$.
$\mathcal{N}$ is a $\mathcal{D}$-typed control layer $\mathcal{L}$, i.e., a tuple (P, T, $F_{in}$, $F_{out}$, $F_{rb}$, color, query, guard, action), where: (i) $P=P_c \uplus P_v$ is a finite set of places partitioned into control places $P_c$ and view places $P_v$, (ii) T is a finite set of transitions, (iii) $F_{in}$ is an input flow from P to T, (iv) $F_{out}$ and $F_{rb}$ are respectively an output and roll-back flow from T to $P_c$, (v) color is a color assignment over P (mapping P to a Cartesian product of data types), (vi) query is a query assignment from $P_v$ to Q (mapping the results of Q as tokens of $P_v$), (vii) guard is a transition guard assignment over T (mapping each transition to a formula over its input inscriptions), and (viii) action is an action assignment from T to A (mapping some transitions to actions triggering updates over the persistence layer).

Some timed db-nets may be considered "open," in the sense that they have "ports" or "open boundaries" for communicating with the outside world: tokens can be received and sent on these ports. Thus, a boundary configuration may be defined that records what is expected from the external world for the net to be functioning. This is not the most general notion of open db-nets, but it is general enough for these purposes.

A "boundary configuration" may be defined as follows. Let $\mathcal{D}$ be a type domain and $\mathcal{L}=(Q, A)$ a data layer respectively over it. A boundary configuration over ($\mathcal{D}, \mathcal{L}$) is an ordered finite list of colors:

$$c \in \{\mathcal{D}_1 \times \ldots \times \mathcal{D}_m | D_i \in \mathcal{D}\}$$

Such a list may be written as $c_1 \otimes \ldots \otimes c_n$, and I for the empty list.

The length of a boundary configuration list may give the number of "open ports" of the boundary. Each color c in the list may describe the type of data to be sent/received on the port. An open timed db-net has a left and a right boundary, both described by boundary configurations.

A "timed db-net with boundaries" may then be defined as follows. Let $\mathcal{D}, \mathcal{P}$, and $\mathcal{L}$ be a type domain, a persistence layer and a data layer respectively, and let $\otimes_{i<m} c_i$ and $\otimes_{i<n} c'$ be boundaries over $\mathcal{D}$, L. A control layer with left boundary $\otimes_{i<m} c_i$ and right boundary $\otimes_{i<n} c'_i$ is a tuple (P, T, $F_{in}$, $F_{out}$, $F_{rb}$, color, query, guard, action) which is a control layer over $\mathcal{L}$, except that $F_{in}$ is a flow from $P \uplus \{1, \ldots, m\}$ to T, and $F_{out}$ and $F_{rb}$ are flows from T to $P_c \uplus \{1, \ldots, n\}$, i.e., (i) $P=P_c \uplus P_v$ is a finite set of places partitioned into control places $P_c$ and view places $P_v$, (ii) T is a finite set of transitions, (iii) $F_{in}$ is an input flow from $P \uplus \{1, \ldots, m\}$ to T (assume color(i)=$c_i$), (iv) $F_{out}$ and $F_{rb}$ are respectively an output and roll-back flow from T to $P \uplus \{1, \ldots, n\}$ (assume color(j)=$c'_j$), (v) color is a color assignment over P (mapping P to a Cartesian product of data types), (vi) query is a query assignment from $P_v$ to Q (mapping the results of Q as tokens of $P_v$), (vii) guard is a transition guard assignment over T (mapping each transition to a formula over its input inscriptions), and (viii) action is an action assignment from T to A (mapping some transitions to actions triggering updates over the persistence layer). One may write $(\mathcal{D}, \mathcal{P}, \mathcal{L}, \mathcal{N}, \tau): \otimes_{i<m} c_i \to \otimes_{i<n} c'_i$ for timed db-nets with control layers with the given boundaries, and call such a tuple a "timed db-net with boundaries."

Note in particular that a timed db-net with empty boundaries is by definition a timed db-net. One can extend the $\otimes$ operation on colors to nets, by defining $N \otimes N'$: $\vec{c} \otimes \vec{c'} \to \vec{d} \otimes \vec{d'}$, for $N: \vec{c} \to \vec{d}$ and $N: \vec{c'} \to \vec{d'}$ to be the two nets N and N' next to each other this gives a tensor product or "parallel" composition of nets. The point of being explicit about the boundaries of nets is to enable also a "sequential" composition of nets, whenever the boundaries are compatible. The following definition uses the notation $X \uplus Y$ for the disjoint union of X and Y, with injections $in_X: X \to X \uplus Y$ and $in_Y: Y \to X \uplus Y$. For $f: X \to Z$ and $g: Y \to Z$, write $[f, g]: X \uplus Y \to X'$ for the function with $[f, g](in_X(x)) = f(x)$ and $[f, g](in_Y(y)) = g(y)$.

The term "synchronization" may then be defined as follows. Let $(\mathcal{D}, \mathcal{P}, \mathcal{L}, \mathcal{N}, \tau): \otimes_{i<m} c_i \to \otimes_{i<n} c'_i$ and $(\mathcal{D}', \mathcal{P}', \mathcal{L}', \mathcal{N}', \tau'): \otimes_{i<n} c'_i \to \otimes_{i<k} c''_i$. Their composition may be defined as:

$$(\mathcal{D} \cup \mathcal{D}', \mathcal{P} \cup \mathcal{P}', \mathcal{L} \cup \mathcal{L}'', \mathcal{N}'', \tau''):$$
$$\otimes_{i<m} c_i \to \otimes_{i<k} c_{i_i}''$$

(where a union of tuples is pointwise) with:

$\mathcal{N}'' = (P'', T'', F''_{in}, F''_{out}, F''_{rb}, color'', query'', guard'', action'')$ where:

$P'' = P \uplus P' \uplus \{x_1, \ldots, x_n\}$ $T'' = T \uplus T'$ $F''_{in} = \begin{cases} F_{in}(p, t) & \text{if}(x, y) = (in_p(p), in_T(t)) \\ F'_{in}(p', t') & \text{if}(x, y) = (in_{p'}(p'), in_{T'}(t')) \\ F'_{in}(j, t') & \text{if}(x, y) = (in_j, in_{T'}(t')) \\ \emptyset & \text{otherwise} \end{cases}$ $F''_{out} = \begin{cases} F_{out}(p, t) & \text{if}(x, y) = (in_p(p), in_T(t)) \\ F'_{out}(p', t') & \text{if}(x, y) = (in_{p'}(p'), in_{T'}(t')) \\ F'_{out}(j, t') & \text{if}(x, y) = (in_j, in_{T'}(t')) \\ \emptyset & \text{otherwise} \end{cases}$ $F''_{rb} = \begin{cases} F_{rb}(p, t) & \text{if}(x, y) = (in_p(p), in_T(t)) \\ F'_{rb}(p', t') & \text{if}(x, y) = (in_{p'}(p'), in_{T'}(t')) \\ F'_{rb}(j, t') & \text{if}(x, y) = (in_j, in_{T'}(t')) \\ \emptyset & \text{otherwise} \end{cases}$ $color'' = [color, color', x_i \mapsto c_i]$ $query'' = [query, query']$ $guard''(in_T(t)) = guard(t)$ $guard''(in_{T'}(t')) = guard'(t')$ $action'' = [action, action']$ $\tau'' = [\tau, \tau']$ The composed net consists of the two constituent nets, as well as n new control places $x_i$ for communicating between the nets. These places take their color from the shared boundary. Some embodiments may only use nets with boundaries to plug together open nets. In other words, only consider the execution semantics of nets with no boundary, and since these are literally ordinary timed db-nets, they can inherit their execution semantics from those. Composition of nets behaves as expected: it is associative, and there is an "identity" net which is a unit for composition. All in all, this means that nets with boundaries are the morphisms of a strict monoidal category as follows.

For any timed db-nets N, M, K with compatible boundaries, there may be N $(M \circ K) = (N \circ M) \circ K$, and for each boundary configuration $c_1 \otimes \ldots \otimes c_n$, there is an identity net $id_c: c_1 \otimes \ldots \otimes c_n \to c_1 \otimes \ldots \otimes c_n$ such that $id_c \circ N = N$ and $id_c \circ M = M$ for every M, N with compatible boundaries. Furthermore, for every N, M, K, there may be $N \otimes (M \otimes K) = (N \otimes M) \otimes K$. As proof of such a statement, note that that associativity for both $\circ$ and $\otimes$ is obvious. The identity net for $c_1 \otimes \ldots \otimes c_n$ is the net with exactly n places $x_1, \ldots, x_n$, with $color(x) = c_i$. As a result, one can use a graphical "string diagram" language to define nets and their compositions.

Consider now the translation of IPCGs to timed db-nets. First assign a timed db net with boundaries $[\![ p ]\!]$ for every node p in an IPCG. Which timed db-net with boundaries is to be constructed depends on type(p). If the cardinality of p is k:m, then the timed db net with boundaries will be of the form $[\![ p ]\!]: \otimes_{i=1}^{k} color_{in}(p)_i \to \otimes_{j=1}^{m} color_{out}(p)_j$ where the colors $color_{in}(p)_i$ and $color_{out}(p)_j$ are defined depending on the input and output contracts of the pattern respectively:

$$color_{in}(p)_i = \prod_{(k, X) \in inContr_i(p)_{EL}} \left(k, \prod_{x \in X} x\right)$$

$$color_{out}(p)_j = \prod_{(m, X) \in outContr_j(p)_{EL}} \left(m, \prod_{x \in X} x\right)$$

This incorporates the data elements of the input and output contracts into the boundary of the timed db-net, since these are essential for the dataflow of the net. Note that one may also incorporate the remaining concepts from the contracts such as signatures, encryption, and encodings into the translation. More precisely, the concrete characteristics required for the translation of type type(p) and pattern category p from the IPTG definition:

$$type(p) = \begin{cases} start \| end & \{\} \\ fork & \{\} \\ condition & \{(CND, \{cnd_1, \ldots, cnd_n\})\} \\ join & \{\} \\ merge & \{(CND, \{cnd_{cr}, cnd_{cc}\}), (PRG, prg_{agg}, (v_1, v_2))\} \\ ext.call & \{(PRG, prg_1, \_)\} \\ mp & \{(CND, \{cnd_1, \ldots, cnd_m\}), (PRG, prg_1, (v_1, v_2))\} \\ & \text{otherwise} \end{cases}$$

Since the pattern categories subsume all relevant patterns, one may subsequently define the translation for each pattern category and specify timed db-net with boundary templates for each of the pattern categories.

Figure 10:
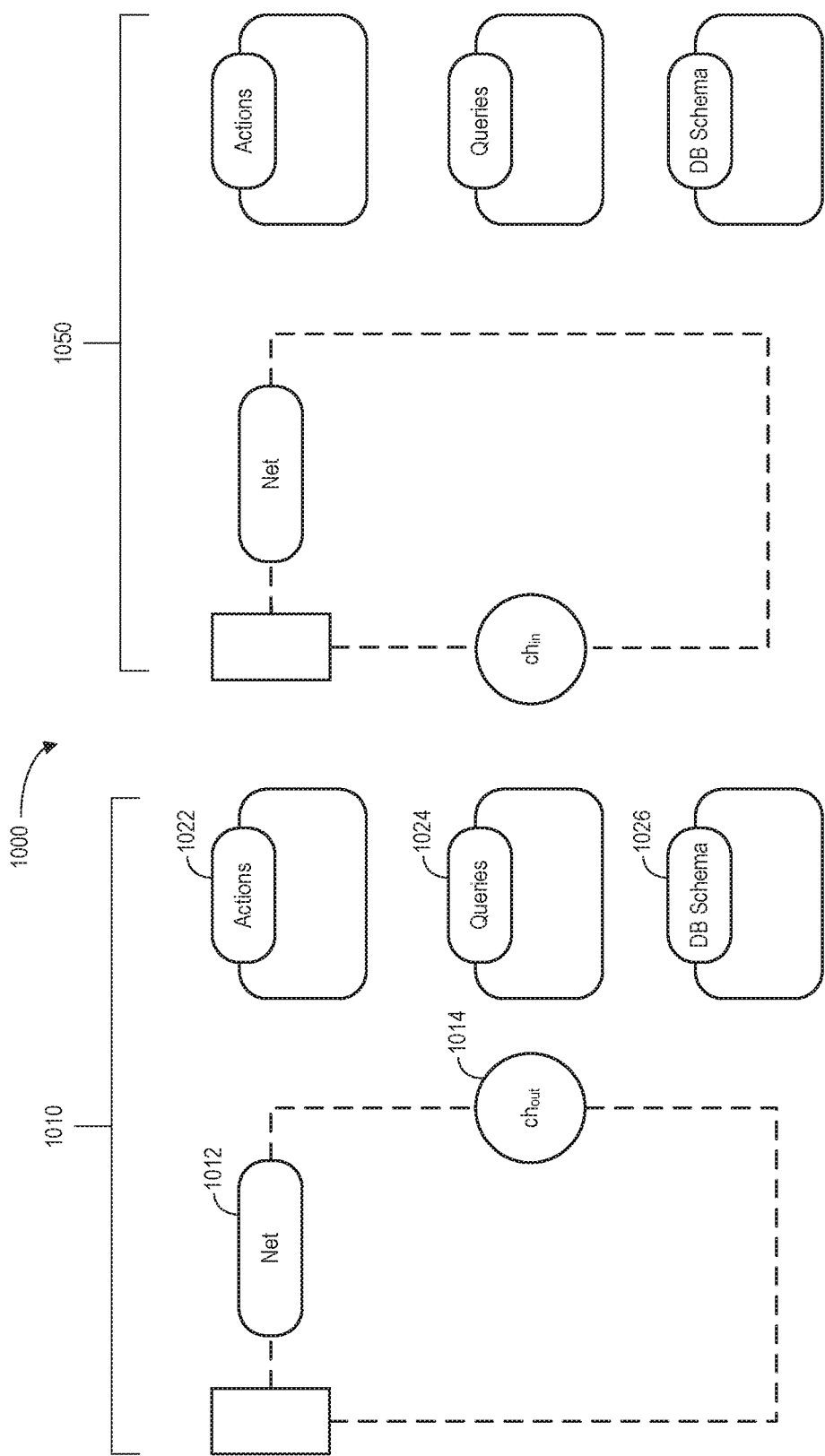
FIG. 10 illustrates start and end patterns in accordance with some embodiments.

FIG. 10 illustrates start and end patterns 1000 in accordance with some embodiments. For start and end pattern types, translate a start pattern $p_{start}$ into a timed db-net with boundary $[\![ p_{start} ]\!]: I \to color_{out}(p_{start})$ as shown by start elements 1010 in FIG. 10, including net 1012, $ch_{out}$ 1014, actions 1022, queries 1024, and DB schema 1026. Similarly, end elements 1050 show the translation of an end pattern $p_{end}$ into a timed db-net with boundary $[\![ p_{end} ]\!]: color_{in}(p_{end}) \to I$.

Figure 11:
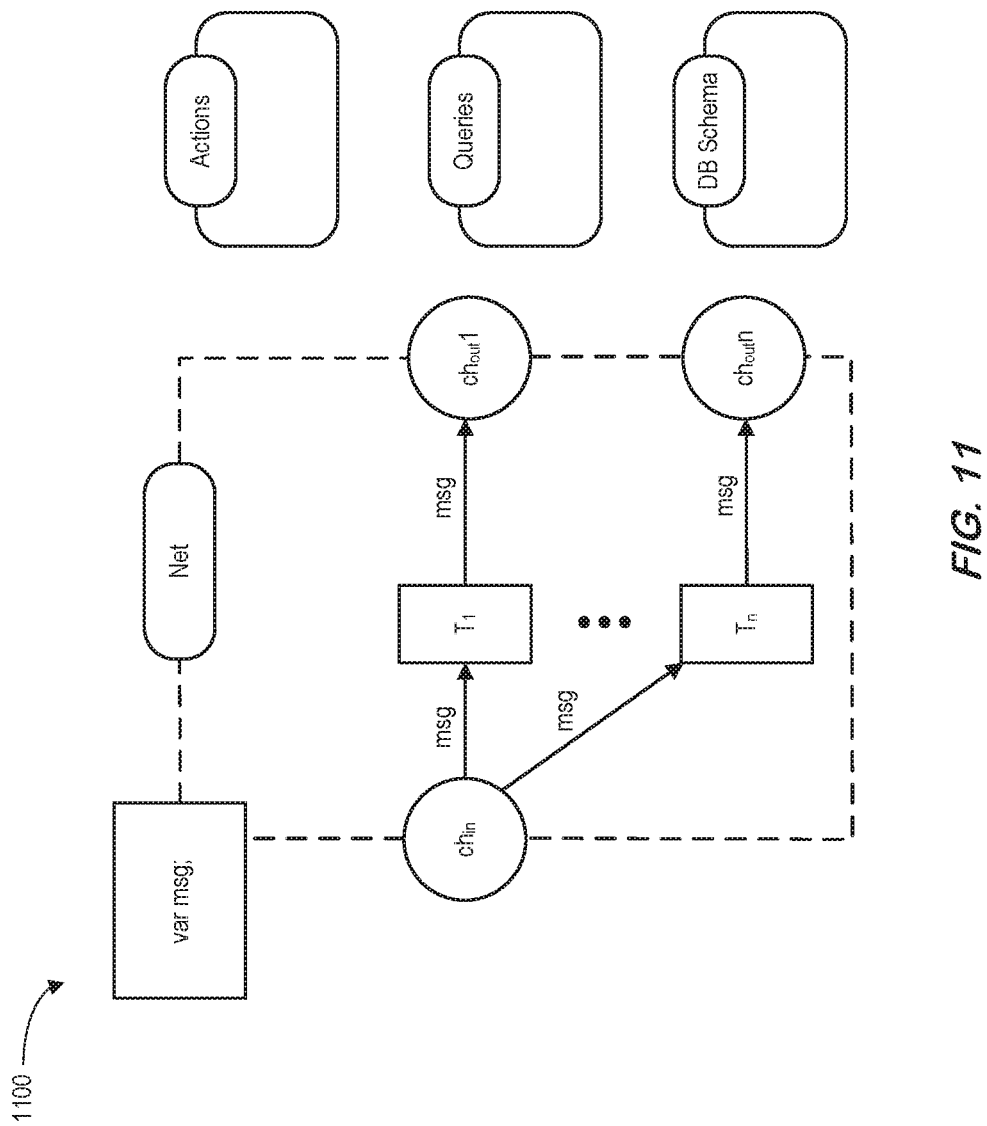
FIG. 11 illustrates translation of an unconditional fork pattern according to some embodiments.

FIG. 11 illustrates 1100 translation of an unconditional fork pattern according to some embodiments. For non-conditional fork patterns, translate a non-conditional fork pattern $p_{fork}$ with cardinality 1:n to the timed db-net with boundaries $[\![ p_{fork} ]\!]$ :$color_{in}(p_{fork}) \to \otimes_{j=1}^{n} color_{out}(p_{fork})_j$ as shown in FIG. 11.

Figure 12:
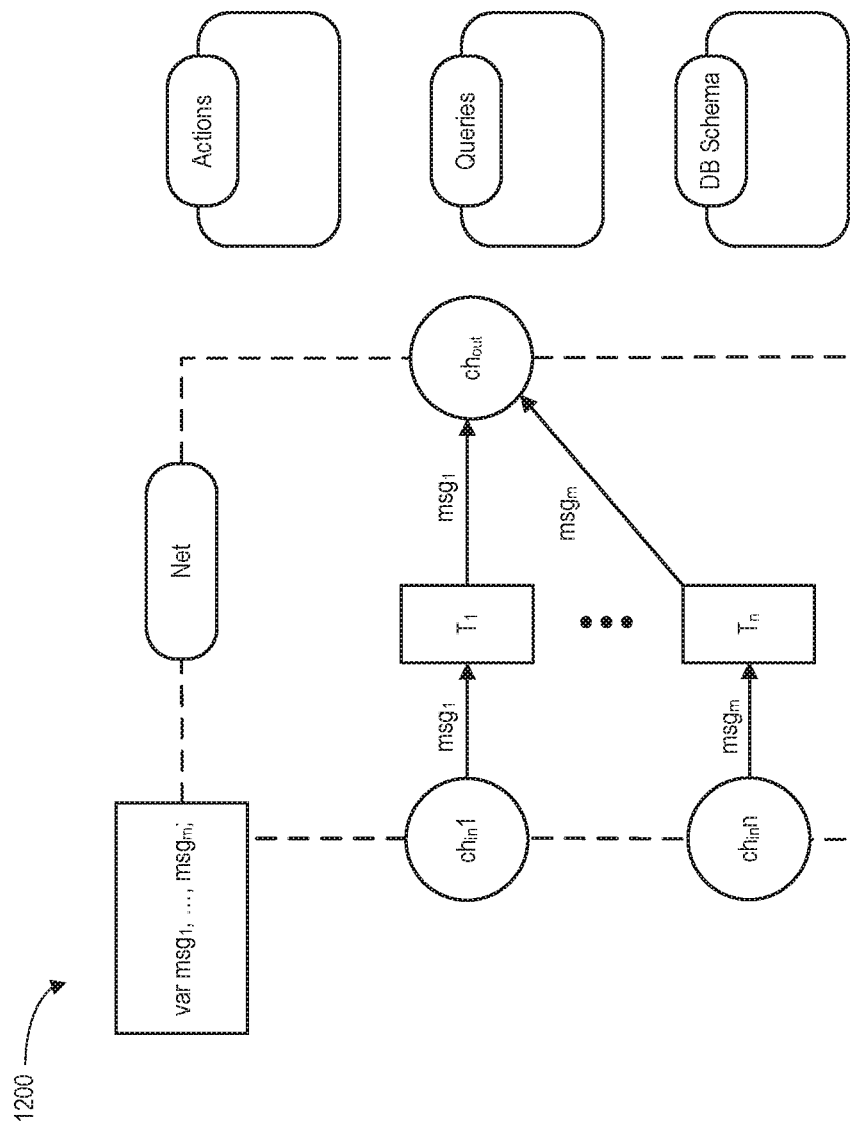
FIG. 12 illustrates translation of an unconditional join pattern in accordance with some embodiments.

FIG. 12 illustrates 1200 translation of an unconditional join pattern in accordance with some embodiments. For non-conditional join patterns, translate a non-conditional join pattern $p_{join}$ with cardinality m:1 to the timed db-net with boundaries $[\![ p_{join} ]\!]$ :$\otimes_{j=1}^{m} color_{in}(p_{join})_j \to color_{out}(p_{join})$ as shown in FIG. 12.

Figure 13:
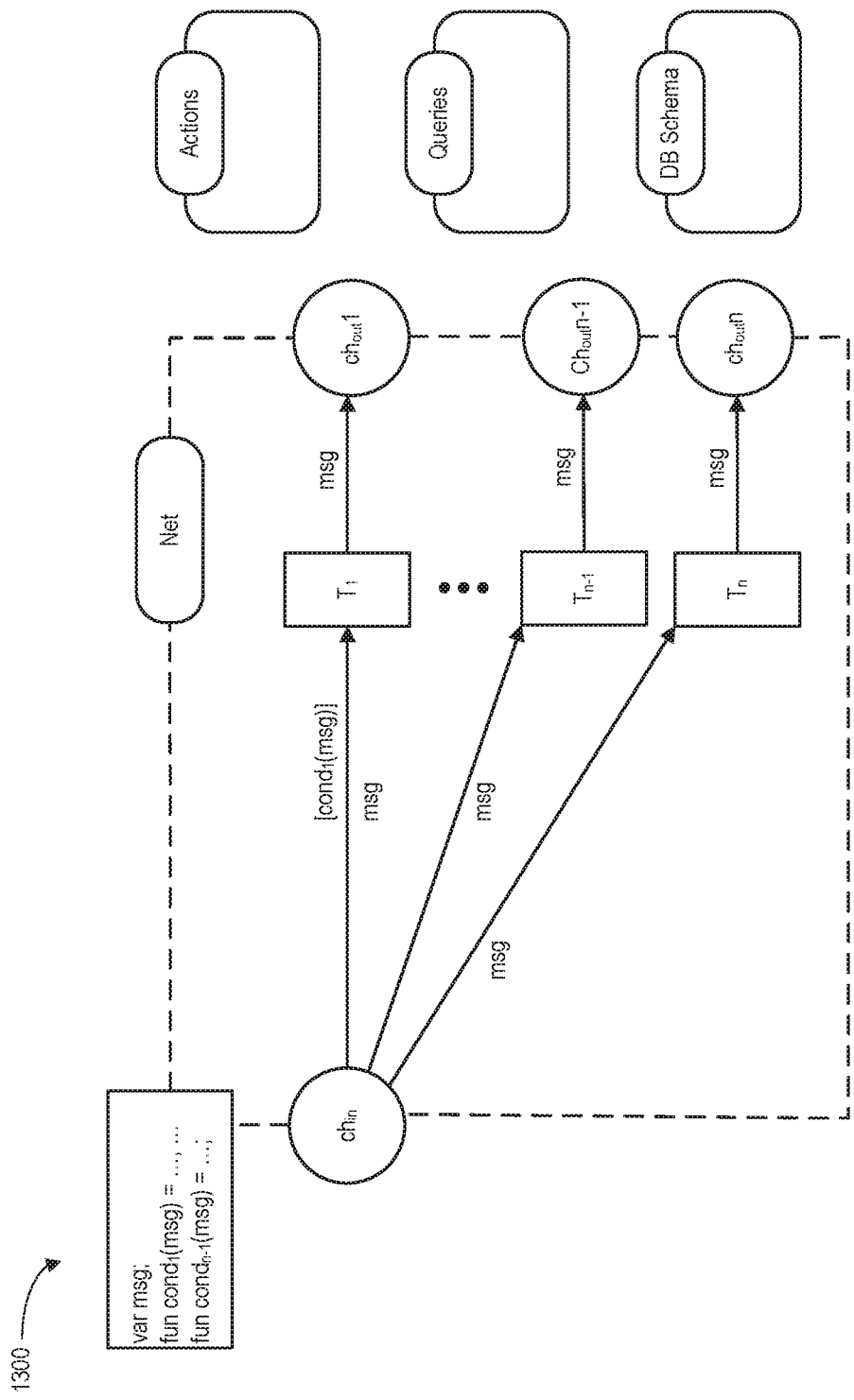
FIG. 13 illustrates translation of a conditional fork pattern according to some embodiments.

FIG. 13 illustrates 1300 translation of a conditional fork pattern according to some embodiments. For conditional fork patterns, translate a conditional fork pattern $p_{cfork}$ of cardinality 1:n with $cond_1, \ldots, cond_{n-1}$ to the timed db-net with boundaries $[\![ p_{cfork} ]\!]$ : $color_{in}(p_{cfork}) \to \otimes_{j=n}^{n} color_{out}(p_{cfork})_j$ as shown in FIG. 13. Note that net is constructed so that the conditions are valuated in order—the transition corresponding to condition k will only fire if condition k is true, and $cond_1, \ldots, cond_{k-1}$ are false. The last transition will fire if all conditions evaluate to false.

Figure 14:
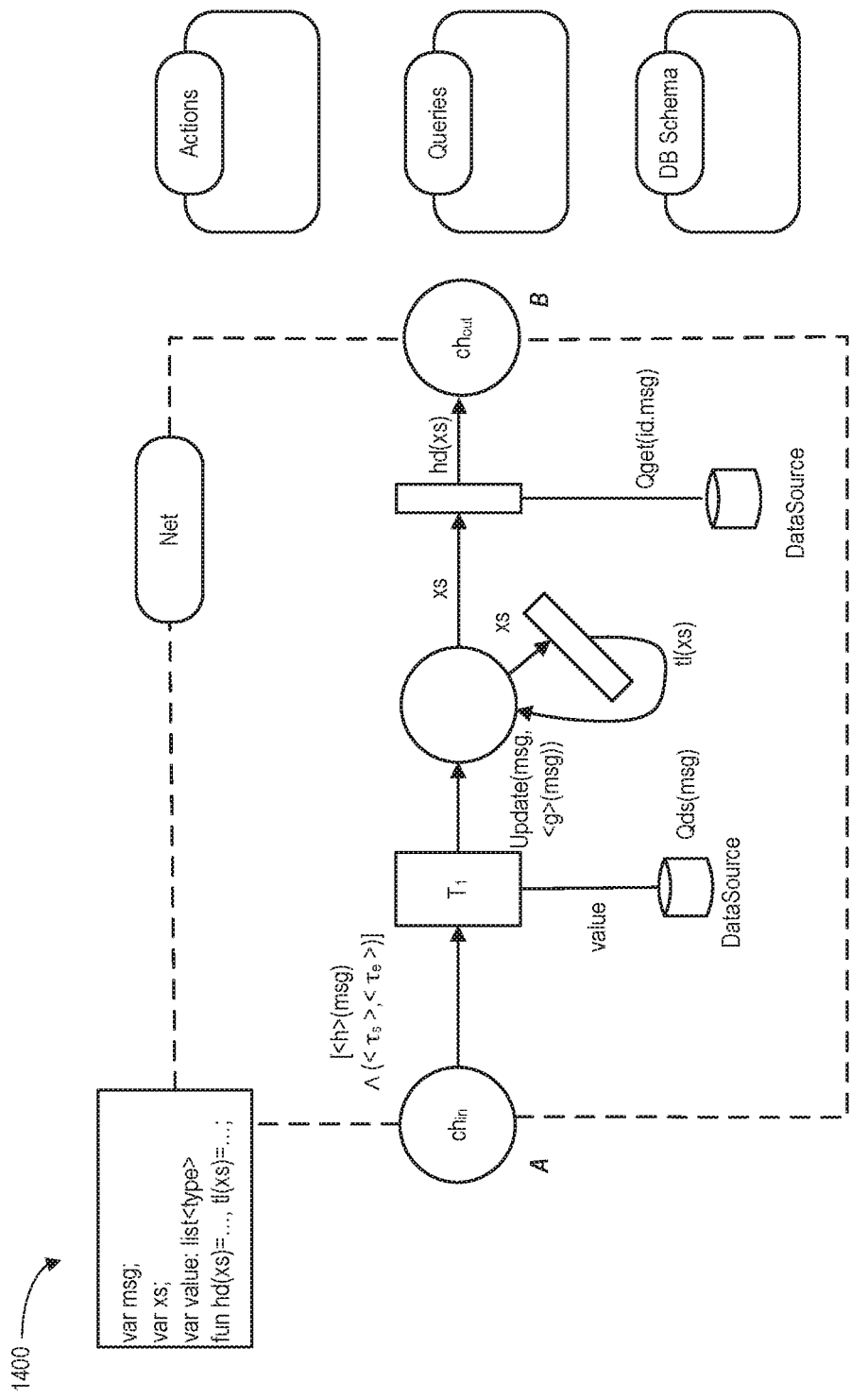
FIG. 14 illustrates translation of a message processor pattern in accordance with some embodiments.

FIG. 14 illustrates 1400 translation of a message processor pattern in accordance with some embodiments. For message processor patterns, translate a message processor pattern $p_{mp}$ with persistent state DB and processor function $f$ to the timed db-net with boundaries $[\![ p_{mp} ]\!]$ :$color_{in}(p_{mp}) \to color_{out}(p_{mp})$ as shown in FIG. 14. with parameter function g:<EL>→<TYPE>, and with hd the head and tl the tail of a list in CPNs, INS the insert list function, and all parameters in < >. Note that such a template may cover a wide range of 1:1 patterns, including control-only, control-resources, control-time, etc.

Figure 15:
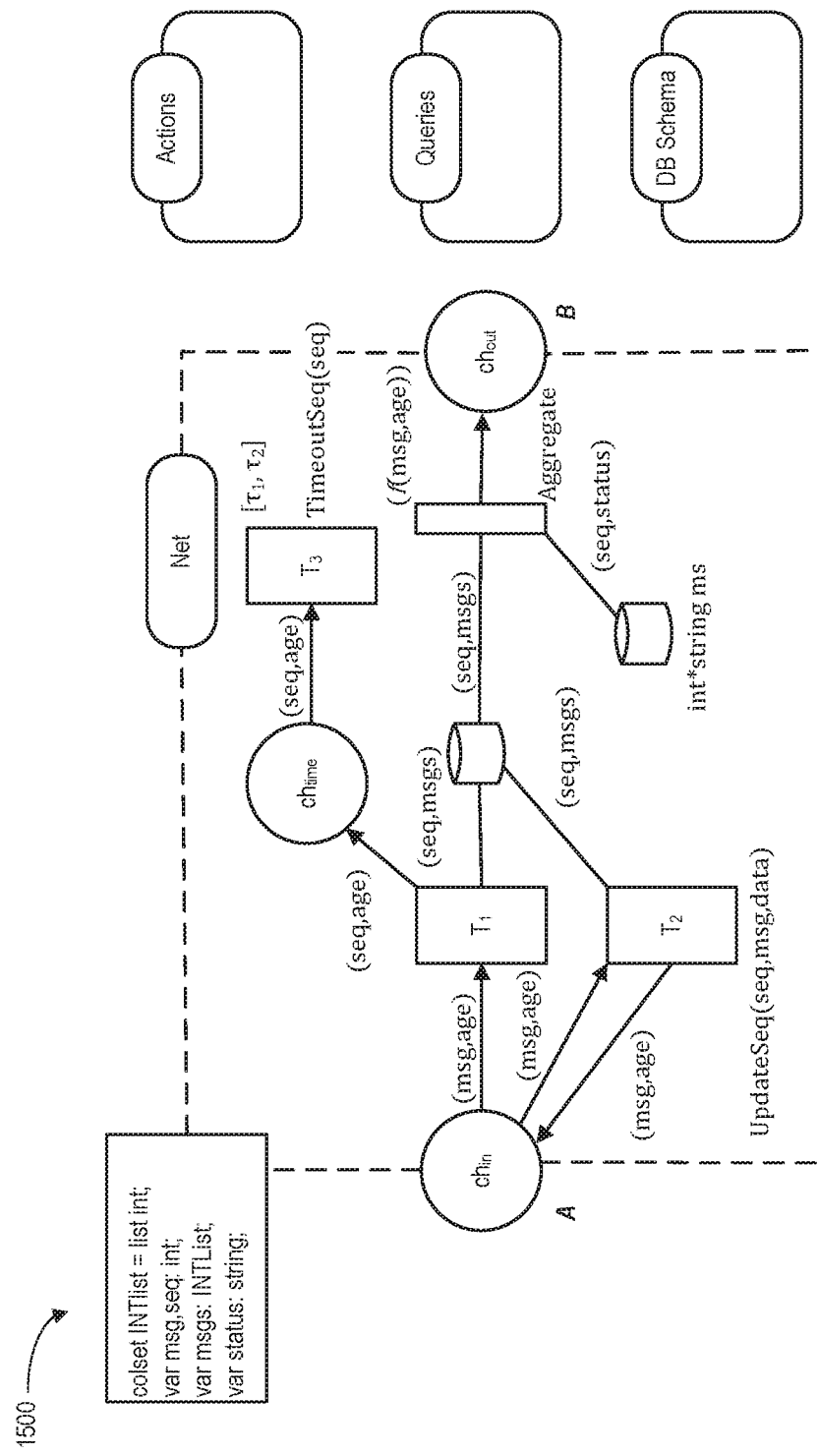
FIG. 15 illustrates translation of a merge pattern according to some embodiments.

FIG. 15 illustrates 1500 translation of a merge pattern according to some embodiments. For merge patterns, translate a merge pattern p merge with aggregation function f and time out τ to the timed db-net with boundaries $[\![ p_{merge} ]\!]$ :$color_{in}(p_{merge}) \to color_{out}(p_{merge})$ as shown in FIG. 15, where contains(msg, msgs) is defined to be the function that checks if msg occurs in the list msgs. Briefly, the net works as follows: the first message in a sequence makes transition T1 fire, which creates a new database record for the sequence, and starts a timer. Each subsequent message from the same sequence gets stored in the database using transition T2, until τ seconds has elapsed, which will fire transition T3. The action associated to T3 will make the condition for the aggregate transition true, which will retrieve all messages msgs and then put $f$(msgs) in the output place of the net.

Figure 16:
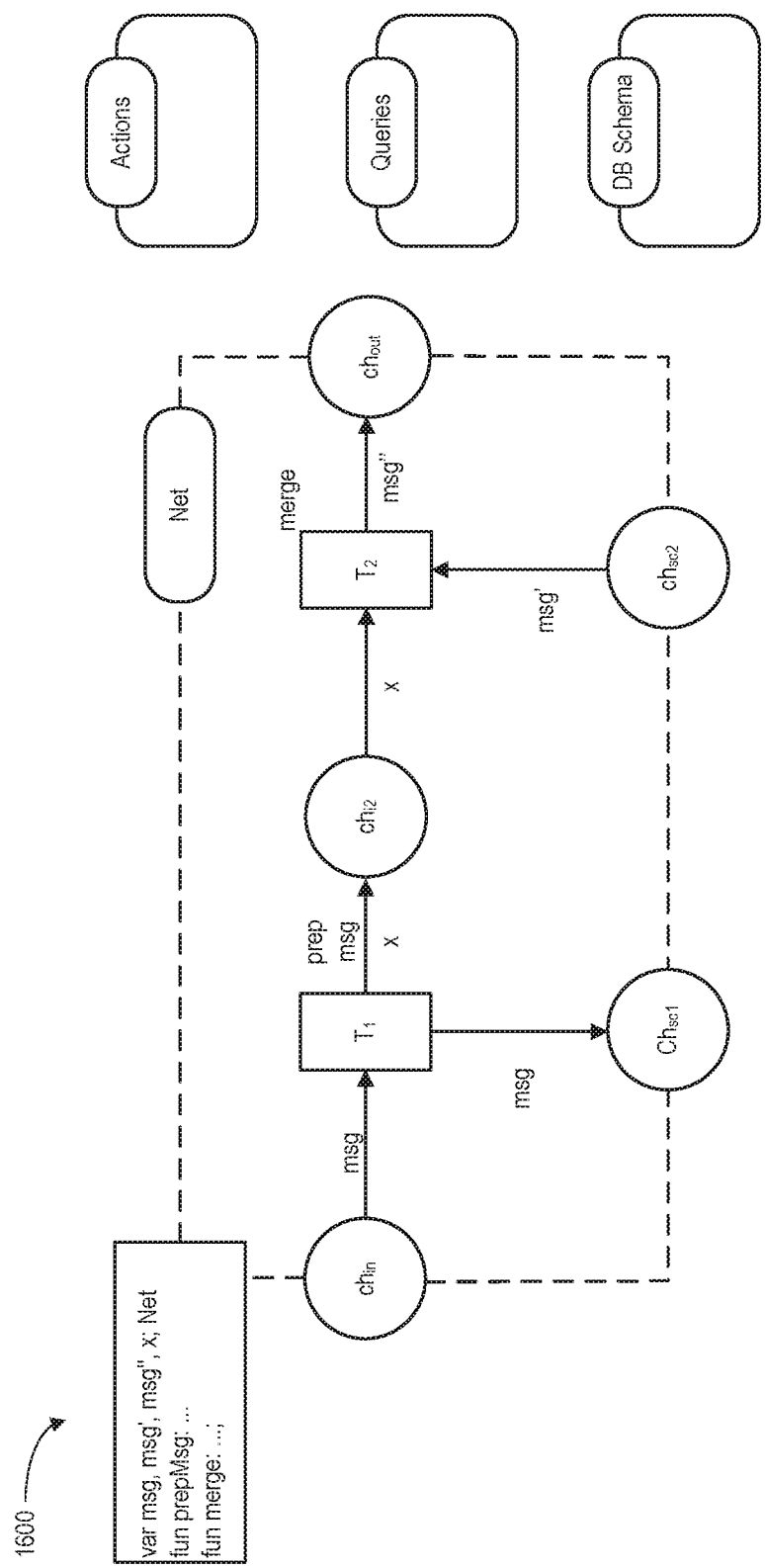
FIG. 16 illustrates translation of an external call pattern in accordance with some embodiments.

FIG. 16 illustrates 1600 translation of an external call pattern in accordance with some embodiments. For external call patterns, translate an external call pattern $p_{call}$ to the timed db-net with boundaries $[\![ p_{call} ]\!]$ :$color_{in}(p_{call}) \to color_{out}(p_{call})_1 \otimes color_{out}(p_{call})_2$ as shown in FIG. 16.

Now consider how to translate not just individual nodes from an IPCG, but how to also take the edges into account. Recall that a pattern contract also represents concepts, i.e., properties of the exchanged data (e.g., if a pattern is able to process or produce signed, encrypted, or encoded data). A message can only be sent from one pattern to another if their contracts match, i.e., if they agree on these properties. To reflect this in the timed db-nets semantics, enrich all color sets to also keep track of this information: given a place P with color set C, construct the color set C×{yes, no}³, where the color(x, $b_{sign}$, $b_{encr}$, $b_{enc}$) is intended to mean that the data value x is respectively signed, encrypted, and encoded (or no)t according to the yes/no values $b_{sign}$, $b_{encr}$, and $b_{enc}$.

To enforce the contracts, also make sure that every token entering an input place $ch_{in}$ is guarded according to the input contract by creating a new place $ch_{in}'$ and a new transition from $ch_{in}'$ to $ch_{in}$, which conditionally copies tokens whose properties match the contract. The new place $ch_{in}'$ replaces $ch_{in}$ as an input place. Dually, for each output place $ch_{out}$ create a new place $ch_{out}'$ and a new transition from $ch_{out}$ to $ch_{out}'$ which ensures that all tokens satisfy the output contract. The new place $ch_{out}'$ replaces chow as an output place. Formally, the construction is as follows:

Let $X=(\mathcal{D}, \mathcal{P}, \mathcal{L}, \mathcal{N}, \tau):\otimes_{i<m} c_i \to \otimes_{i<n} c_i'$ be a timed db-net with boundaries and $\vec{C}=IC_0, \ldots, IC_{m-1}, OC_0, \ldots, OC_{n-1}) \in CPT$. Define the time db-net with boundaries $X_{CPT(\vec{C})} = (\mathcal{D}, \mathcal{P}, \mathcal{L}, \mathcal{N}', \tau) \otimes_{i<m}(c_i \times \{yes, no\}^3) \to \otimes_{i<n} c_i \times \{yes, no\}^3$ with $$\mathcal{N}' = (P', T', F'_{in}, F'_{out}, F'_{rb}, color', query, guard', action')$$

where $$P' = P \uplus \{x_1', \ldots x_m'\} \uplus \{y_1', \ldots y_n'\}$$

$$T' = T \uplus \{t_1, \ldots, t_m\} \uplus \{t_1', \ldots t_n'\}$$

$$color' = [color'', x_i' \mapsto color''(x_i), y_j' \mapsto color''(y_j)]$$

where $$color''(x) = color(x) \times \{yes, no\}^3$$

$$F'_{in}(a, b) = \begin{cases} F_{in}(p, t) & \text{if } (a, b) = (in_P(p), in_T(t)) \\ \{(x, y_{sign}, y_{encr}, y_{enc})\} & \text{if } (a, b) \in \{x_i', t_i\}, (y_j', (t_j')) \\ \emptyset & \text{otherwise} \end{cases}$$

$$F'_{out}(x, y) = \begin{cases} F_{out}(p, t) & \text{if } (a, b) = (in_P(p), in_T(t)) \\ \{(x, y_{sign}, y_{encr}, y_{enc})\} & \text{if } (a, b) \in (x_i', t_i) \\ \{(x, b_{sign}, b_{encr}, b_{enc})\} \mid \\ (\forall p)(OC_j)_{CPT}(p) \in \{b_p, any\} & \text{if } (a, b) \in (y_j', (t_j')) \\ \emptyset & \text{otherwise} \end{cases}$$

$$F'_{rb}(x, y) = \begin{cases} F_{rb}(p, t) & \text{if } (x, y) = (in_P(p), in_T(t)) \\ \emptyset & \text{otherwise} \end{cases}$$

$$guard' = \left[guard, t_i \mapsto \bigwedge_{\{p \mid (IC_i)_{CP}(p) \neq any\}} y_p = (IC_i)_{CPT}(p), t_j' \mapsto T\right]$$

$$action' = [action, t_i \mapsto -, t_j' \mapsto -]$$

$$\tau' = [\tau, t_i \mapsto [0, \infty], t_j' \mapsto [0, \infty]]$$

Figure 17:
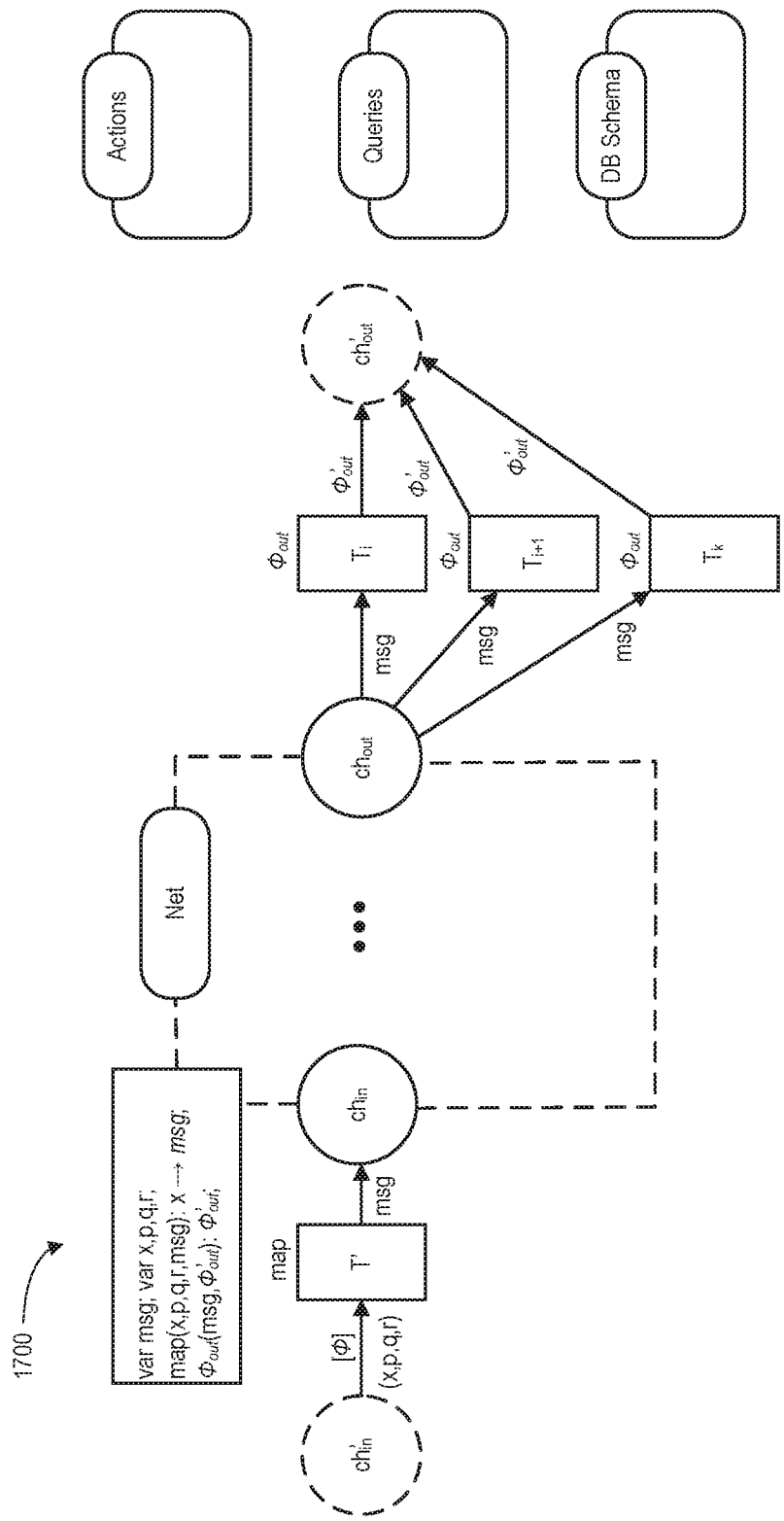
FIG. 17 is a 1:1 pattern contract construction according to some embodiments.
Figure 18:
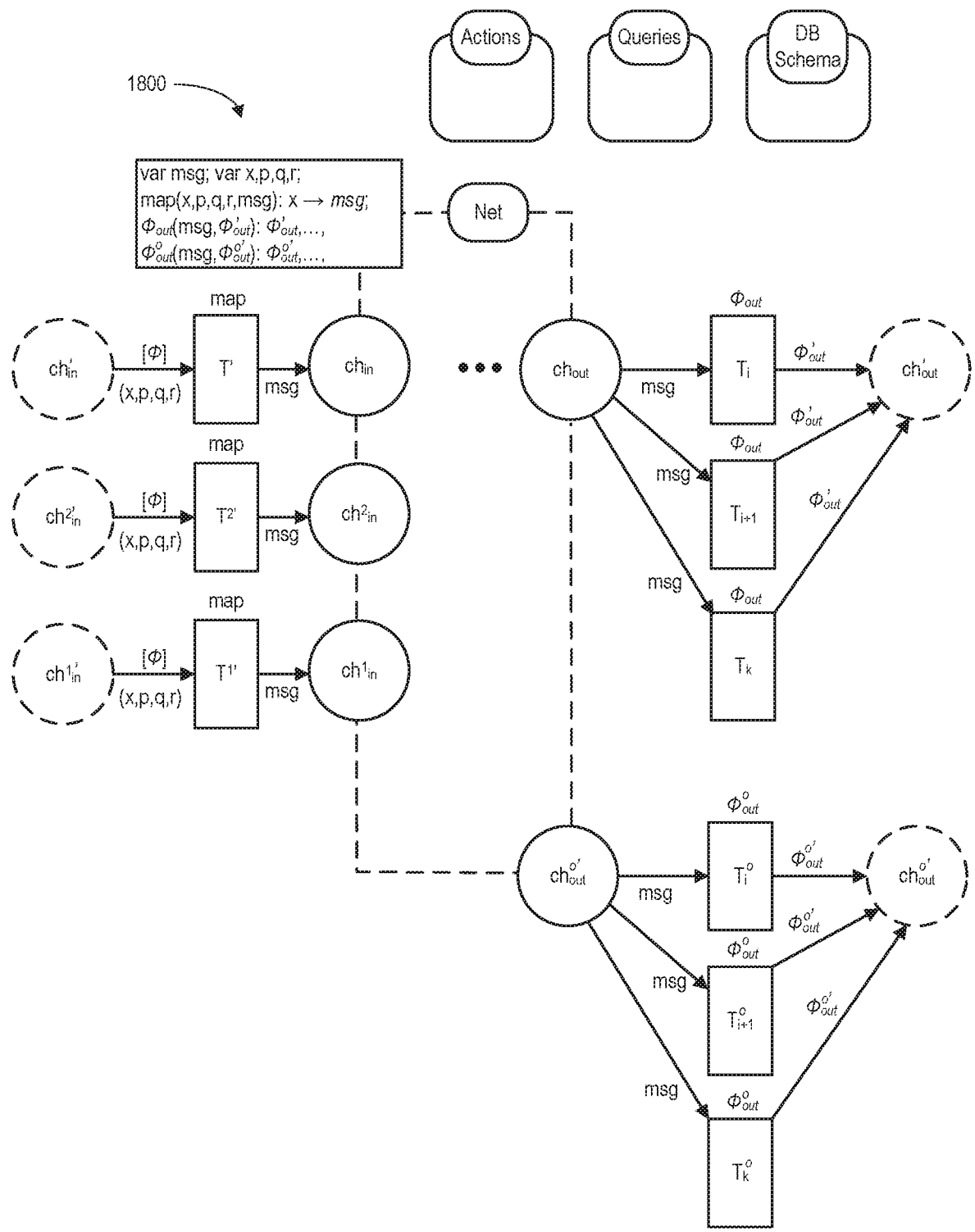
FIG. 18 is a 1:o pattern contract construction in accordance with some embodiments.

The pattern contract construction can again be realized as template translation on an inter pattern level. The templates in FIGS. 17 and 18 denote the translation schemes 1700, 1800 for the construction of a one-to-one message processor and a many-to-many pattern category, respectively. In case of the message processor, a token(x, p, q, r) of color(x, $b_{sign}$, $b_{encr}$, $b_{enc}$) with the actual data x and the signed p, encrypted q, and encoded r information are in the boundary place $ch_{in}'$ and consumed by the boundary transition T, if the guard φ on (p, q, r) is satisfied that is configured precisely according to the contracts of the IPCG pattern. On firing, the transition removes this meta information and emits the actual message x→msg to the actual pattern. After the unaltered pattern processing, the boundary transitions $T_1, \ldots, T_k$ (i.e., depending on the any-logic), supply (p, q, r) information specific for the pattern. The resulting token $φ_{out}'$ out are then the input for the subsequent pattern. Similarly, the outbound message of the many-to-many category is encoded for each of the o outgoing $ch_{out}, ch_{out}^2, \ldots, ch_{out}^o$ as well as the l incoming message channels $ch_{in}, ch_{in}^2, \ldots, ch_{in}^l$. The templates for zero-to-one, one-to-zero, one-to-many and many-to-zero boundaries may follow the same construction mechanism. Note that if $X: \otimes_{i=1}^{m} c_i \rightarrow \otimes_{j=1}^{n} c_j'$ then $X_{CPT(\vec{C})}: \otimes_{i=1}^{m} c_i \rightarrow \otimes_{j=1}^{n} c_j'$ for every choice of contracts $\vec{C}$.

Figure 19:
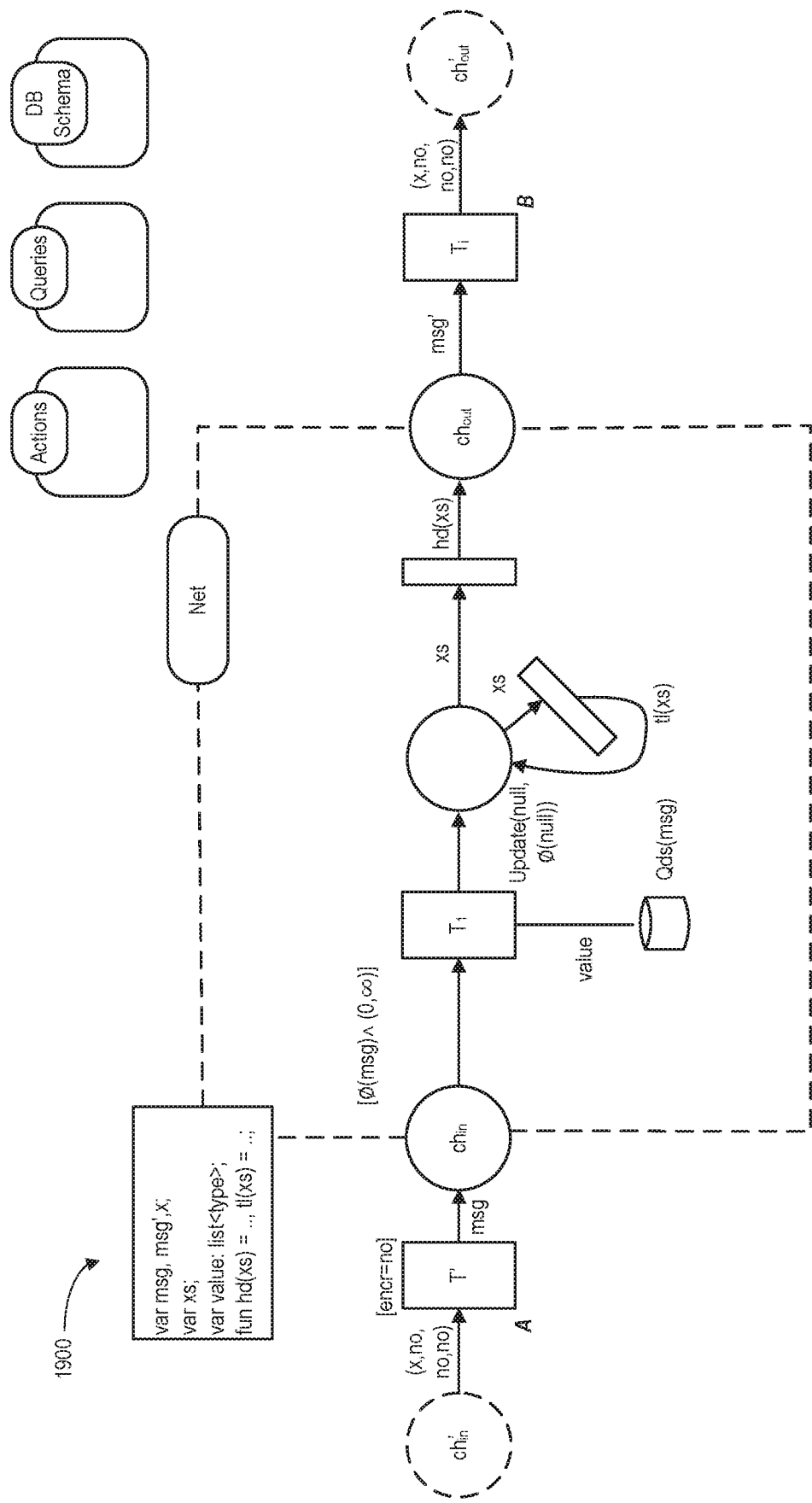
FIG. 19 is an example of message translator construction according to some embodiments.

Consider two examples to gain an understanding of the construction. FIG. 19 shows $MT_{CPT(ENCR=no, \ldots)}$ for a message translator pattern MT 1900 with input contract {(ENC, no), (ENCR, no), (SIGN, any)} and output contract {(ENC, no), (ENCR, no), (SIGN, any)}. The input transition T' hence checks the guard[x, no, any, no], and if it matches, the token is forwarded to the actual message translator. After the transformation, the resulting message msg' is not encrypted, the signing is invalid, and not encoded, and thus emits (x, no, no, no).

Figure 20:
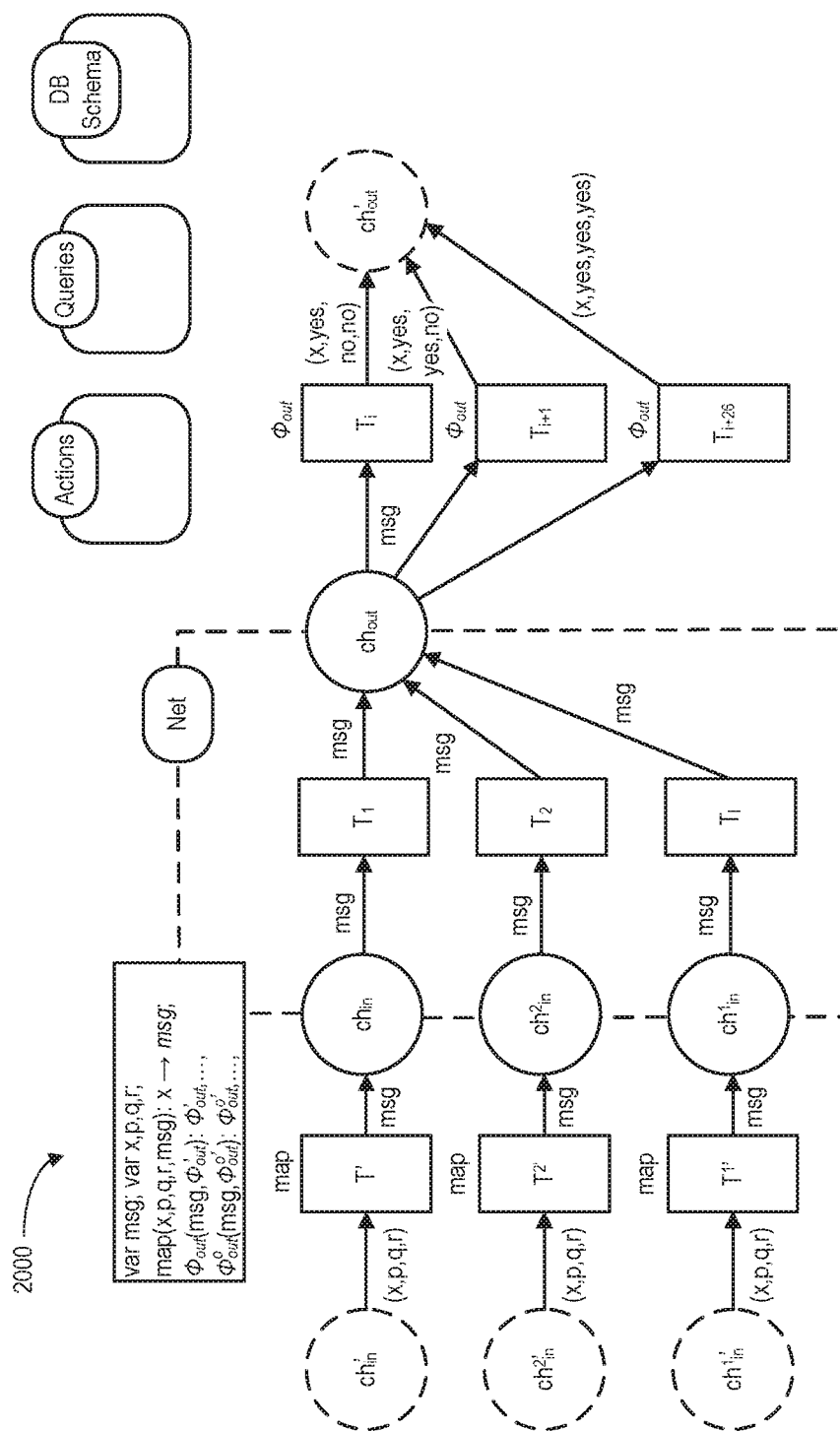
FIG. 20 is an example of join router construction in accordance with some embodiments.

A join router may structurally combine many incoming to one outgoing message channel without accessing the data (cf.{(MC, 1:1), (ACC, ro), (MG, false), (CND, Ø)}). While the data format (i.e., the data elements EL) has to be checked during the composition of the boundary, the runtime perspective of the boundary (x, p, q, r) is any for x, p, q in the input and output. FIG. 20 shows the resulting boundary construction 2000 for the join router. The input boundary does not enforce CPT constraints, and thus no guards are defined for the transitions. The output boundary, however, has to deal with the three CPT properties p, q, r set to {yes, no}, resulting in 27 different permutations.

With respect to synchronizing pattern compositions and determining the correctness of a translation, define the full translation of a correct IPCG G. For the translation to be well-defined, only data element correctness of the graph is needed. Concept correctness may be used to show that in the nets in the image of the translation, tokens can always flow from the translation of the start node to the translation of the end node.

Let a correct integration pattern contract graph G be given. For each node p, consider the timed db-net:

$$[\![p]\!]_{CPT(inContr(p),outContr(p))} : \bigoplus_{i=1}^{k} color_{in}(p)_m \rightarrow \bigoplus_{j=1}^{m} color_{out}(p)_j$$

The graphical language previously enabled can be used to compose these nets according to the edges of the graph. The resulting timed db-net is then well-defined, and has the option to complete, i.e., from each marking reachable from a marking with a token in some input place, it is possible to reach a marking with a token in an output place. Since the graph is assumed to be correct, all input contracts match the output contracts of the nets composed with it, which by the data element correctness means that the boundary configurations match, so that the result is well-defined.

To see that the constructed net also has the option to complete, first note that the interpretations of basic patterns described herein do (in particular, one transition is always enabled in the translation of a conditional fork pattern in FIG. 13, and the aggregate transition will always be enabled after the timeout in the translation of a merge pattern in FIG. 15). By the way the interpretation is defined, all that remains to show is that if N and N' have the option to complete, then so does $N_{CPT(\vec{C})} \circ N_{CPT(\vec{C})'}$, if the contracts $\vec{C}$ and $\vec{C}'$ match. Assume a marking with a token in an input place of N'. Since N' has the option to complete, a marking with a token in an output place of N' is reachable, and since the contracts match, this token will satisfy the guard imposed by the $N_{CPT(\vec{C})}$ construction. Hence, a marking with a token in an input place of N is reachable, and the statement follows, as N has the option to complete.

Embodiments may be used to evaluate the translation in two case studies of real-world integration scenarios: the replicate material scenario and a predictive machine maintenance scenario. The former is an example of hybrid integration, and the latter of device integration. The aim is to observe different aspects of the following hypotheses:

H1 The integration pattern contract graphs allow for structurally correct compositions.

H2 The execution semantics of the translated timed db-net with boundaries is consistent.

For each of the scenarios, give an IPCG with matching contracts ($\rightarrow$H1), translate it to a timed db-net with boundaries, and show how its execution can be simulated ($\rightarrow$H2). The scenarios are both taken from a cloud platform integration solution catalog of reference integration scenarios.

Figure 21:
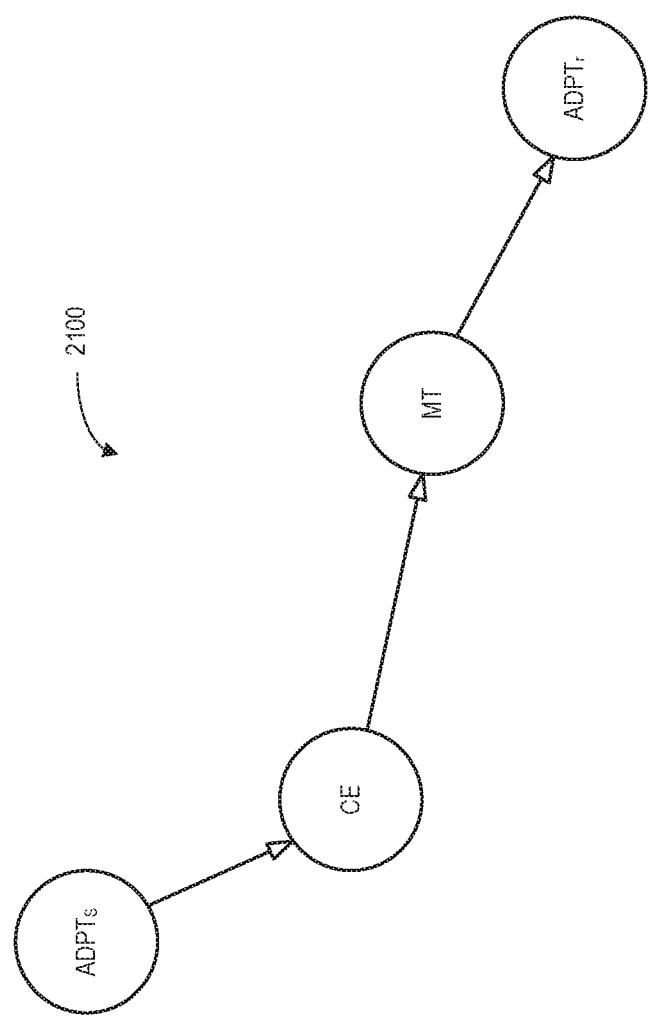
FIG. 21 illustrates a complete integration pattern contract graph according to some embodiments.

An IPCG 800 representing an integration process for the replication of material from an enterprise resource planning or customer relationship management system to a cloud system was illustrated in FIG. 8. Now add slightly more data in the form of pattern characteristics, which provides sufficient information for the translation to timed db-nets with boundaries. FIG. 21 depicts the enriched IPCG 2100. The characteristics of the CE node includes the tuple (PRG, (prg1, [0, ∞))), with enrichment function prg1 which assigns the Docum payload to the new header field AppID. Similarly, the characteristics of the MT nodes includes a tuple (PRG, (prg2, _)) with mapping program prg2, which maps the Edi_Dc40-Docnum payload to the MMRR-BMH-ID field (the Basic Message Header ID of the Material Mass Replication Request structure), and the Epm-Product_Id payload to the Mmrr-Mat-ID field (the Material ID of the Material Mass Replication Request structure). The pattern composition is correct according to the IPCG definition also with these refined pattern characteristics, which shows that hypothesis H1 is fulfilled for the material replicate scenario.

Figure 22:
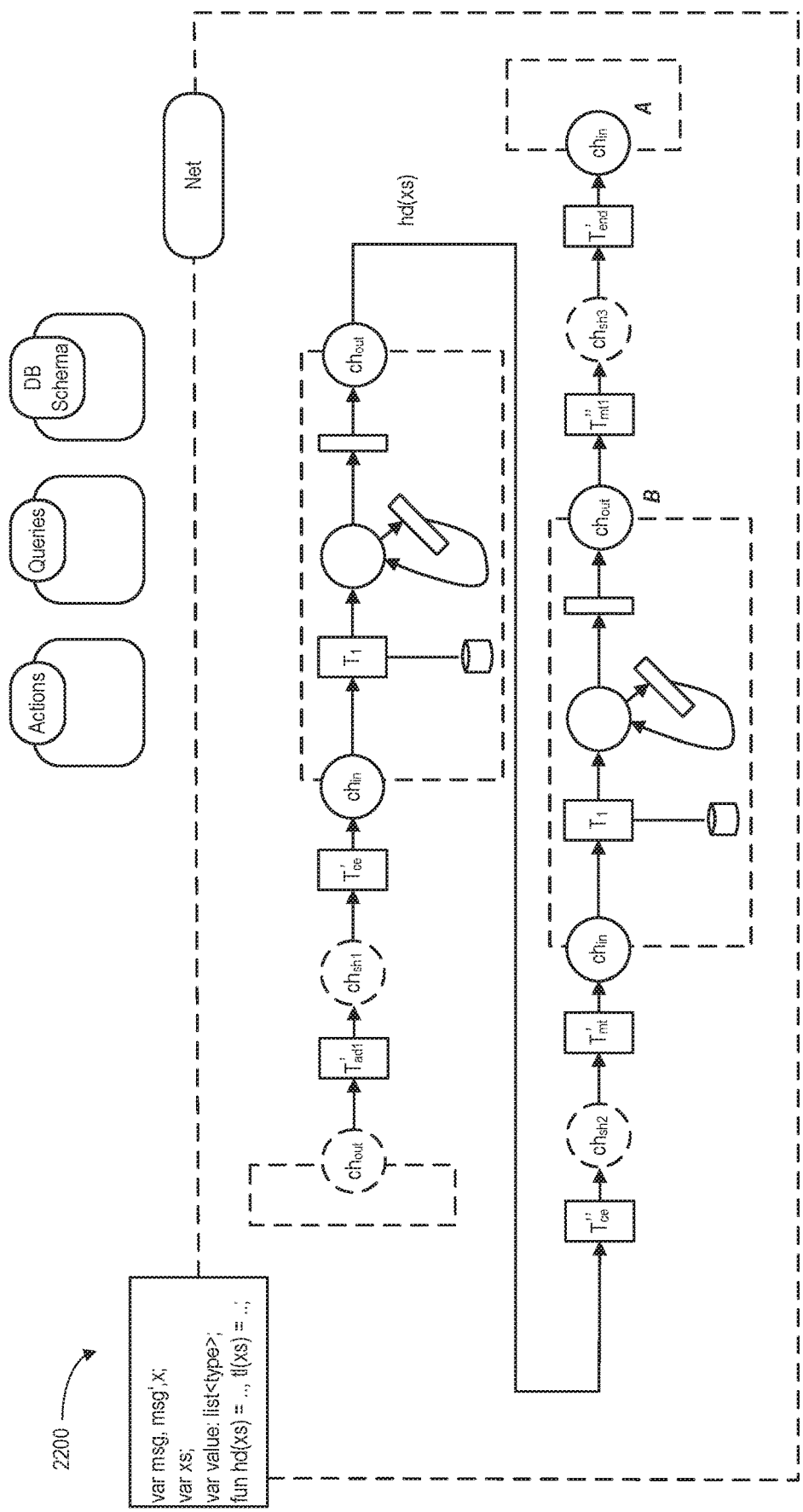
FIG. 22 is a material replicate scenario in a timed db-net with boundaries in accordance with some embodiments.

With respect to translation to timed db-net with boundaries, first translate each single pattern from FIG. 21 according to the construction described herein. The nodes $ADPT_s$ and $ADPT_r$ are translated as the start and end patterns in FIG. 10. The content enricher CE node and message translator MT node are message processors without storage, and hence translated as in FIG. 14 with $<f>_{CE}$=prg1 and $<f>_{MT}$=prg2 (no database values are required). Since no table updates are needed for either translation, the database update function parameter $<g>$ can be chosen to be the identity function in both cases. In the second step, refine the timed db-net with boundaries to also take contract concepts into account by the construction in IPCG definition. The resulting net 2200 is shown in FIG. 22. This ensures the correctness of the types of data exchanged between patterns, and follows directly from the correctness of the corresponding IPCG. Other contract properties such as encryption, signatures, and encodings are checked through the transition guards.

Notably, constructing an IPCG requires less technical knowledge such as particularities of timed db-nets, but still enables correct pattern compositions on an abstract level. While the CPT part of the pattern contracts (e.g., encrypted, signed) could be derived and translated automatically from a scenario in a yet to be defined modeling language, many aspects like their elements EL as well as the configuration of the characteristics by enrichment and mapping programs requires a technical understanding of IPCGs and the underlying scenarios. As such, IPCGs can be considered a suitable intermediate representation of pattern compositions. The user might still prefer a more appealing graphical modeling language on top of IPCGs. Thus, one may conclude: (1) IPCG and timed db-net are correct with respect to composition and execution semantics (→H1, H2); (2) IPCG is more abstract than timed db-net, however, still quite technical; and (3) tool support for automatic construction and translation maybe preferable.

Figure 23:
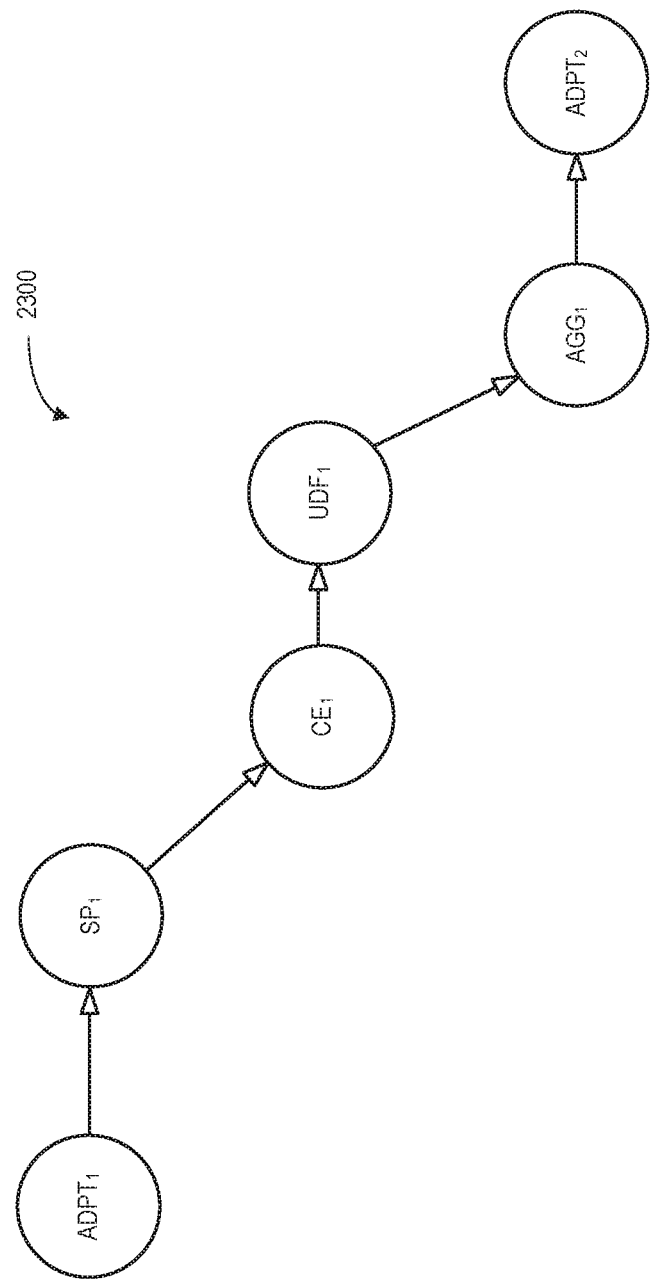
FIG. 23 is a complete integration pattern contract graph of a predictive maintenance scenario according to some embodiments.

Some embodiments are associated with an IPCG representing a predictive maintenance create notification scenario that connects machines with Enterprise Resource Planning ("ERP") and a Plant Design Management System ("PDMS"). Add all pattern characteristics and data, which provides sufficient information for the translation to timed db-nets with boundaries. FIG. 23 depicts the corresponding IPCG 2300. The characteristics of the SP node includes a tuple (PRG, (prg1, [0,∞))), with a split function prg1 which splits the incoming list of machine ID and Upper Threshold Warning Value of each machine, and emits single messages per machine entry. The subsequent $CE_1$ node adds further information about the machine in form of the Feature Type by an enrichment function prg2. This data is leveraged by the $UDF_1$ node, which uses a prediction function prg3 about the need for maintenance and adds the result into the Maintenance Request By Id field. Before the data is forwarded to the ERP system (simplified by an End), the single machine predictions are combined into one message by the $AGG_1$ node with correlation $cnd_{cr}$ and completion $cnd_{cc}$ conditions as well as the aggregation function prg4 and completion timeout ($v_1$, $v_2$) as pattern characteristics $\{(\{cnd_{cr}, cnd_{cc}\}), (PRG, prg4, (v_1, v_2))\}$. The pattern composition is correct and with these refined pattern characteristics, which shows that hypothesis H1 is fulfilled for the material replicate scenario.

With respect to translation to timed db-net with boundaries, again translate each single pattern 2300 from FIG. 23 according to the construction described herein. The Start and End nodes may be translated as the start and end pattern 1010, 1050 in FIG. 10. The Splitter $SP_1$, Content Enricher $CE_1$ and User-Defined Function $UDF_1$ nodes are message processors without storage, and hence translated as in FIG. 14 with $<f>_{SP_1}$=prg1, $<f>_{CE_1}$=prg2, and $<f>_{UDF_1}$=prg3 (no database values are required). Since no table updates are needed for either translation, the database update function parameter <g> can be chosen to be the identity function in all cases. The Aggregator $AGG_1$ node is a merge pattern type, and thus translated as in FIG. 15 with $(v_1, v_2) \rightarrow [\tau_1, \tau_2]$, $prg_{agg} \rightarrow d(msgs)$. Moreover, the correlation condition $cnd_{cr} \rightarrow g(msg, msgs)$ and the completion condition $cnd_{cc} \rightarrow complCount$.

In the second step, refine the timed db-net with boundaries to also take contract concepts into account by the construction in the IPCG definition. This ensures the correctness of the types of data exchanged between patterns, and follows directly from the correctness of the corresponding IPCG. Other contract properties such as encryption, signatures, and encodings are checked through the transition guards.

Figure 24:
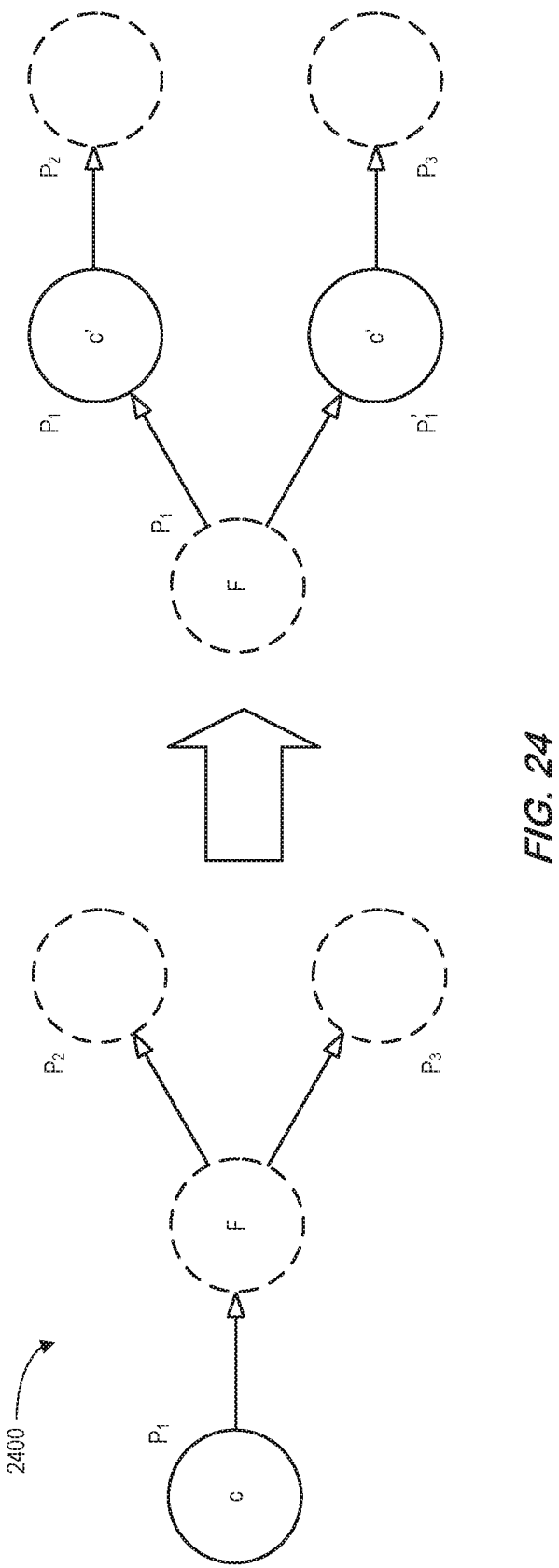
FIG. 24 illustrates a re-write rule in accordance with some embodiments.

With respect to optimization strategy realization, graph rewriting provides a visual framework for transforming graphs in a rule-based fashion. A graph rewriting rule is given by two embeddings of graphs L↔K↪R, where L represents the left hand side of the rewrite rule, R the right hand side, and K their intersection (the parts of the graph that should be preserved by the rule). A rewrite rule can be applied to a graph G after a match of L in G has been given as an embedding L↪G; this replaces the match of L in G by R. The application of a rule is potentially non-deterministic: several distinct matches can be possible. Visually, a rewrite rule may be represented by a left hand side and a right hand side graph with dashed portions and solid portions: dashed parts are shared and represent K, while the solid parts are to be deleted in the left hand side, and inserted in the right hand side, respectively. For instance, FIG. 24 shows rewrite rules 2400 that move the node $P_1$ past a fork by making a copy in each branch, changing its label from c to c' in the process.

Figure 25A:
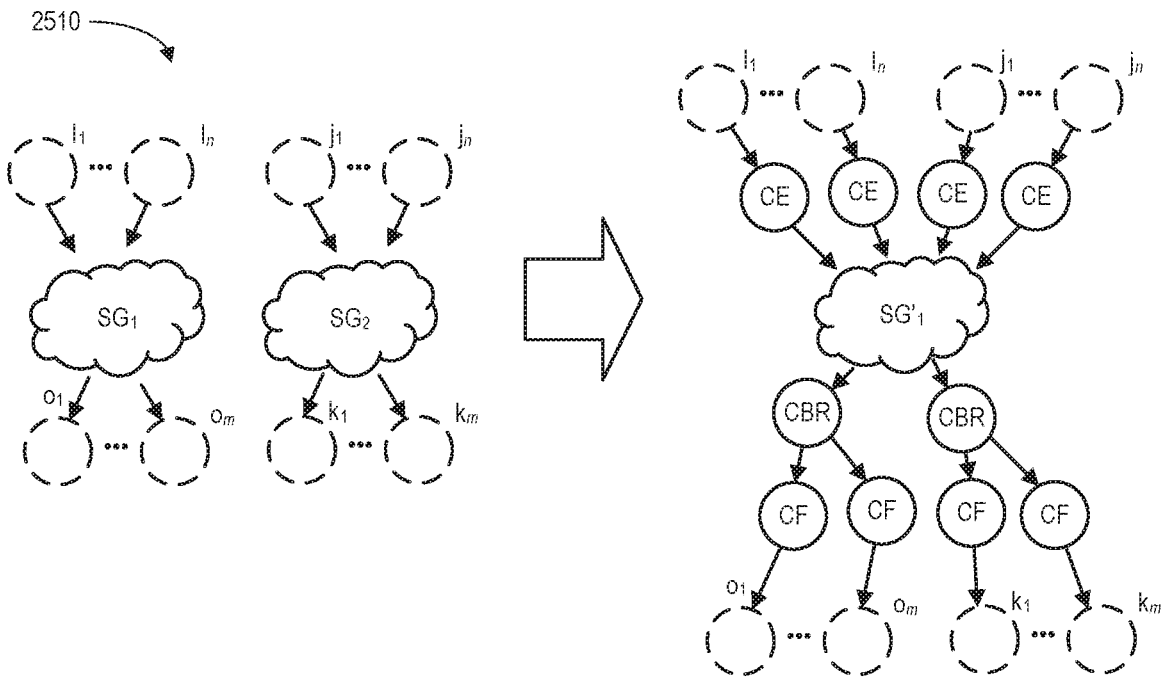
FIGS. 25A and B illustrate a redundant subprocess and combining sibling patterns according to some embodiments.

Formally, the rewritten graph may be constructed using a Double-Pushout ("DPO") from category theory. DPO rewritings might be used, for example, because rule applications are side-effect free (e.g., no "dangling" edges) and local (i.e., all graph changes are described by the rules). Additionally, Habel and Plump's relabeling DPO extension may be used to facilitate the relabeling of nodes in partially labeled graphs. In FIGS. 8 and 9, contracts and characteristics were shown as dashed boxes, but in the rules that follow they will be represented as (schematic) labels inside nodes for space reasons. In addition, also consider rewrite rules parameterized by graphs, where a parameter graph may be drawn as a cloud (see e.g., FIG. 25A for an example). A cloud represents any graph, sometimes with some side-conditions that are stated together with the rule. When looking for a match in a given graph G, it is of course sufficient to instantiate clouds with subgraphs of G—in this way, one can reduce the infinite number of rules that a parameterized rewrite rule represents to a finite number. Parameterized rewrite rules can formally be represented using substitution of hypergraphs or by !-boxes in open graphs. Since optimization strategies are described as graph rewrite rules, one can be flexible with when and in what order the strategies are applied. For example, the rules may be applied repeatedly until a fixed point is reached, i.e., when no further changes are possible, making the process idempotent. Each rule application preserves IPCG correctness because input contracts do not get more specific, and output contracts remain the same. Methodologically, the rules are specified by preconditions, change primitives, post-conditions and an optimization effect, where the pre- and post-conditions are implicit in the applicability and result of the rewriting rule.

A redundant sub-process optimization may remove redundant copies of the same sub-process within a process. With respect to change primitives, the rewriting is given by the rule 2510 in FIG. 25A, where $SG_1$ and $SG_2$ are isomorphic pattern graphs with in-degree n and out-degree m. The Content Enricher (CE) node is a message processor pattern from FIG. 14 with a pattern characteristic (PRG, (addCtxt, [0, ∞))) for an enrichment program addCtxt which is used to add content to the message (does it come from the left or right subgraph?). Similarly, the Content Filter (CF) is a message processor, with a pattern characteristic (PRG, (removeCtxt, [0, ∞))) for an enrichment program removeCtxt which is used to remove the added content from the message again. Moreover, the Content Based Router ("CBR") node is a conditional fork pattern from FIG. 13 with a pattern characteristic (CND, {fromLeft?}) for a condition from Left? which is used to route messages depending on their added context. In the right hand side of the rule, the CE nodes add the context of the predecessor node to the message in the form of a content enricher pattern, and the CBR nodes are content-based routers that route the message to the correct recipient based on the context introduced by CE. The graph $SG_1'$ is the same as $SG_1$, but with the context introduced by CE copied along everywhere. This context is stripped off the message by a content filter CF. The optimization is beneficial for model complexity when the isomorphic subgraphs contain more than n+m nodes, where n is the in-degree and m the out-degree of the isomorphic subgraphs. The latency reduction is by the factor of subgraphs minus the latency introduced by the n extra nodes CE, m extra nodes CBR, and k extra nodes CF.

Figure 25B:
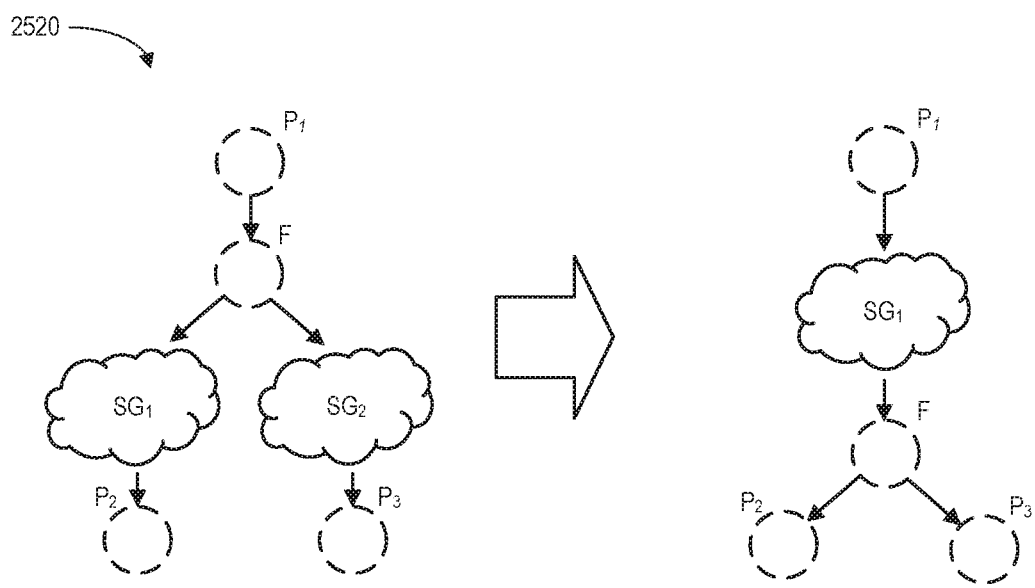

Sibling patterns have the same parent node in the pattern graph (e.g., they follow a non-conditional forking pattern) with channel cardinality of 1:1. Combining them means that only one copy of a message is traveling through the graph instead of two for this transformation to be correct in general, the siblings also need to be side-effect free, i.e., no external calls, although this may not be captured by the correctness criteria. With respect to change primitives, the rule 2520 is given in FIG. 25B, where $SG_1$ and $SG_2$ are isomorphic pattern graphs, and F is a fork. The model complexity and latency are reduced by the model complexity and latency of $SG_2$.

Consider data reduction optimization strategies, which mainly target improvements of the message throughput (including reducing element cardinalities). These optimizations require that pattern input and output contracts are regularly updated with snapshots of element datasets $EL_{in}$ and $EL_{out}$ from live systems, e.g., from experimental measurements through benchmarks.

An early-filter may be associated with a filter pattern that can be moved to or inserted prior to some of its successors to reduce the data to be processed. The following types of filters may be differentiated:

A message filter removes messages with invalid or incomplete content. It can be used to prevent exceptional situations, and thus improve stability.

A content filter removes elements from messages, thus reduces the amount of data passed to subsequent patterns.

Figure 26A:
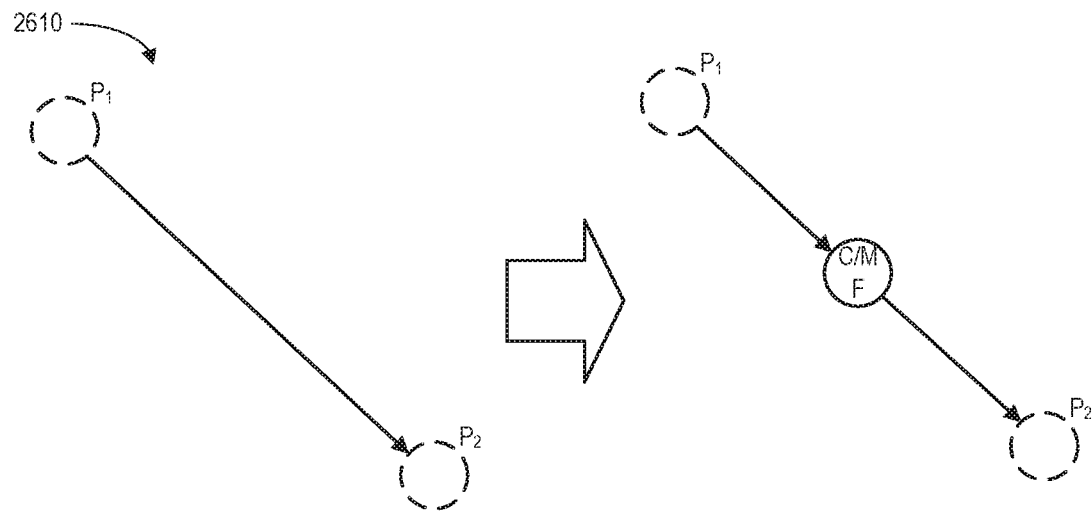
FIGS. 26A and B illustrate early filtering and early mapping in accordance with some embodiments.

Both patterns are message processors in the sense of FIG. 14. The content filter as signs a filter function ($prg_1$, $([0, \infty)) \to f(msg, value)$ to remove data from the message (i.e., without temporal information), and the message filter assigns a filter condition $\{(cond_1)\} \to g(msg)$. With respect to change primitives, the rule 2610 is given in FIG. 26A, where $P_3$ is either a content or message filter matching the output contracts of $P_1$ and the input contract of $P_2$, removing the data not used by $P_2$. The message throughput increases by the ratio of the number of reduced data elements that are processed per second, unless limited by the throughput of the additional pattern.

Figure 26B:
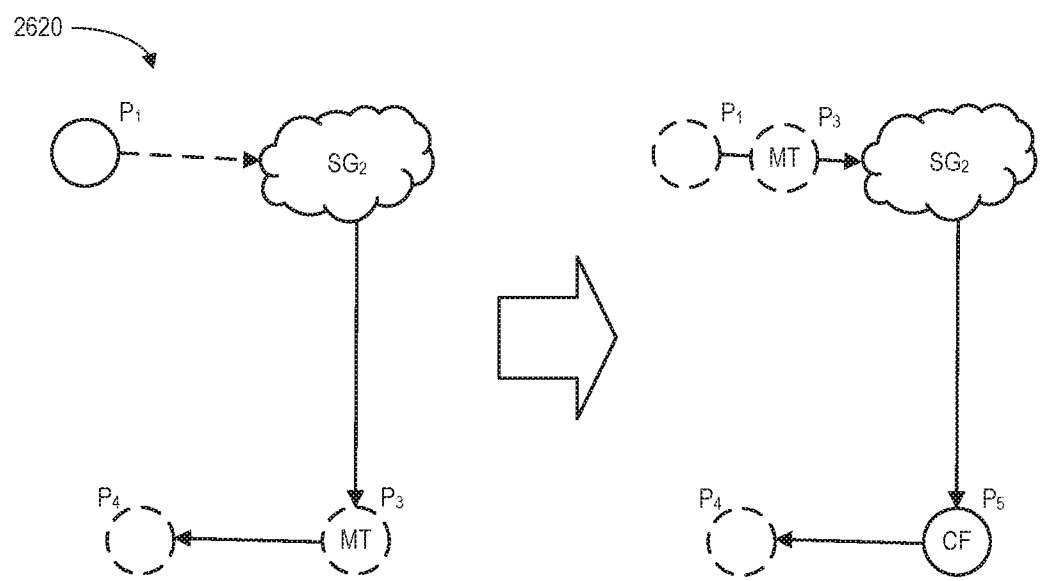

Early-mapping may be associated with mapping that reduces the number of elements in a message to increase the message throughput. With respect to change primitives, the rule 2620 is given in FIG. 26B, where $P_3$ is an element reducing message mapping compatible with both $SG_2$, $P_4$, and $P_1$, $SG_2$, and where $P_4$ does not modify the elements mentioned in the output contract of $P_3$. Furthermore, $P_5$ is a content filter, which ensures that the input contract of $P_4$ is satisfied. The Message Translator (MT) node is a message processor pattern from FIG. 14 with a pattern characteristic (PRG, (prg, $[0, \infty)$)) for some mapping program prg which is used to transform the message. The message throughput for the subgraph subsequent to the mapping increases by the ratio of the number of unnecessary data elements processed.

Figure 27A:
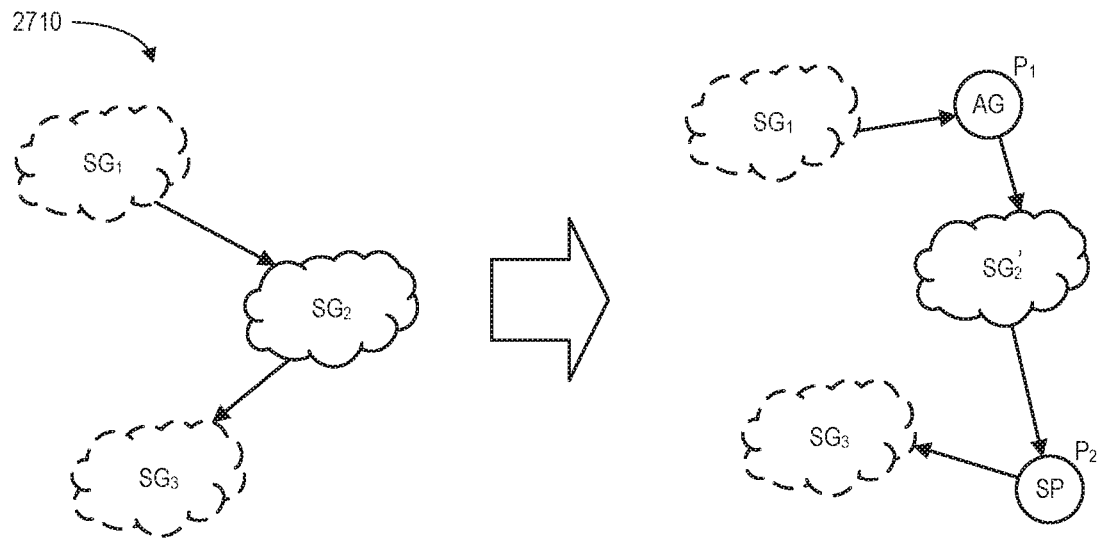
FIGS. 27A and B illustrate early aggregation and early claim check according to some embodiments.

Early-aggregation may be associated with a micro-batch processing region which is a subgraph which contains patterns that are able to process multiple messages combined to a multi-message or one message with multiple segments with an increased message throughput. The optimal number of aggregated messages is determined by the highest batch-size for the throughput ratio of the pattern with the lowest throughput, if latency is not considered. With respect to change primitives, the rule 2710 is given in FIG. 27A, where $SG_2$ is a micro-batch processing region, $P_1$ an aggregator, $P_2$ a splitter which separates the batch entries to distinct messages to reverse the aggregation, and $SG_2'$ finally is $SG_2$ modified to process micro-batched messages. The Aggregator (AG) node is a merge pattern from FIG. 15 with a pattern characteristic $\{(CND, \{cnd_{cr}, cnd_{cc}\}), (PRG, prg_{agg}, (v_1, v_2)\}$ for some correlation condition $cnd_{cr}$, completion condition $cnd_{cc}$, aggregation function $prg_{agg}$, and timeout interval ($v_1$, $v_2$) which is used to aggregate messages. The Splitter (SP) node is a message processor from FIG. 14 with a pattern characteristic (PRG, (prg, $[0, \infty)$)) for some split function prg which is used to split the message into several ones. The message throughput is the minimal pattern throughput of all patterns in the micro-batch processing region. If the region is followed by patterns with less throughput, only the overall latency might be improved.

Figure 27B:
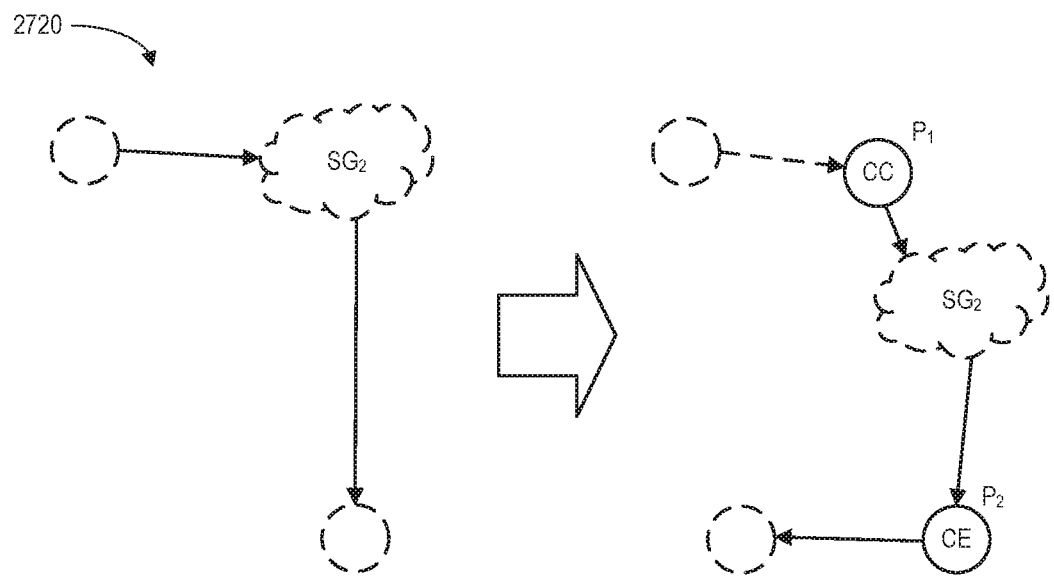

Consider now an early-claim check optimization. If a subgraph does not contain a pattern with message access, the message payload can be stored intermediately persistently or transiently (depending on the quality of service level) and not moved through the subgraph. For instance, this applies to subgraphs consisting of data independent control flow logic only, or those that operate entirely on the message header (e.g., header routing). With respect to change primitives, the rule 2720 is given in FIG. 27B, where $SG_2$ is a message access-free subgraph, $P_1$ a claim check that stores the message payload and adds a claim to the message properties (and possibly routing information to the message header), and $P_2$ a content enricher that adds the original payload to the message. The Claim Check (CC) node is a message processor from FIG. 14 with a pattern characteristic (PRG, (_, $[0, \infty)$)), which stores the message for later retrieval. The main memory consumption and CPU load decreases, which could increase the message throughput of $SG_2$, if the claim check and content enricher pattern throughput is greater than or equal to the improved throughput of each of the patterns in the subgraph.

Figure 28A:
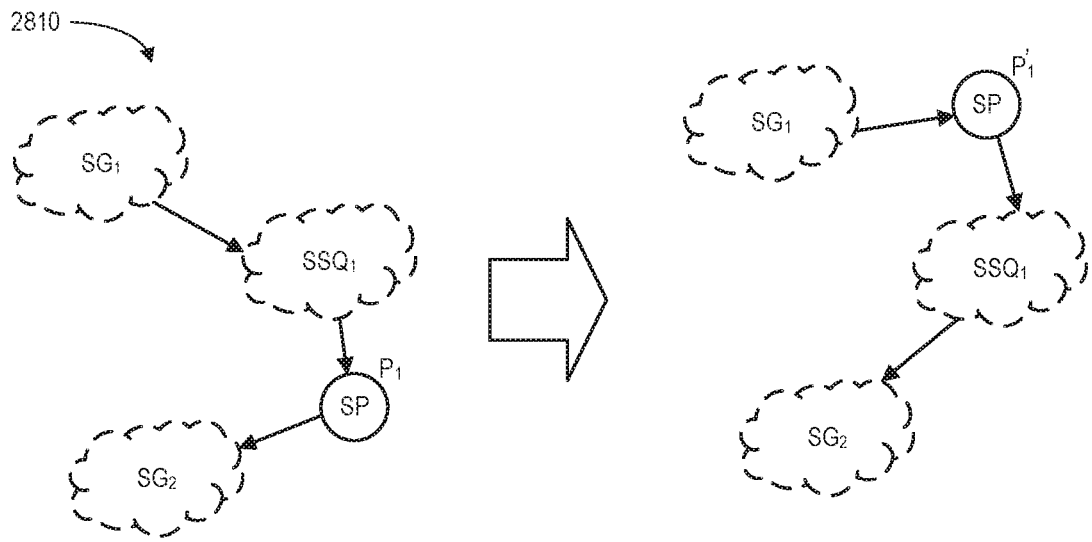
FIGS. 28A and B illustrate early split and early split (inserted) in accordance with some embodiments.
Figure 28B:
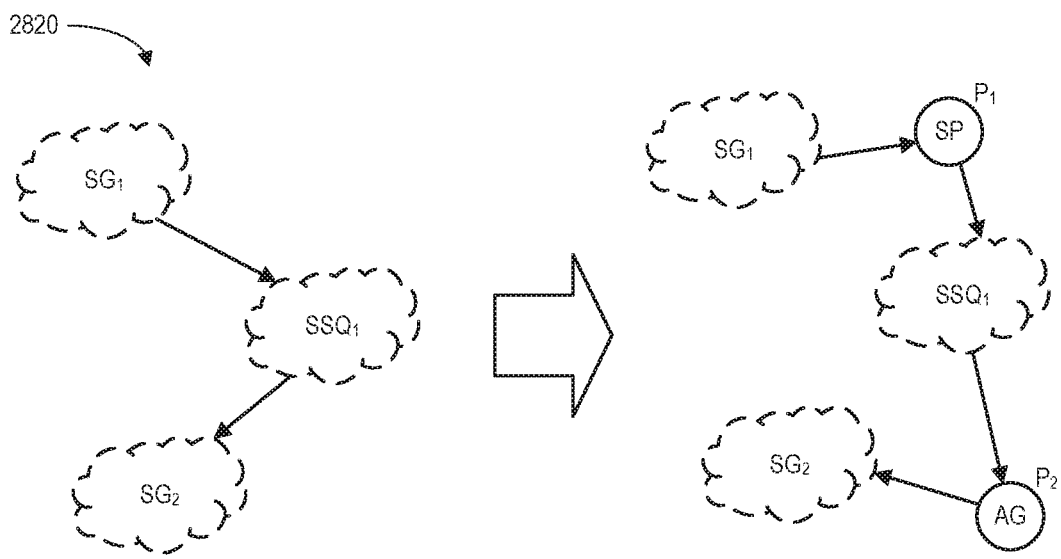

Now consider an early-split optimization. Messages with many segments can be reduced to several messages with fewer segments, and thereby reducing the processing required per message. A segment is an iterable part of a message like a list of elements. When such a message grows bigger, the message throughput of a set of adjacent patterns might decrease, compared to the expected performance for a single segment. This phenomenon is referred to as a segment bottleneck sub-sequence. Algorithmically, these bottlenecks could be found, e.g., using maxflow-mincut techniques based on workload statistics of a scenario. The splitter (SP) node is a message processor from FIG. 14 with a pattern characteristic (PRG, (prg, $[0, \infty)$)), for some split program prg. With respect to change primitives, the rule 2810, 2820 is given in FIGS. 28A and 28B, where $SSQ_1$ is a segment bottleneck sub-sequence. If $SSQ_1$ already has an adjacent splitter, FIG. 28A applies, otherwise FIG. 28B. In the latter case, SP is a splitter and $P_2$ is an aggregator that re-builds the required segments for the successor in $SG_2$. For an already existing splitter $P_1$ in FIG. 28A, the split condition has to be adjusted to the elements required by the input contract of the subsequent pattern in $SSQ_1$. In both cases, assume that the patterns in $SSQ_1$ deal with single and multi-segment messages; otherwise all patterns have to be adjusted as well. The message throughput increases by the ratio of increased throughput on less message segments minus, if the throughput of the moved or added splitter (and aggregator)≥message throughput of each of the patterns in the segment bottleneck sub-sequence after the segment reduction.

Figure 29A:
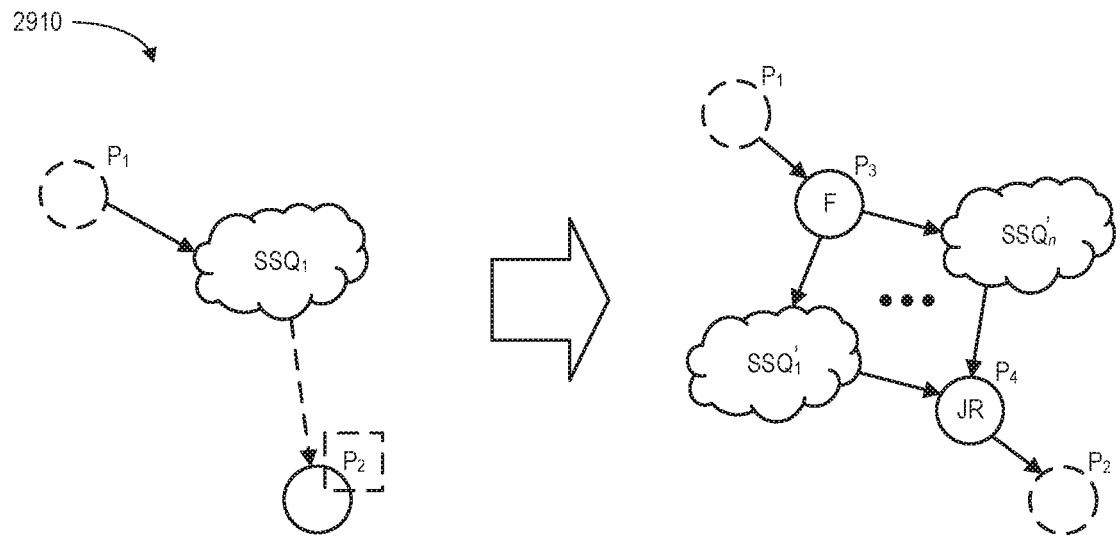
FIGS. 29A and B illustrate a sequence-to-parallel process and a merge parallel process according to some embodiments.

According to some embodiments, parallelization optimization strategies may be used to increase message throughput. These optimizations may require experimentally measured message throughput statistics, e.g., from benchmarks. Consider, for example, a sequence to parallel optimization. A bottleneck sub-sequence with channel cardinality 1:1 can also be handled by distributing its input and replicating its logic. The parallelization factor is the average message throughput of the predecessor and successor of the sequence divided by two, which denotes the improvement potential of the bottleneck sub-sequence. The goal is to not overachieve the mean of predecessor and successor throughput with the improvement to avoid iterative-optimization. Hence, the optimization is only executed if the parallel sub-sequence reaches lower throughput than their minimum. With respect to change primitives, the rule 2910 is given in FIG. 29A, where $SSQ_1$ is a bottleneck sub-sequence, $P_2$ a fork node, $P_3$ a join router, and each $SSQ_k'$ is a copy of $SSQ_1$, for $1 \le k \le n$. The parallelization factor n is a parameter of the rule. The message throughput improvement rate depends on the parallelization factor n, and the message throughput of the balancing fork and join router on the runtime. For a measured throughput of the bottleneck sub-sequences, the throughput can be improved to $n \times t \le$ average of the sums of the predecessor and successor throughput, while limited by the upper boundary of the balancing fork or join router.

Figure 29B:
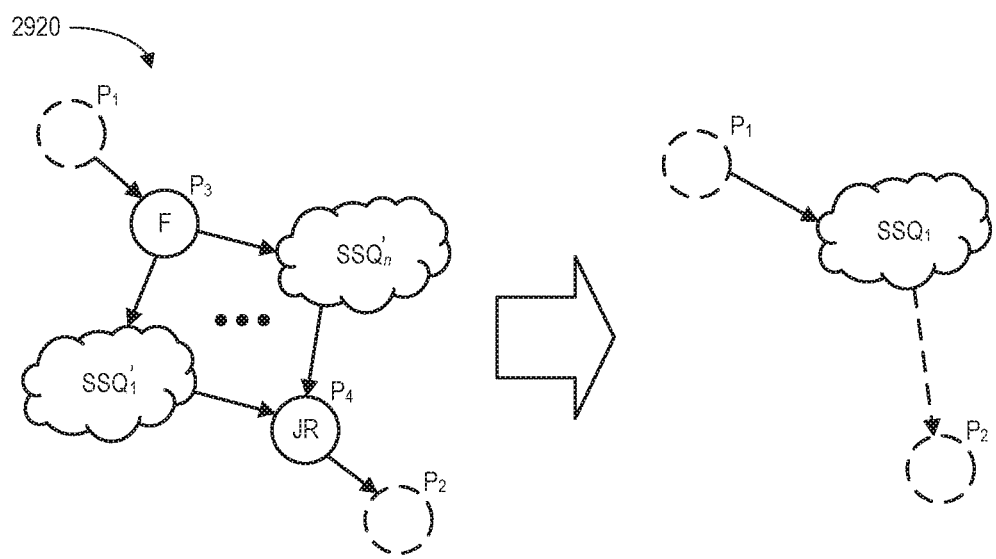

In a merge parallel, balancing fork and join router realizations may limit the throughput in some runtime systems, so that a parallelization decreases the throughput. This is called a limiting parallelization, and is defined as when a fork or a join has smaller throughput than a pattern in the following sub-sequence. With respect to change primitives, the rule 2920 is given in FIG. 29B, where $P_3$ and $P_4$ limit the message throughput of each of then sub-sequence copies $SSQ_1', \ldots, SSQ_n'$ of $SSQ_1$. The model complexity is reduced (n−1)k−2, where each $SSQ_i'$ contains k nodes. The message throughput might improve, since the transformation lifts the limiting upper boundary of a badly performing balancing fork or join router implementations to the lowest pattern throughput in the bottleneck sub-sequence.

Figure 30:
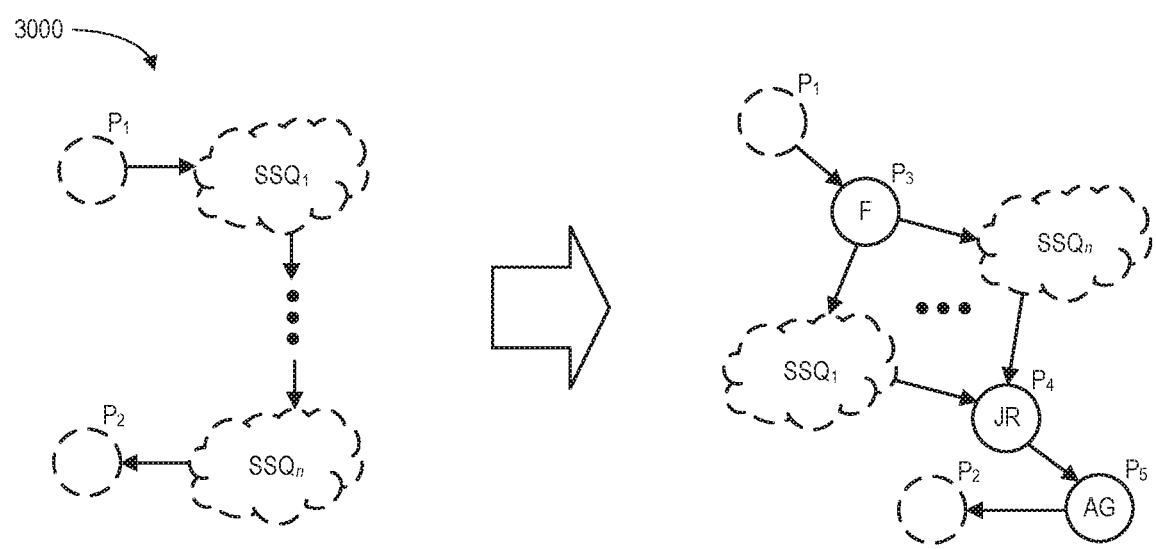
FIG. 30 illustrates a heterogeneous sequence-to-parallel process in accordance with some embodiments.

A heterogeneous parallelization consists of parallel sub-sequences that are not isomorphic. In general, two subsequent patterns $P_i$ and $P_j$ can be parallelized, if the predecessor pattern of $P_i$ fulfills the input contract of $P_j$, $P_i$ behaves read-only with respect to the data element set of $P_j$, and the combined outbound contracts of $P_i$ and $P_j$ fulfill the input contract of the successor pattern of $P_j$. With respect to change primitives, the rule 3000 is given in FIG. 30, where the sequential sub-sequence parts $SSQ_1, \ldots, SSQ_n$ can be parallelized, $P_3$ is a parallel fork, $P_4$ is a join router, and $P_5$ is an aggregator that waits for messages from all sub-sequence part branches before emitting a combined message that fulfills the input contract of $P_2$. Synchronization latency can be improved, but the model complexity increases by 3. The latency improves from the sum of the sequential pattern latencies to the maximal latency of all sub-sequence parts plus the fork, join, and aggregator latencies.

Note that any of the data reduction optimization techniques might also be applied in a "pushdown to endpoint" scenario by extending the placement to the message endpoints, with similar contracts.

Reduce interaction optimization strategies may reduce interactions to target a more resilient behavior of an integration process. For example, when endpoints fail, different exceptional situations have to be handled on the caller side. In addition, this can come with long timeouts, which can block the caller and increase latency. Knowing that an endpoint is unreliable can speed up processing, by immediately falling back to an alternative. With respect to change primitives, the rule 3110 is given in FIG. 31A, where $SG_{ext}$ is a failing endpoint, $SG_1$ and $SG_2$ subgraphs, and $P_1$ is a service call or message send pattern with configuration cf. This specifies the collected number of subsequently failed delivery attempts to the endpoint or a configurable time interval. If one of these thresholds is reached, the process stops calling $SG_{ext}$ and does not continue with the usual processing in $SG_1$, however, invokes an alternative processing or exception handling in $SG_2$. Besides an improved latency (i.e., average time to response from endpoint in case of failure), the integration process behaves more stable due to immediate alternative processing. To not exclude the remote endpoint forever, the rule 3120 in FIG. 31B is scheduled for execution after a period of time to try whether the endpoint is still failing. If not, the configuration is updated to cf' to avoid the execution of FIG. 31A. The retry time is adjusted depending on experienced values (e.g., an endpoint might be down every two hours and fourteen minutes).

Figure 32:
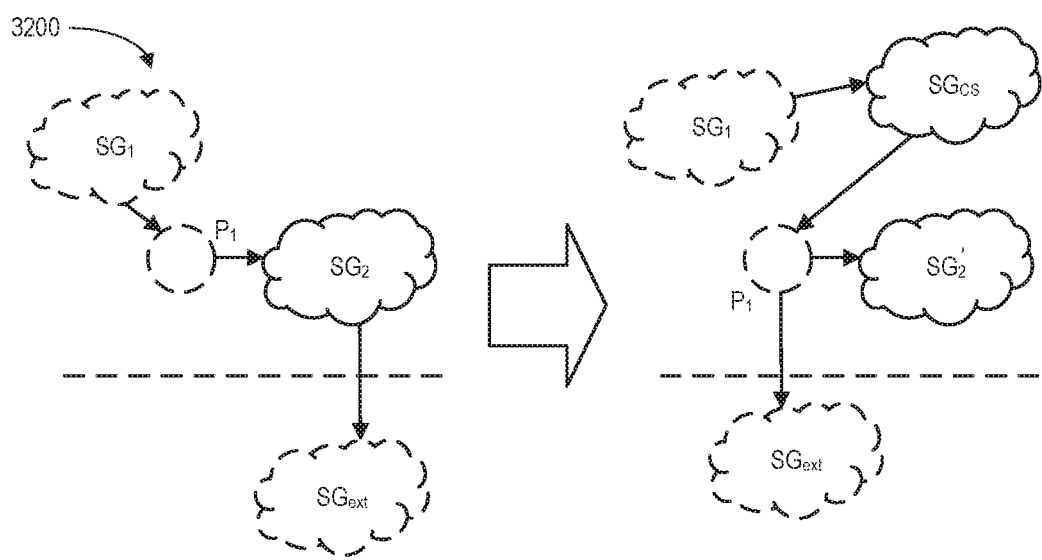
FIG. 32 illustrates a reduce request process in accordance with some embodiments.

A reduce requests optimization might be associated with a message limited endpoint, i.e., an endpoint that is not able to handle a high rate of requests, and can get unresponsive or fail. To avoid this, the caller can notice this (e.g., by TCP back-pressure) and react by reducing the number or frequency of requests. This can be done be employing a throttling (or even a sampling pattern) which removes messages. An aggregator can also help to combine messages to multi-messages. With respect to change primitives, the rewriting is given by the rule 3200 in FIG. 32, where $P_1$ is a service call or message send pattern, $SG_{ext}$ a message limited external endpoint, $SG_2$ a subgraph with $SG_2'$ a re-configured copy of $SG_2$ (e.g., for vectorized message processing), and $SG_{cs}$ a subgraph that reduce the pace, or number of messages sent. Latency and message throughput might improve, but this optimization mainly targets stability of communication. This may be improved by configuring the caller to a message rate or number of requests that the receiver can handle.

Note that optimizations might not change the input-output behavior of the pattern graphs in the timed db-nets semantics, i.e., if rule G is rewritten as G', then ⟦ G ⟧ has the same observable behavior as ⟦ G' ⟧. Consider a bisimulation argument, and let $\Gamma_{s_0}^{\mathcal{B}} = \langle S, s_0, \rightarrow \rangle$ and $\Gamma_{s_0}^{\mathcal{B}'} = \langle S', s_0', \rightarrow' \rangle$ be the associated labelled transition systems of two timed db-nets $\mathcal{B}$ and $\mathcal{B}'$ with the same boundaries. A $\mathcal{B}$-snapshot (I, m) is equivalent to a $\mathcal{B}'$-snapshot (I', m'), (I, m)≈(I', m'), if I=I', and m and m' agree on output places, i.e., for every output place p with m(p)=(α, γ, age) and m'(p)=(α', γ', age'), there are α=α', for the elements that are in the message α, and those that are not required by any endpoint γ (usually γ=∅), and age is the timed db-net age information.

Further, say that $\Gamma_{s_0}^{\mathcal{B}}$ is equivalent to $\Gamma_{s_0}^{\mathcal{B}'}$, $\Gamma_{s_0}^{\mathcal{B}} \sim \Gamma_{s_0}^{\mathcal{B}'}$, if whenever $s_0 \rightarrow^*(I, m)$ then there is (I', m') such that $s_0' \rightarrow'^*(I', m')$ and (I, m)≈(I', m'), and whenever $s_0' \rightarrow^*(I', m')$ then there is (I, m) such that $s_0 \rightarrow^*(I, m)$ and (I', m')≈(I, m). Note that this bisimulation argument neglects the unused fields as well as the age of the tokens. With the following congruence relation for the composition, it can be shown that the correctness of the optimizations.

The relation ~ is congruence relation with respect to composition of timed db-nets with boundaries, i.e., it is reflexive, symmetric and transitive, and if $\Gamma_{S_0}^{\mathcal{B}\infty} \sim \Gamma_{S_0}^{\mathcal{B}'\infty}$, $\Gamma_{t_0}^{\mathcal{B}_\epsilon} \sim \Gamma_{t_0}^{\mathcal{B}'_\epsilon}$ with $t_0$ on the shared boundary of $B_1$ and $B_2$, then $\Gamma_{S_0}^{\mathcal{B}\infty \circ \mathcal{B}_\epsilon} \sim \Gamma_{S_0}^{\mathcal{B}'\infty \circ \mathcal{B}'_\epsilon}$ With respect to redundant sub-processes, each move on the left hand side either moves tokens into a cloud, out of a cloud, or inside a cloud. In the first two cases, this can be simulated by the right hand side by moving the token through the CE or CBR and CF respectively followed by a move into or out of the cloud, while in the latter case the corresponding token can be moved in $SG_1'$ up to the isomorphism between $SG_1'$ and the cloud on the left. Similarly, a move on the right hand side into or out of the cloud can easily be simulated on the left hand side. Suppose a transition fires in $SG_1'$. Since all guards in $SG_1'$ have been modified to require all messages to come from the same enriched context, the corresponding transition can either be fired in $SG_1$ or $SG_2$.

Regarding combining sibling patterns, suppose the left hand side takes a finite number of steps and ends up with $m(P_2)$ tokens in $P_2$ and $m(P_3)$ tokens in $P_3$. There are three possibilities: (i) there are tokens of the same color in both $P_2$ and $P_3$; or (ii) there is a token in $P_2$ with no matching token in $P_3$; or (iii) there is a token in $P_3$ with no matching token in $P_2$. For the first case, the right hand side can simulate the situation by emulating the steps of the token ending up in $P_2$, and forking it in the end. For the second case, the right hand side can simulate the situation by emulating the steps of the token ending up in $P_2$, then forking it, but not moving one copy of the token across the boundary layer in the interpretation of the fork pattern. The third case is similar, using that $SG_2$ is isomorphic to $SG_1$. The right hand side can easily be simulated by copying all moves in $SG_1$ into simultaneous moves in $SG_1$ and the isomorphic $SG_2$.

By construction, an early filter optimization may remove the data not used by $P_2$, so if the left hand side moves a token to $P_2$, then the same token can be moved to $P_2$ on the right hand side and vice versa. With early mapping, suppose the left hand side moves a token to $P_4$. The same transitions can then move the corresponding token to $P_4$ on the right hand side, with the same payload, by construction. Similarly, the right hand side can be simulated by the left hand side. For early aggregation optimization, the interpretation of the subgraph $SG_2$ is equivalent to the interpretation of P1 followed by $SG_2'$ followed by $P_3$, by construction, hence the left hand side and the right hand side are equivalent. For early claim check optimization, since the claim check CC+CE simply stores the data and then adds it back to the message in the CE step, both sides can obviously simulate each other. For early split optimization, by assumption, $P_1$ followed by $SSQ_1$ ($P_1$ followed by $SSQ_1$ followed by $P_2$ for the inserted early split) is equivalent to $SSQ_1$ followed by $P_1$, from which the claim immediately follows.

For sequence to parallel optimization, the left hand side can be simulated by the right hand side by copying each move in $SSQ_1$ by a move each in $SSQ_1'$ to $SSQ_n'$. If the right hand side moves a token to an output place, it must move a token through $SSQ_1'$, and the same moves can move a token through $SSQ_1$ in the left hand side. For merge parallel optimization, when left hand side moves a token to the output place, it must move a token through $SSQ_1'$, and the same moves can move a token through $SSQ_1$ in the right hand side. The right hand side can be simulated by the left hand side by copying each move in $SSQ_1$ by a move each in $SSQ_1'$ to $SSQ_n'$. For a heterogeneous sequence to parallel optimization, the right hand side can simulate the left hand side as follows: if the left hand side moves a token to an output place, it must move it through all of $SSQ_1$ to $SSQ_n$. The right hand side can make the same moves in the same order. For the other direction, the left hand side can reorder the moves of the right hand side to first do all moves in $SSQ_1$, then in $SSQ_2$ and so on. This is still a valid sequence of steps because of side-effect-freeness.

Figure 31A:
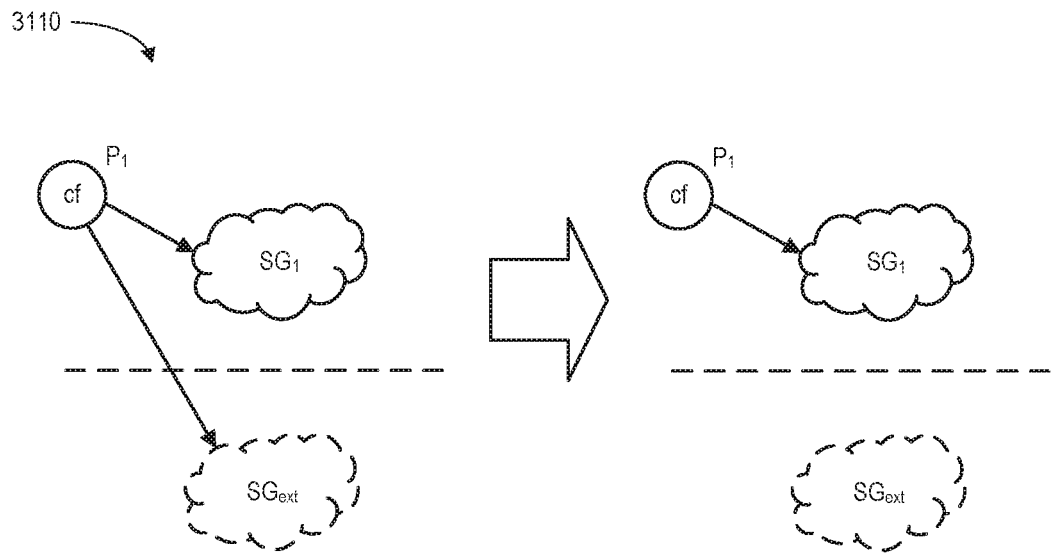
FIGS. 31A and B illustrate ignoring a failing endpoint and trying a failing endpoint according to some embodiments.
Figure 31B:
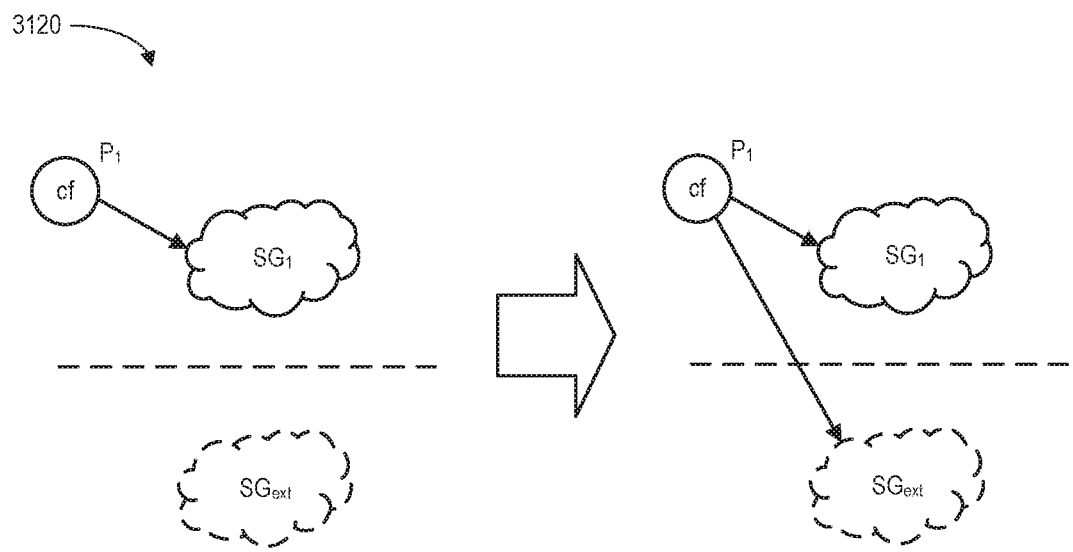

For the "ignore, try failing endpoints" optimization, suppose the left hand side of FIG. 31A takes a finite amount of steps to move a token to $SG_1$, however, the transition to $SG_{ext}$ does not produce a result due to an exceptional situation (i.e., no change of the marking in cf). Correspondingly, the right hand side moves the token, however, without the failing, and thus read-only transition to $SG_{ext}$, which ensures the equality of the resulting tokens on either side. Under the same restriction that the no exception context is returned from $SG_{ext}$, the right hand side can simulate the left hand side accordingly. For reduce requests optimization, since the only difference between the left hand side and the right hand side is the slow-down due to the insertion of the pattern CS, and simulation does not take the age of messages into account, the left hand side can obviously simulate the right hand side and vice versa.

Figure 33:
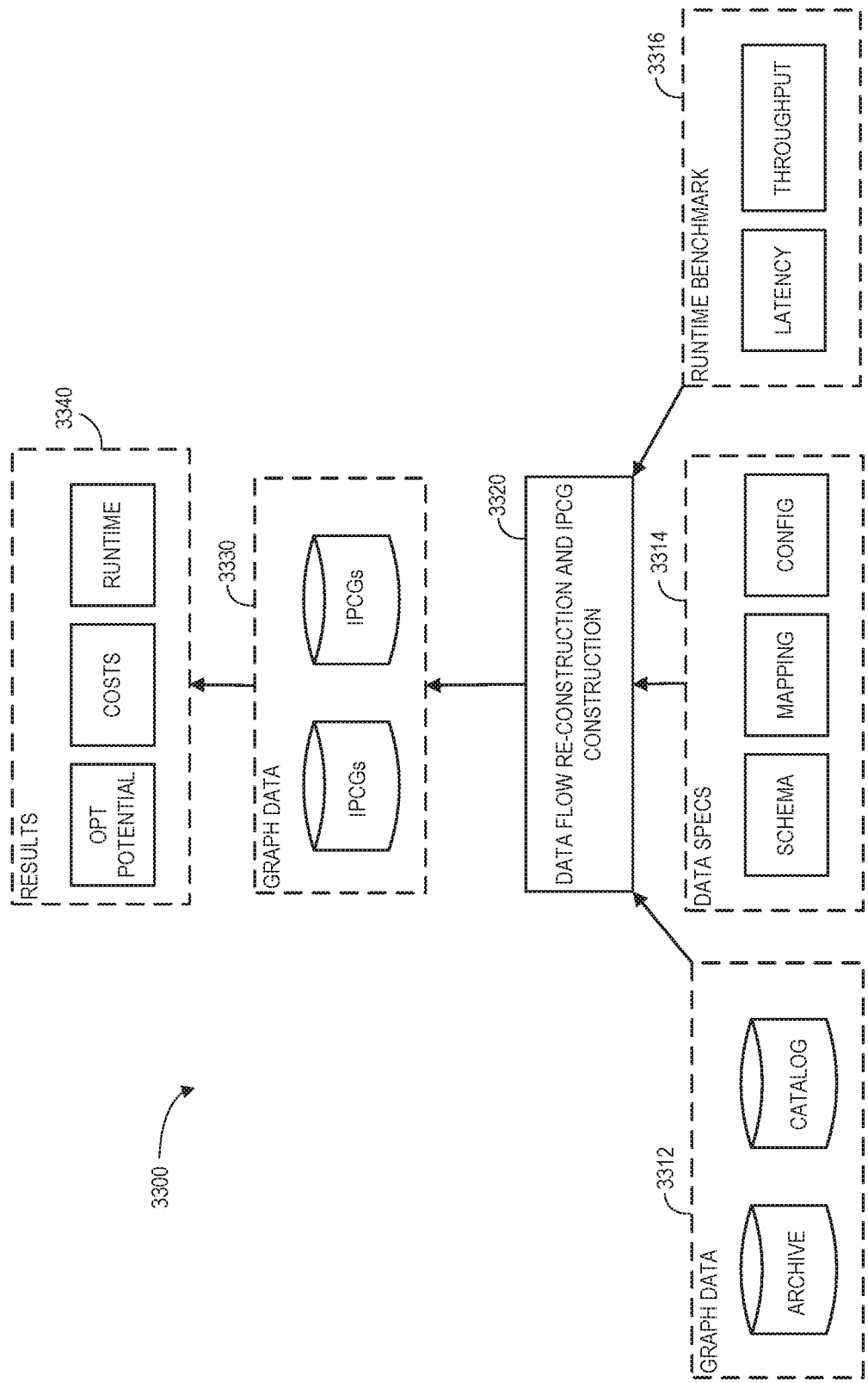
FIG. 33 is a pattern composition evaluation pipeline according to some embodiments.

An IPCG may be constructed for various integration scenarios following the workflow 3300 shown in FIG. 33. According to some embodiments, a dataflow re-construction and IPCG construction element 3320 may access graph data 3312 (e.g., an archive and catalog) and runtime benchmarks 3316 (e.g., associated with latency and throughput). The integration scenarios may be stored as process models in a BPMN-like notation. The process models may reference data specifications such as schemas (e.g., XSD, WSDL), mapping programs, selectors (e.g., XPath) and/or configuration files 3314. For every pattern used in the process models, runtime statistics may be available from the benchmarks 3316. The data specifications 3314 picked up from a content archive and from a current content catalog, while the runtime benchmarks 3316 might be collected using an open-source integration system, such as the Apache Camel system. The mapping and schema information may be automatically mined and added to the patterns as contracts, and the rest of the collected data as pattern characteristics. For each integration scenario and each optimization strategy, the system may determine if the strategy applies, and if so, if the cost is improved. The generated IPCG graph data 3330 may be used to create and store results 3340 for evaluation.

In this way, embodiments may address an important shortcoming in EAI research, namely the lack of optimization strategies, and the informality of descriptions of pattern compositions and optimizations. Embodiments may develop a formalization of pattern compositions in order to precisely define optimizations. Note that formalization and optimizations may be relevant even for experienced integration experts, with interesting choices, implementation details, and/or trade-offs.

Figure 34:
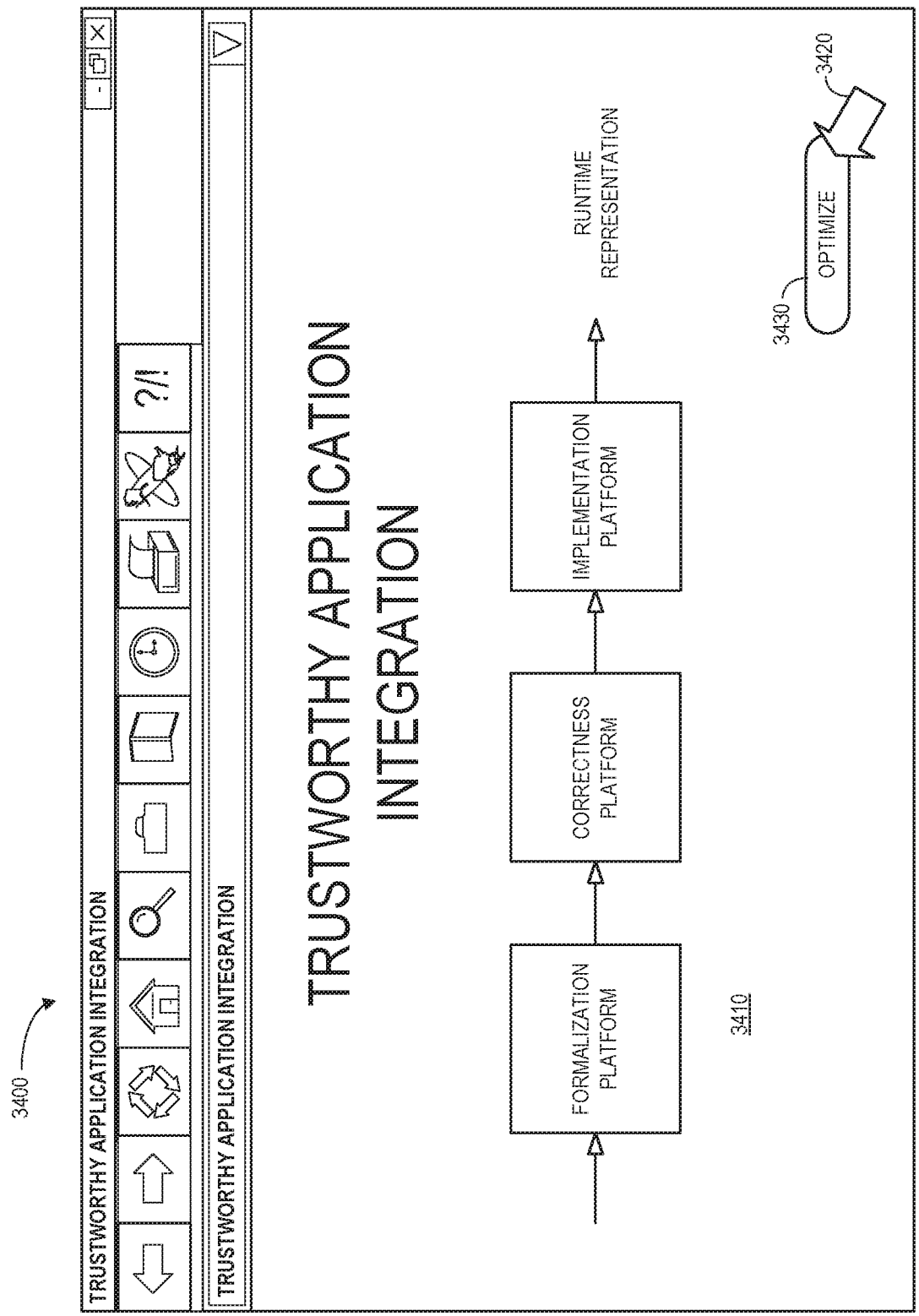
FIG. 34 is a human machine interface display according to some embodiments.

FIG. 34 is a human machine interface display 3400 in accordance with some embodiments. The display 3400 includes a graphical representation 3410 of a trustworthy application integration system in accordance with any of the embodiments described herein. Selection of an element on the display 3400 (e.g., via a touchscreen or a computer pointer 3420) may result in display of a pop-up window containing more detailed information about that element and/or various options (e.g., to add adjust optimization strategies, select formalization parameters, etc.). Selection of an "Optimize" icon 3430 may also let an operator or administrator initiate or finalize operation of the application integration system.

Figure 35:
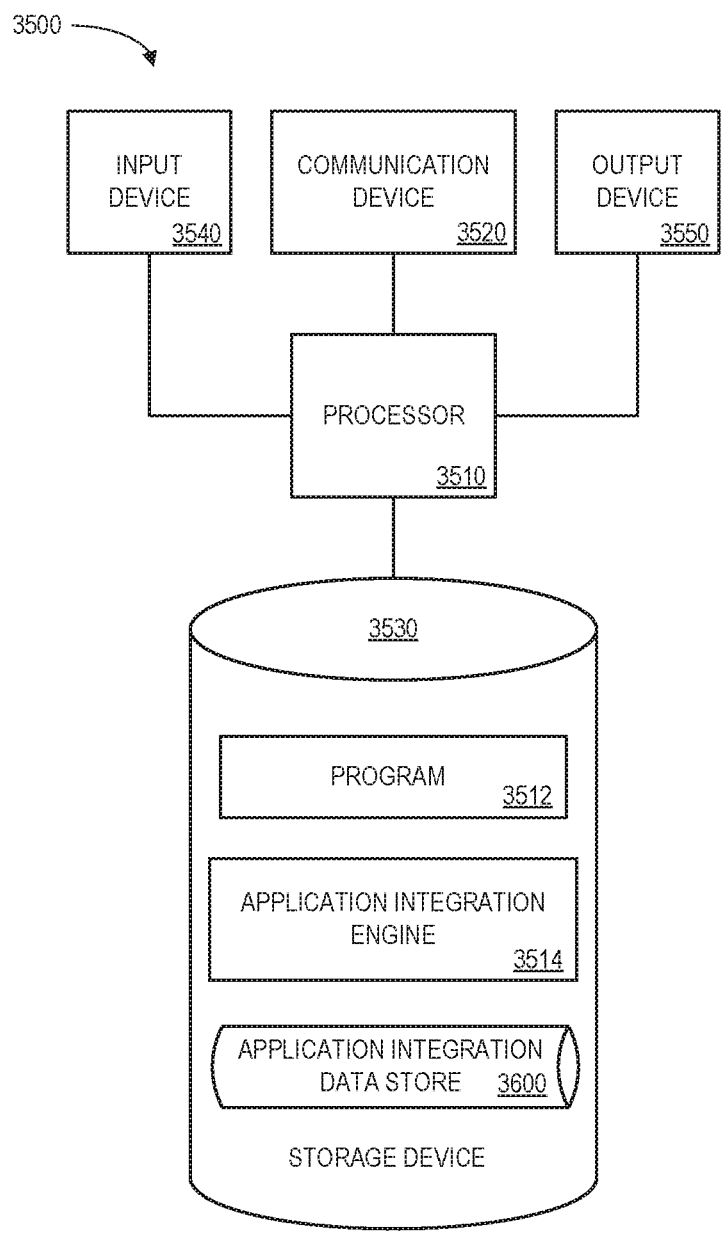
FIG. 35 is an apparatus or platform according to some embodiments.

Note that the embodiments described herein may be implemented using any number of different hardware configurations. For example, FIG. 35 is a block diagram of an apparatus or platform 3500 that may be, for example, associated with the system 200 of FIG. 2 (and/or any other system described herein). The platform 3500 comprises a processor 3510, such as one or more commercially available Central Processing Units ("CPUs") in the form of one-chip microprocessors, coupled to a communication device 3520 configured to communicate via a communication network (not shown in FIG. 35). The communication device 3520 may be used to communicate, for example, with one or more remote designer platforms, administrator platforms, etc. The platform 3500 further includes an input device 3540 (e.g., a computer mouse and/or keyboard to input formalization and optimization information) and/an output device 3550 (e.g., a computer monitor to render a display, transmit optimization recommendations, and/or create reports about application integration, benchmark results, etc.). According to some embodiments, a mobile device, monitoring physical system, and/or PC may be used to exchange information with the platform 3500.

The processor 3510 also communicates with a storage device 3530. The storage device 3530 may comprise any appropriate information storage device, including combinations of magnetic storage devices (e.g., a hard disk drive), optical storage devices, mobile telephones, and/or semiconductor memory devices. The storage device 3530 stores a program 3512 and/or an application integration engine 3514 for controlling the processor 3510. The processor 3510 performs instructions of the programs 3512, 3514, and thereby operates in accordance with any of the embodiments described herein. For example, the processor 3510 might be associated with a formalization platform and facilitate definition of pattern requirements by an integration developer (and formalize singles pattern compositions to compose single patterns to template-based formalized compositions). The processor 3510 might also be associated with a correctness platform that checks for structural correctness of the formalized compositions and executes a semantic transformation or binding to pattern characteristics and associated interactions. Such a processor 3510 may also check composition semantics and generate a formal model. In some embodiments, the processor 3510 is associated with an implementation platform that translates the formal model generated by the correctness platform and configures implementation parameters of the translated formal model. In this case, the processor 3510 may then execute the translated formal model in accordance with the configured implementation parameters.

The programs 3512, 3514 may be stored in a compressed, uncompiled and/or encrypted format. The programs 3512, 3514 may furthermore include other program elements, such as an operating system, clipboard application, a database management system, and/or device drivers used by the processor 3510 to interface with peripheral devices.

As used herein, information may be "received" by or "transmitted" to, for example: (i) the platform 3500 from another device; or (ii) a software application or module within the platform 3500 from another software application, module, or any other source.

In some embodiments (such as the one shown in FIG. 35), the storage device 3530 further stores an application integration data store 3600. An example of a database that may be used in connection with the platform 3500 will now be described in detail with respect to FIG. 36. Note that the database described herein is only one example, and additional and/or different information may be stored therein. Moreover, various databases might be split or combined in accordance with any of the embodiments described herein.

Figure 36:
FIG. 36 is portion of an application integration data store in accordance with some embodiments.

Referring to FIG. 36, a table is shown that represents the application integration data store 3600 that may be stored at the platform 3500 according to some embodiments. The table may include, for example, entries associated with an application implemented via a cloud computing environment. The table may also define fields 3602, 3604, 3606, 3608, 3610 for each of the entries. The fields 3602, 3604, 3606, 3608, 3610 may, according to some embodiments, specify: an IPCG identifier 3602, data specifications 3604, runtime benchmarks 3606, optimizations 3608, and a status 3610. The application integration data store 3600 might be created and updated, for example, a designer creates a new system, additional application integrations are modified or deployed, etc.

The IPCG identifier 3602 might be a unique alphanumeric label that is associated with a contract graph and/or integration designer in accordance with any of the embodiments described herein. The data specifications 3604 might define source materials used to create the contract graph (e.g., schema, mapping, configuration data, etc.). The runtime benchmarks 3606 might include measurements that might be used to improve contract graphs (e.g., latency, throughput, etc.). The optimizations 3608 might indicate one or more types of strategies that were used to improve the contract graph. The status 3610 might include the current state of the contract graph (e.g., in process, halted, completed on a certain date and/or time, etc.).

Thus, embodiments may provide trustworthy application integration in a secure, automatic, and efficient manner. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 37:
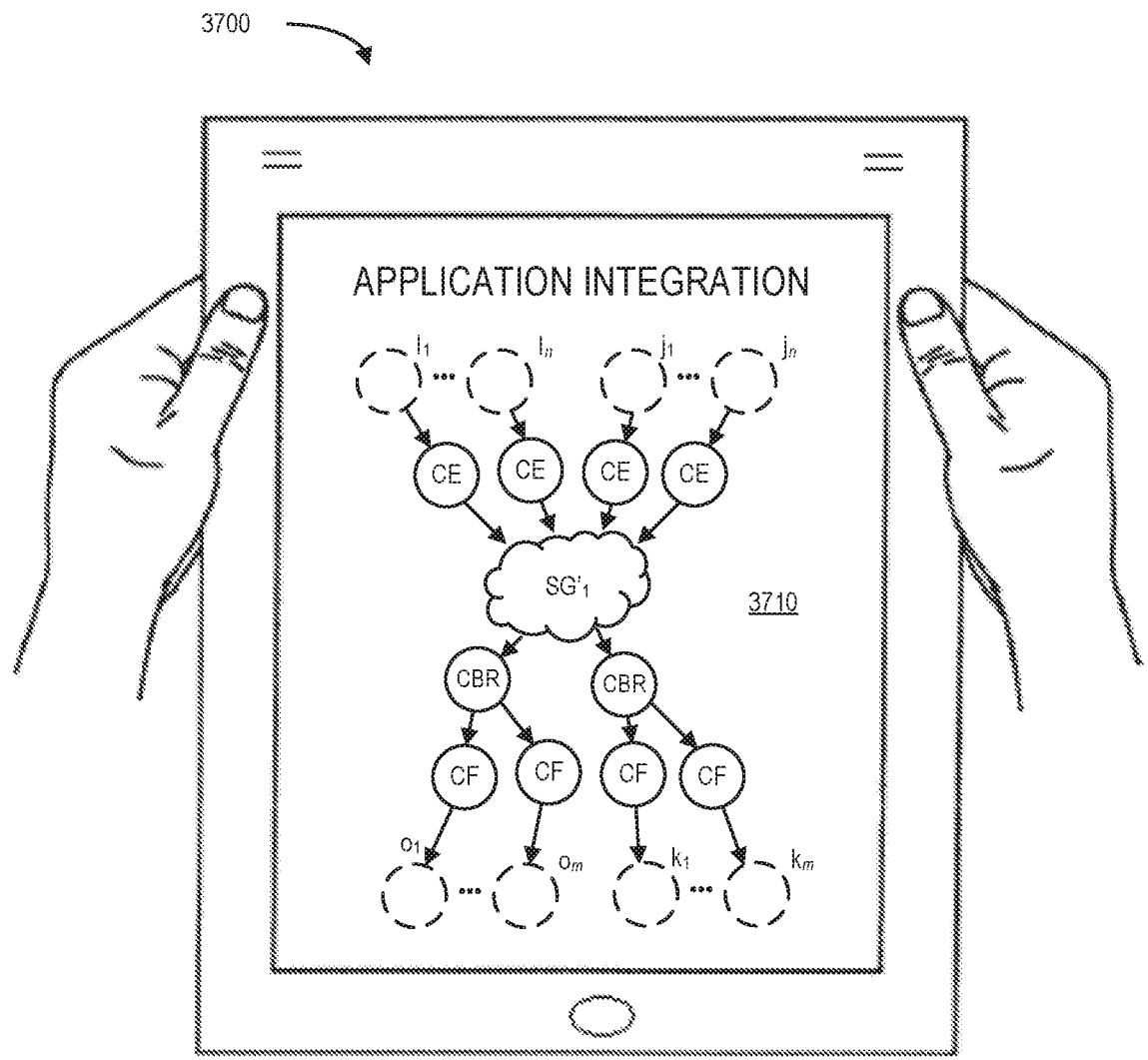
FIG. 37 is a tablet computer providing a trustworthy application integration display according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of application integrations and microservices, any of the embodiments described herein could be applied to other types of applications. Moreover, the displays shown herein are provided only as examples, and any other type of user interface could be implemented. For example, FIG. 37 illustrates a tablet computer 3700 with a trustworthy application integration display 3710. The display 3710 might be used, for example, by an operator or administration to configure optimization strategies or associated parameters (e.g., sequence to parallel, early mapping, redundant subprocesses, etc.).

Any of the embodiments described herein might incorporate dynamic aspects into the formalization of patterns for a more precise cost semantics. In addition, purely data related techniques (e.g., message indexing, fork path reordering, and/or merging of conditions) may be analyzed for their effects. Moreover, multi-objective optimizations and heuristics for graph rewriting on the process level may be implemented in connection with any of these embodiments. Further note that embodiments may utilize other types of optimization, such as pattern placement optimizations (pushing patterns to message endpoints, i.e., sender and receiver applications), optimizations that reduce interactions (helping to stabilize the process), etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A computer-implemented method associated with trustworthy application integration, comprising:
    facilitating, by a computer processor of a formalization platform application integration engine, definition of pattern requirements by an integration developer;
    performing, by the computer processor of the formalization platform application integration engine, domain abstraction associated with a set of single patterns;
    analyzing, by the computer processor of the formalization platform application integration engine, the set of single patterns and perform characteristics analysis to create a set of characteristics that are separated into intra data flow characteristics denoting constraints and inter data flow characteristics denoting contracts;
    formalizing, by the computer processor of the formalization platform application integration engine, the set of single patterns as a single formalized pattern based in part on generated requirements;
    composing, by the computer processor of the formalization platform application integration engine, single patterns into template-based formalized compositions of composed patterns by formalizing the constraints;
    inputting the composed patterns to the single formalized pattern;
    checking, by a computer processor of a correctness platform, for structural correctness of the formalized compositions composed by the formalization platform application integration engine by verifying the contracts;
    executing, by the computer processor of the correctness platform, a semantic transformation or binding to pattern characteristics including the intra data flow characteristics and the inter data flow characteristics and associated interactions;
    checking, by the computer processor of the correctness platform, composition semantics including the input composed patterns to the single formalized pattern and generating a formal model associated with a timed db-net with boundaries;
    translating, by a computer processor of an implementation platform, the formal model generated by the correctness platform;
    configuring, by the computer processor of the implementation platform, parameters of the translated formal model; and
    executing, by the computer processor of the implementation platform, the translated formal model in accordance with the configured implementation parameters, wherein a rule-based graph re-writing system applies an optimization strategy associated with pattern placement in connection with the formal model.

2. The method of claim 1, wherein the optimization strategy preserves structural and semantic correctness.

3. A system associated with trustworthy application integration, comprising:
    a formalization platform, including:
       a formalization computer processor, and
       a formalization computer memory, coupled to the formalization computer processor, storing instructions that, when executed by the formalization computer processor, cause the formalization platform to:
          (i) facilitate, by a formalization platform application integration engine, definition of pattern requirements by an integration developer,
          (ii) perform, by the formalization platform application integration engine, domain abstraction associated with a set of single patterns;
          (iii) analyze, by the formalization platform application integration engine, the set of single patterns and perform characteristics analysis to create a set of characteristics that are separated into intra data flow characteristics denoting constraints and inter data flow characteristics denoting contracts, and,
          (iv) formalize, by the formalization platform application integration engine, the set of single patterns as a single formalized pattern based in part on generated requirements,
          (v) compose, by the formalization platform application integration engine, at least some of the formalized single patterns into template-based formalized compositions of composed patterns by formalizing the constraints; and
          (vi) input the composed patterns to the single formalized pattern;
    a correctness platform that receives information from the formalization platform, including:
       a correctness computer processor, and
       a correctness computer memory, coupled to the correctness computer processor, storing instructions that, when executed by the correctness computer processor, cause the correctness platform to:
          (i) check for structural correctness of the formalized compositions composed by the formalization platform by verifying the contracts,
          (ii) execute a semantic transformation or binding to pattern characteristics including the intra data flow characteristics and the inter data flow characteristics and associated interactions, and
          (iii) check composition semantics including the input composed patterns to the single formalized pattern and generate a formal model associated with a timed db-net with boundaries; and
    an implementation platform that receives information from the correctness platform, including:
       an implementation computer processor, and
       an implementation computer memory, coupled to the implementation computer processor, storing instructions that, when executed by the implementation computer processor, cause the implementation platform to:
          (i) translate the formal model generated by the correctness platform,
          (ii) configure implementation parameters of the translated formal model, and (iii) execute the translated formal model in accordance with the configured implementation parameters,
wherein a rule-based graph re-writing system applies an optimization strategy associated with pattern placement in connection with the formal model.

4. The system of claim 3, wherein an optimization strategy may be executed in connection with the formal model.

5. The system of claim 4, wherein the optimization strategy comprises a static or dynamic optimization strategy and the optimization strategy preserves structural and semantic correctness.

6. The system of claim 5, wherein the static or dynamic optimization strategy is associated with at least one of: (i) process simplification, (ii) data reduction, (iii) parallelization, (iv) interaction reduction, and (v) pattern placement.

7. The system of claim 3, wherein the formal model is associated with at least one of: (i) a graph-based pattern composition, (ii) an integration pattern graph, and (iii) an integration pattern contract graph.

8. The system of claim 3, wherein the optimization strategy is associated with at least one of: (i) process simplification, (ii) redundant sub-processes, and (iii) combining sibling patterns.

9. The system of claim 3, wherein the optimization strategy is associated with at least one of: (i) parallelization, (ii) sequence-to-parallel, (iii) merge parallel, and (iv) heterogeneous parallelization.

10. The system of claim 3, wherein the optimization strategy is associated with at least one of: (i) interaction reduction, (ii) ignoring failing endpoints, and (iii) reducing requests.

11. The system of claim 3, wherein the optimization strategy is associated with at least one of: (i) early filter, (ii) early mapping, (iii) early aggregation, (iv) early claim check, and (v) early split.

12. A non-transitory, computer-readable medium storing instructions, that, when executed by a processor, cause the processor to perform a method associated with trustworthy application integration, the method comprising:
facilitating, by a computer processor of a formalization platform application integration engine, definition of pattern requirements by an integration developer;
performing, by the computer processor of the formalization platform application integration engine, domain abstraction associated with a set of single patterns;
analyzing, by the computer processor of the formalization platform application integration engine, the set of single patterns and perform characteristics analysis to create a set of characteristics that are separated into intra data flow characteristics denoting constraints and inter data flow characteristics denoting contracts;
formalizing, by the computer processor of the formalization platform application integration engine, the set of single patterns as a single formalized pattern based in part on generated requirements;
composing, by the computer processor of the formalization platform application integration engine, single patterns into template-based formalized compositions of composed patterns by formalizing the constraints;
inputting the composed patterns to the single formalized pattern;
checking, by a computer processor of a correctness platform, for structural correctness of the formalized compositions composed by the formalization platform application integration engine by verifying the contracts;
executing, by the computer processor of the correctness platform, a semantic transformation or binding to pattern characteristics including the intra data flow characteristics and the inter data flow characteristics and associated interactions;
checking, by the computer processor of the correctness platform, composition semantics including the input composed patterns to the single formalized pattern and generating a formal model associated with a timed db-net with boundaries;
translating, by a computer processor of an implementation platform, the formal model generated by the correctness platform;
configuring, by the computer processor of the implementation platform, parameters of the translated formal model; and
executing, by the computer processor of the implementation platform, the translated formal model in accordance with the configured implementation parameters,
wherein a rule-based graph re-writing system applies an optimization strategy associated with pattern placement in connection with the formal model.

13. The medium of claim 12, wherein the formal model is associated with at least one of: (i) a graph-based pattern composition, (ii) an integration pattern graph, and (iii) an integration pattern contract graph.

14. The medium of claim 12, wherein the optimization strategy preserves structural and semantic correctness.

\* \* \* \* \*